(12) United States Patent
Goodwin et al.

(10) Patent No.: US 12,203,745 B2
(45) Date of Patent: Jan. 21, 2025

(54) METROLOGY FOR ADDITIVE MANUFACTURING

(71) Applicant: Nikon Corporation, Tokyo (JP)

(72) Inventors: Eric Peter Goodwin, Oro Valley, AZ (US); Heather Lynn Durko, Tucson, AZ (US); Daniel Gene Smith, Tucson, AZ (US); Johnathan Agustin Marquez, San Francisco, CA (US); Michael Birk Binnard, Belmont, CA (US); Patrick Shih Chang, San Francisco, CA (US); Matthew Parker-McCormick Bjork, Oakland, CA (US); Paul Derek Coon, Redwood City, CA (US); Brett William Herr, Menlo Park, CA (US); Motofusa Ishikawa, Ageo (JP)

(73) Assignee: Nikon Corporation, Tokyo (JP)

( * ) Notice: Subject to any disclaimer, the term of this patent is extended or adjusted under 35 U.S.C. 154(b) by 201 days.

(21) Appl. No.: 17/623,570

(22) PCT Filed: Jul. 2, 2020

(86) PCT No.: PCT/US2020/040772
§ 371 (c)(1),
(2) Date: Dec. 28, 2021

(87) PCT Pub. No.: WO2021/003444
PCT Pub. Date: Jan. 7, 2021

(65) Prior Publication Data
US 2022/0252392 A1 Aug. 11, 2022

Related U.S. Application Data

(60) Provisional application No. 62/869,856, filed on Jul. 2, 2019.

(51) Int. Cl.
*G01B 11/25* (2006.01)
*B22F 10/80* (2021.01)
(Continued)

(52) U.S. Cl.
CPC .......... *G01B 11/2527* (2013.01); *B22F 10/80* (2021.01); *B22F 12/90* (2021.01);
(Continued)

(58) Field of Classification Search
CPC .............. G01B 11/2441; G01B 9/0209; G01B 9/02068; G01B 11/2513; G01B 2290/45;
(Continued)

(56) References Cited

U.S. PATENT DOCUMENTS 6,523,695 B1  2/2003  Ueta et al.
6,590,639 B1  7/2003  Yuan et al.
(Continued)

FOREIGN PATENT DOCUMENTS

CN  107044833 A * 8/2017 ......... G01B 11/2504
CN  107727011    2/2018
(Continued)

OTHER PUBLICATIONS

European Patent Office, "Written Opinion of the International Searching Authority," PCT application PCT/US2020/040772, pp. 1-14.
(Continued)

*Primary Examiner* — Michael P Stafira

(57) ABSTRACT 3D metrology techniques are disclosed for determining a changing topography of a substrate processed in an additive manufacturing system. Techniques include fringe scanning, simultaneous fringe projections, interferometry, and x-ray imaging. The techniques can be applied to 3D printing systems to enable rapid topographical measurements of a 3D printer powder bed, or other rapidly moving, nearly con-
(Continued)

tinuous surface to be tested. The techniques act in parallel to the system being measured to provide information about system operation and the topography of the product being processed. A tool is provided for achieving higher precision, increasing throughput, and reducing the cost of operation through early detection and diagnosis of operating problems and printing defects. These techniques work well with any powder bed 3D printing system, providing real-time metrology of the powder bed, the most recently printed layer, or both without reducing throughput.

39 Claims, 45 Drawing Sheets

(51) Int. Cl.
*B22F 12/90* (2021.01)
*B33Y 30/00* (2015.01)
*B33Y 50/00* (2015.01)

(52) U.S. Cl.
CPC .............. *B33Y 30/00* (2014.12); *B33Y 50/00* (2014.12); *G01B 11/2536* (2013.01)

(58) Field of Classification Search
CPC ............ G01B 2290/70; G01B 9/02007; G01B 9/02027; G01B 11/2527; G01B 9/0201; G01B 9/02039; G01B 9/02057; G01B 9/02077; G01B 11/24; G01B 11/245; G01B 11/0608; G01B 11/005; G01B 11/007; G01B 11/25; G01B 11/254; G01B 11/03; G01B 9/02004; G01B 9/02028; G01B 9/02044; G01B 9/02048; G01B 9/02063; G01B 9/02091; G01B 11/2518; G01B 9/02047; G01B 11/2509; G01B 11/2536; G01B 11/2545; G01B 15/04; G01B 9/02; G01B 9/02097; G01B 9/021; G01B 11/00; G01B 5/008; G01B 11/0675; G01B 11/2504; G01B 11/2522; G01B 11/303; G01B 21/042; G01B 21/045; G01B 9/02043; G01B 9/02067; G01B 9/02076; G01B 9/02078; G01B 9/02087; G01B 11/002; G01B 11/2531; G01B 2210/56; G01B 2210/58; G01B 7/00; G01B 7/012; B33Y 10/00; B33Y 30/00; B33Y 50/02; B33Y 50/00; B33Y 70/00; B22F 10/28; B22F 10/36; B22F 10/80; B22F 12/90; B22F 12/30; B22F 12/44; B22F 12/45; B22F 12/49; B22F 12/52; B22F 12/60

See application file for complete search history.

(56) References Cited

U.S. PATENT DOCUMENTS

| | | | |
|---|---|---|---|
| 6,758,313 | B2 | 7/2004 | Binnard |
| 6,953,109 | B2 | 10/2005 | Watson et al. |
| 6,987,559 | B2 | 1/2006 | Phillips et al. |
| 7,095,482 | B2 | 8/2006 | Phillips et al. |
| 7,726,452 | B2 | 6/2010 | Kraner |
| 9,091,529 | B2 * | 7/2015 | Bridges .................. G01B 11/03 |
| 9,170,098 | B2 * | 10/2015 | Gong .................. G01B 11/2527 |
| 2009/0206065 | A1 | 8/2009 | Kruth et al. |
| 2012/0008150 | A1 | 1/2012 | Smith et al. |
| 2012/0062708 | A1 * | 3/2012 | Johnson .................. G01B 11/03 29/829 |
| 2013/0016338 | A1 | 1/2013 | Bridges et al. |
| 2017/0001379 | A1 | 1/2017 | Long |
| 2017/0239752 | A1 | 8/2017 | Buller et al. |
| 2017/0276471 | A1 * | 9/2017 | Jiang .................. G01B 11/0608 |
| 2019/0316898 | A1 * | 10/2019 | Kim .................. G01B 11/2441 |

FOREIGN PATENT DOCUMENTS

| | | | | |
|---|---|---|---|---|
| CN | 108362228 | A * | 8/2018 | .......... G01B 11/002 |
| EP | 0551955 | A1 * | 7/1993 | |
| JP | H08304045 | | 11/1996 | |
| JP | 2001153612 | | 6/2001 | |
| JP | 2003042734 | A * | 2/2003 | |
| JP | 2015524916 | A * | 8/2015 | |
| WO | 2018/094277 | | 5/2018 | |
| WO | WO-2018094277 | A1 * | 5/2018 | ......... G01B 11/2441 |
| WO | 2019/133553 | | 7/2019 | |

OTHER PUBLICATIONS

Jorge L. Flores et al.: "Color deflectometry for phase retrieval using phase-shifting methods", Optics Communications, vol. 334, Jan. 1, 2015 (Jan. 1, 2015), pp. 298-302, XP55587540, Amsterdam, NL ISSN: 0030-4018, DOI: 10.1016/j.optcom.2014.08.030.

Bin Zhang et al.: "In situ surface topography of laser powder bed fusion using fringe projection", Additive Manufacturing, Elsevier, NL, vol. 12, No. Pt. A, Sep. 30, 2016 (Sep. 30, 2016), pp. 100-107, XP009508030, ISSN: 2214-8604, DOI: 10.1016/J.ADDMA.2016.08.001 [retrieved on Aug. 16, 2016].

Bian, L., Shamsaei, N., and Usher, J.M. (editors), "Sensor-Based Process Monitoring in Additive Manufacturing," in: Laser-Based Additive Manufacturing of Metal Parts (Boca Raton, CRC Press, Taylor & Francis, 2018), pp. 193-216. TS171.95 .L365 2018.

* cited by examiner

4101

Illuminate a substrate with electron beam illumination patterns, wherein the substrate comprises a metal powder bed
— 4111

Detect an intensity of x-rays generated by the illumination of the substrate with the electron beam illumination patterns and provide x-ray intensity measurements
— 4121

Estimate a spatial distribution of metal density in an illuminated region of the substrate, the illuminated region comprising the electron beam illumination patterns, wherein the estimate is based on the electron beam illumination patterns and the x-ray intensity measurements
— 4131

Fig. 41B

METROLOGY FOR ADDITIVE MANUFACTURING

RELATED APPLICATIONS

This application claims the benefit of U.S. patent application 62/869,856 filed Jul. 2, 2019, which is incorporated by reference along with all other references cited in this application. The content of PCT application no. PCT/US2018/067406 is incorporated by reference.

BACKGROUND

Current three-dimensional printing systems are relatively slow, have a low throughput, and are expensive to operate. As a result, one goal in manufacturing is to seek tools and improvements to achieve higher precision of the printed parts as well as to increase the throughput and reduce the cost of operation for three-dimensional printing systems.

Accordingly, a need exists for providing an ability to determine and monitor a topography of a powder bed as a part is being built and/or the shape of a fused region on the powder bad to determine a topography of each layer of a part being built. A 3D metrology that provides an ability to measure and assess the topography of a printed part while the part is being built provides a tool for achieving higher precision, increasing throughput, and reducing the cost of operation through early detection and diagnosis of operating problems and printing defects.

Additionally, it would be advantageous to have techniques for 3D metrology that can be applied to various additive manufacturing or other processes that enable a determination and monitoring of a topography of a substrate being processed, wherein the metrology can be applied in situ and in real-time during operation of the process without having to pause or interrupt the process. Such a metrology would bestow several advantages including increased throughput, improved operation of the process, and higher quality finished product. Real-time, in situ 3D metrology systems can be applied to identify and address defects and problems during processing for both the product being processed and the operation of the process itself. This provides an ability to monitor, mitigate, and address manufacturing and process problems before they have an opportunity to impact the performance of an expensive system and the potentially large volume of high precision product being produced.

SUMMARY 3D metrology techniques are disclosed for determining and monitoring a changing topography of a substrate being processed in an additive manufacturing system. Techniques include fringe scanning, simultaneous fringe projections, interferometry, and x-ray imaging. The disclosed techniques can be applied to 3D printing systems to enable rapid topographical measurements of a 3D printer powder bed, or any other rapidly moving, nearly continuous surface to be tested. The techniques act in parallel to the system being measured to provide information about the operation of the system and the topography of the product being processed. The 3D metrology techniques disclosed herein provide a tool for achieving higher precision, increasing throughput, and reducing the cost of operation through early detection and diagnosis of operating problems and printing defects. The techniques work well with any powder bed 3D printing system, providing real-time metrology of the powder bed, the most recently printed layer, or both without reducing throughput.

In some embodiments, a 3D metrology system for measuring a topography of a powder bed, a part being printed in a powder bed, or both, includes an illumination system, a detection system, and a processing system. Techniques are disclosed for measuring the 3D topography of every printed layer in a 3D additive manufacturing printer. Disclosed techniques act in parallel to the system being measured such that there is no loss in productivity or throughput. As an example, a simultaneous fringe projection system allows rapid topographical measurements of a 3D printer powder bed, or any other rapidly moving, nearly continuous surface to be tested. Simultaneous fringe projection methods provide a 3D map (height at a 2D grid of points), with over a one-hundred thousand measurements, within a single camera frame.

In some embodiments, techniques are disclosed for a 3D metrology system that provides a topography of a part being built by a processing machine. In one embodiment, the processing machine includes: (i) a support device having a support surface; (ii) a drive device which moves the support device so as a specific position on the support surface is moved along a moving direction; (iii) a powder supply device which supplies a powder to the moving support device to form a powder layer; (iv) an irradiation device which irradiates at least a portion of the powder layer with an energy beam to form at least a portion of the part from the powder layer during a first period of time; and (v) a measurement device which measures at least portion of the part during a second period of time. In this embodiment, at least a portion of the first period in which the irradiation device irradiates the powder layer with the energy beam and at least a portion of the second period in which the measurement device measures do not temporally overlap.

As an overview, because the first period and the second period are at least partly overlapping, multiple operations are occurring simultaneously and each part may be made faster and more efficiently.

In some embodiments, the measurement device measures at least a portion of the powder layer during the second period of time. The irradiation device may sweep the energy beam along a sweep direction, which crosses to a moving direction of the support surface. In some cases, the moving direction of the support device includes a rotation direction about a rotation axis. Further, the rotation axis may pass through the support surface.

In some embodiments, the irradiation device sweeps the energy beam along a direction crossing to the rotation direction. The irradiation device may be arranged at a position away from the rotation axis along an irradiation device direction that crosses the rotation direction.

In some embodiments, the measurement device may be arranged at a position away from the rotation axis along a measurement device direction that crosses the rotation direction. The irradiation device may be arranged at a position which is away from the rotation axis along an irradiation device direction that crosses the rotation direction and which is spaced apart from the measurement device along the rotation direction.

Additionally, the processing machine may include a pre-heat device which pre-heats the powder in a pre-heat zone that is positioned away from an irradiation zone where the energy beam by the irradiation device is directed at the powder along the moving direction. In one embodiment, the pre-heat device is arranged between the powder supply device and the irradiation device along the moving direction.

In one example, at least part of the first period and at least part of a third period in which the pre-heat device pre-heats the powder are overlapped. Additionally, or alternatively, at least part of the second period and at least part of the third period in which the pre-heat device pre-heats the powder are overlapped.

The irradiation device may include a plurality of irradiation systems that irradiate the powder layer with the energy beam. In one embodiment, the plurality of irradiation systems are arranged along a direction crossing to the moving direction.

In some embodiments, the powder is cooled in a cooling zone away from an irradiation zone irradiated with the energy beam by the irradiation device along the moving direction. The cooling zone where the powder cools may be arranged between the irradiation device and the powder supply device along the moving direction.

The support surface may include a plurality of support regions. In this embodiment, a separate part may be made in each support region. Moreover, the plurality of support regions may be arranged along the moving direction. The support surface may face a first direction, and the drive device may drive the support device so as to move the specific position on the support surface along a second direction crossing to at least the first direction.

The powder supply device may form a layer of a powder along a surface crossing to the first direction.

In some embodiments, at least part of the first period and at least part of a third period in which the powder supply device forms the powder layer are overlapped. Additionally, or alternatively, at least part of the third period and at least part of a fourth period in which the pre-heat device pre-heats the powder are overlapped. Additionally, or alternatively, at least part of the second period and at least part of a third period in which the powder supply device deposits/forms the powder layer are overlapped.

In some embodiments, the irradiation device irradiates the layer with a charged particle beam.

In another embodiment, the processing machine includes: (i) a support device having a support surface; (ii) a drive device which drives the support device so as to move a specific position on the support surface along a moving direction; (iii) a powder supply device which supplies a powder to the support device which is moving to form a powder layer; and (iv) an irradiation device which irradiates the powder layer with an energy beam to form a built part from the powder layer. In this embodiment, the irradiation device changes an irradiation position where the energy beam is irradiated to the powder layer along a direction crossing to the moving direction.

The drive device may drive the support device so as to rotate about a rotation axis, and the irradiation device changes the irradiation position along a direction crossing to the rotation axis.

In yet another embodiment, the processing machine includes: (i) a support device including a support surface; (ii) a drive device which drives the support device so as to move a specific position on the support surface along a moving direction; (iii) a powder supply device which supplies a powder to the support device which is moving, and forms a powder layer; and (iv) an irradiation device includes a plurality of irradiation systems which irradiate the layer with an energy beam to form a built part from the powder layer. In this embodiment, the irradiation systems are arranged along a direction crossing to the moving direction.

The drive device may drive the support device so as to rotate about a rotation axis, and the irradiation systems may be arranged along a direction crossing to the rotation axis.

Still another embodiment is directed to an additive manufacturing system for making a three-dimensional object from powder. In this embodiment, the additive manufacturing system includes: (i) a powder bed; (ii) a powder depositor that deposits the powder onto the powder bed; and (iii) a mover that rotates at least one of the powder bed and the powder depositor while the powder depositor deposits the powder onto the powder bed.

For example, the mover may rotate the powder bed relative to the powder depositor while the powder depositor deposits the powder onto the powder bed.

The additive manufacturing system may include an irradiation device that generates an irradiation beam that is directed at the powder on the powder bed to fuse at least a portion of the powder together to form at least a portion of the three-dimensional object. In this embodiment, the mover may rotate the powder bed relative to the irradiation device. The irradiation device may include an irradiation source that is scanned radially relative to the powder bed.

In some embodiments, the powder depositor may be moved transversely to the rotating powder bed. For example, the powder depositor may be moved linearly across the rotating powder bed.

The additive manufacturing system may include a preheat device that preheats the powder. In this embodiment, the mover may rotate the powder bed relative to the pre-heat device.

The mover may rotate the powder bed at a substantially constant angular velocity while the powder depositor deposits the powder onto the powder bed.

In some embodiments, the powder bed includes a curved support surface that is curved to match the shape of the irradiation beam.

In yet another embodiment, the additive manufacturing system includes: a material bed; a material depositor that deposits molten material onto the material bed to form the object; and a mover that rotates at least one of the material bed and the material depositor about a rotation axis while the material depositor deposits the molten material onto the material bed.

In still another embodiment, the present embodiment is directed to a processing machine for building a part that includes (i) a support device including a support surface; (ii) a drive device which moves the support device so a specific position on the support surface is moved along a moving direction; (iii) a powder supply device which supplies a powder to the moving support device to form a powder layer during a powder supply time; and (iv) an irradiation device which irradiates at least a portion of the powder layer with an energy beam to form at least a portion of the part from the powder layer during an irradiation time; and wherein at least part of the powder supply time and the irradiation time are overlapped.

The irradiation device may sweep the energy beam along a sweep direction, which crosses a moving direction of the support surface. The moving direction of the support device may include a rotation direction about a rotation axis. The rotation axis may pass through the support surface. The irradiation device may sweep the energy beam along a direction crossing the rotation direction. The irradiation device may be positioned away from the rotation axis along an irradiation device direction that crosses the rotation direction. The measurement device may be positioned away from the rotation axis along a measurement device direction that crosses the rotation direction. The irradiation device may be positioned away from the rotation axis along an irradiation device direction that crosses the rotation direction and which is spaced apart from the measurement device along the rotation direction. Additionally, the processing machine may include a pre-heat device which pre-heats a powder in a pre-heat zone that is positioned away from an irradiation zone where the energy beam by the irradiation device is directed at the powder along the moving direction.

In another embodiment, the processing machine includes: a support device including a non-flat support surface; a powder supply device which supplies a powder to the support device and which forms a curved powder layer; and an irradiation device which irradiates the layer with an energy beam to form a built part from the powder layer. In one version, the non-flat support surface having a curvature. The irradiation device may sweep the energy beam along a swept direction, and wherein the curved support surface includes a curvature in a plane where the energy beam passes through.

In some embodiments, a 3D metrology system for determining a topography of a substrate comprises: a fringe projection system that projects a set of spatially overlapping fringe patterns on a substrate simultaneously, each one of the fringe patterns in the set of spatially overlapping fringe patterns being generated by a different wavelength than each of the other fringe patterns in the set to provide a composite multi-fringe projection projected on the substrate, wherein each fringe pattern in the set of spatially overlapping fringe patterns has a different fringe phase such that the set provides sufficient phase diversity to enable the determination of a topography of the substrate; an imaging system that collects at least one of reflected and scattered light from the composite multi-fringe projection projected on the substrate to provide imaging data; and a processing system configured to: determine a phase map of the substrate from the imaging data; and determine the topography of the substrate based on the phase map.

In some cases, a known phase difference exists between each of the fringe patterns in the set of spatially overlapping fringe patterns. In some examples, the phase map is proportional to the topography of the substrate.

In some embodiments, the composite multi-fringe projection is generated by five different wavelengths. In some cases, the known phase differences are a fraction of pi and wherein the fraction is configured to span a total phase difference of about 2pi. In some examples, the known phase differences are about pi/2.

In some embodiments, the topography of the substrate changes. In these cases, as the topography of the substrate changes, the fringes in the composite multi-fringe projection projected on the changing topography of the substrate shift in response to the changing topography of the substrate. Determining the topography of the substrate based on the phase map includes determining a phase shift of the fringes at each location on the substrate based on observing the at least one of reflected and scattered light in response to the fringes shifting on the changing topography of the substrate and determining a height of the substrate at each location on the substrate based on the phase shift of the fringes.

In some cases, the topography of the substrate at a particular moment of interest is determined from imaging data provided by the imaging system at the particular moment of interest. The imaging data can be a single image frame.

In some applications, the substrate changes topography due to being subjected to a process, and the 3D metrology system is configured to monitor the changing topography of the substrate by providing a determination of the topography of the substrate at any given moment during the process.

For example, in some printing 3D printing applications, the substrate comprises a powder bed, the process comprises a 3D printing process configured to build a part out of powder, and the 3D metrology system is configured to monitor the changing topography of the part as it is being built during the 3D printing process. The powder bed can be part of at least one of a linear powder bed system and a rotary powder bed system and monitoring the changing topography of the part can be performed in-situ and in real time.

In some embodiments, the fringe projection system comprises: a plurality of sources configured to provide illumination beams of different wavelengths, each source comprising a discrete wavelength; a custom phase grating, located in the object plane of the illumination system, which is conjugate to the substrate; an illumination pupil grating; and fringe projector optics configured to magnify the fringe patterns to cover a desired region on the substrate. Each source in the plurality of sources illuminates the custom phase grating at one of the discrete wavelengths and at a proper position. The custom phase grating comprises different phase grating patterns to project multiple orders at an illumination pupil grating for each illumination beam. Moreover, each order leaves the custom phase grating at different angles relative to a first axis, the first axis being parallel to the direction of the optical axis of the system at the custom phase grating.

In some cases, the custom phase grating is configured to provide a spatial separation such that each phase grating pattern in the object plane is for a given discrete wavelength, and such that a phase of each fringe pattern in the set of spatially overlapping fringe patterns is offset from a phase of each of the other fringe patterns in the set of spatially overlapping fringe patterns by a desired amount at the substrate. Multiple diffraction orders of each of the discrete wavelengths generated by the custom phase grating are incident on the illumination pupil grating such that the multiple orders are located at different positions along a second axis that is perpendicular to a first axis. In some instances, each set of multiple orders of each of the discrete wavelengths is incident on the illumination pupil grating at a different angle, but all of the wavelengths leave the illumination pupil grating at the same angle relative to the first axis.

In some embodiments, the illumination pupil grating comprises a mask configured to allow only two of the multiple orders per discrete wavelength incident on the illumination pupil grating to diffract towards fringe projector optics and the substrate. In these cases, the two orders per discrete wavelength generate a fringe pattern associated with the discrete wavelength.

In some embodiments, the phase of each fringe pattern in the set of spatially overlapping fringe patterns is offset from the phase of each of the other fringe patterns in the set of spatially overlapping fringe patterns by roughly pi/2 between neighboring wavelengths.

In some cases, the illumination pupil grating is configured to generate a unique projected fringe pattern for each wavelength, including by diffracting two diffraction orders per wavelength toward the substrate to generate an intermediate image. For example, the mask can be configured to allow only the +1 and −1 diffraction orders from the custom phase grating to be directed toward the substrate.

In some embodiments, the fringe projection system is configured to generate a uniform illuminated region that is not Gaussian.

Fringe projector optics can also be further configured to generate nearly the same angle of incidence for projected light at all locations and all wavelengths on the substrate. As an example, fringe projector optics can be further configured to make the angle of incidence of the light nearly the same everywhere on the substrate. Fringe projector optics can also be further configured to ensure that the two orders corresponding to the two diffraction orders used to create the fringe pattern for each wavelength have about the same mean angle of incidence everywhere on the substrate.

In some embodiments, the phase of each fringe pattern in the set of spatially overlapping fringe patterns is offset from the phase of each of the other fringe patterns in the set of spatially overlapping fringe patterns by roughly pi/2 between neighboring wavelengths.

In some cases, the illumination pupil grating is configured to generate a unique projected fringe pattern for each wavelength, including by diffracting two diffraction orders per wavelength toward the substrate to generate an intermediate image.

In some embodiments, the fringe projection system includes: a plurality of sources configured to provide illumination beams of different wavelengths, each source comprising a discrete wavelength; a plurality of custom phase gratings, located in the object planes of the illumination system, which is conjugate to the substrate; spectral beamsplitters; a mask configured to allow only two of the multiple orders incident on the mask to reflect or transmit towards fringe projector optics and the substrate; and fringe projector optics configured to magnify the fringe patterns to cover a desired region on the substrate. Each source in the plurality of sources illuminates a corresponding custom phase grating in the plurality of custom phase gratings at one of the discrete wavelengths. Each corresponding custom phase grating comprises a different phase grating pattern to project multiple orders at spectral beamsplitters for each illumination beam. Each order leaves the corresponding custom phase grating at different angles relative to a local first axis, the local first axis being parallel to the direction of the optical axis of the system at the corresponding custom phase grating, such that a phase of each fringe pattern in the set of spatially overlapping fringe patterns is offset from a phase of each of the other fringe patterns in the set of spatially overlapping fringe patterns by a desired amount at the substrate.

In some embodiments, each set of multiple orders of each of the discrete wavelengths is incident on the spectral beamsplitters at a different angle approximately aligned with the local first axis, but all of the wavelengths leave the spectral beamsplitters travelling along the common first axis that is directed towards a mask. Multiple diffraction orders of each of the discrete wavelengths generated by each of the corresponding custom phase gratings are incident on the mask such that the multiple orders are located at different positions along a second axis that is perpendicular to a common first axis.

In some embodiments, the fringe projection system includes: a plurality of sources configured to provide illumination beams of different wavelengths, each source comprising a discrete wavelength; a custom phase grating, located in the object plane of the illumination system, which is conjugate to the substrate; a prism; a mask configured to allow only two of the multiple orders incident on the mask to reflect or transmit towards fringe projector optics and the substrate; and fringe projector optics configured to magnify the fringe patterns to cover a desired region on the substrate.

In some instances, each source in the plurality of sources illuminates the custom phase grating at one of the discrete wavelengths and at a proper position. Additionally, for each of the discrete wavelengths, the custom phase grating is configured to generate fringe patterns from at least two diffraction orders to generate fringe patterns having multiple orders.

In some embodiments, the custom phase grating comprises different phase grating patterns to project multiple orders at a prism for each illumination beam. Each order leaves the custom phase grating at different angles relative to a first axis, the first axis being parallel to the direction of the optical axis of the system at the custom phase grating.

In some cases, the custom phase grating is configured to provide a spatial separation such that each phase grating pattern in the object plane is for a given discrete wavelength, such that a phase of each fringe pattern in the set of spatially overlapping fringe patterns is offset from a phase of each of the other fringe patterns in the set of spatially overlapping fringe patterns by a desired amount at the substrate.

In some embodiments, each set of multiple orders of each of the discrete wavelengths is incident on the prism at a different angle, but all of the wavelengths leave the prism at the same angle relative to the first axis. Moreover, multiple diffraction orders of each of the discrete wavelengths generated by the custom phase grating are incident on the mask such that the multiple orders are located at different positions along a second axis that is perpendicular to a first axis.

In some embodiments, the imaging system is configured to image at least one of reflected and scattered light from the substrate onto a detector. In some instances, the imaging system includes: a first lens, wherein at least one of scattered and reflected light is directed from the substrate toward the first lens to create an intermediate image; an aperture located at the intermediate image and acting as a field stop to limit the field of view on the substrate is disposed after the first lens; a second lens that relays the light from the intermediate image to an imaging system diffraction grating in or near the pupil of the imaging system configured to separate the different wavelengths in angle near the pupil of the imaging system so that each wavelength can be measured at the same time; and a third lens, configured to receive diffracted light from the imaging system diffraction grating and direct the light on to the detector such that the different wavelengths are spatially separated. Additionally, the imaging system diffraction grating can be further configured to correct a smile on a substrate plane.

In some cases, at least one of the reflected and scattered light from the substrate is imaged onto a detector by a receiving side optical system and wherein the imaging system diffraction grating is located at or near the imaging system pupil in order to separate the fringe patterns for each wavelength spatially on the detector.

In some embodiments, a method for determining a topography of a substrate includes: projecting a set of spatially overlapping fringe patterns on a substrate simultaneously, each one of the fringe patterns in the set of spatially overlapping fringe patterns being generated by a different wavelength than each of the other fringe patterns in the set to provide a composite multi-fringe projection projected on the substrate, wherein each fringe pattern in the set of spatially overlapping fringe patterns has a different fringe phase such that the set provides sufficient phase diversity to enable the determination of a topography of the substrate; collecting at least one of reflected and scattered light from the composite multi-fringe projection projected on the substrate to provide imaging data; determining a phase map of the substrate from the imaging data; and determining the topography of the substrate based on the phase map. In some instances, the phase map is proportional to the topography of the substrate.

In some embodiments, a composite multi-fringe projection is generated by five different wavelengths. A known phase difference exists between each of the fringe patterns in the set of spatially overlapping fringe patterns. In some examples, the known phase differences are a fraction of pi and wherein the fraction is configured to span a total phase difference of about 2pi. For instance, in some cases, the known phase differences are about pi/2.

In some embodiments, the topography of the substrate changes. In these cases, as the topography of the substrate changes, the fringes in the composite multi-fringe projection projected on the changing topography of the substrate shift in response to the changing topography of the substrate. Determining the topography of the substrate based on the phase map in these cases includes: determining a phase shift of the fringes at each location on the substrate based on observing the at least one of reflected and scattered light in response to the fringes shifting on the changing topography of the substrate; and determining a height of the substrate at each location on the substrate based on the phase shift of the fringes.

In some embodiments, the topography of the substrate at a particular moment of interest is determined from imaging data provided by the imaging system at the particular moment of interest. In these cases, the imaging data can comprise a single image frame. In some examples, the substrate changes topography due to being subjected to a process, and the 3D metrology system is configured to monitor the changing topography of the substrate by providing a determination of the topography of the substrate at any given moment during the process.

In some applications, for example, in the case of printing 3D parts, the substrate comprises a powder bed, the process comprises a 3D printing process configured to build a part out of powder, and the 3D metrology system is configured to monitor the changing topography of the part as it is being built during the 3D printing process. The powder bed can part of at least one of a linear powder bed system and a rotary powder bed system and monitoring the changing topography of the part is performed in-situ and in real time.

In some embodiments, projecting a set of spatially overlapping fringe patterns on a substrate simultaneously is performed by a fringe projection system comprising: a plurality of sources configured to provide illumination beams of different wavelengths, each source comprising a discrete wavelength; a custom phase grating, located in the object plane of the illumination system, which is conjugate to the substrate; an illumination pupil grating; and fringe projector optics configured to magnify the fringe patterns to cover a desired region on the substrate. Each source in the plurality of sources illuminates the custom phase grating at one of the discrete wavelengths and at a proper position.

In some cases, the custom phase grating comprises different phase grating patterns to project multiple orders at an illumination pupil grating for each illumination beam. Each order leaves the custom phase grating at different angles relative to a first axis, the first axis being parallel to the direction of the optical axis of the system at the custom phase grating. In some examples, the custom phase grating is configured to provide a spatial separation such that each phase grating pattern in the object plane is for a given discrete wavelength, and such that a phase of each fringe pattern in the set of spatially overlapping fringe patterns is offset from a phase of each of the other fringe patterns in the set of spatially overlapping fringe patterns by a desired amount at the substrate. Multiple diffraction orders of each of the discrete wavelengths generated by the custom phase grating are incident on the illumination pupil grating such that the multiple orders are located at different positions along a second axis that is perpendicular to a first axis and each set of multiple orders of each of the discrete wavelengths is incident on the illumination pupil grating at a different angle, but all of the wavelengths leave the illumination pupil grating at the same angle relative to the first axis In some embodiments, the illumination pupil grating comprises a mask configured to allow only two of the multiple orders per discrete wavelength incident on the illumination pupil grating to diffract towards fringe projector optics and the substrate. The two orders per discrete wavelength generate a fringe pattern associated with the discrete wavelength.

In some embodiments, a processing machine for building a part includes a support device including a support surface; a drive device which moves the support device, so a specific position on the support surface is moved along a moving direction; a powder supply device which supplies a powder to the moving support device to form a powder layer on a powderbed; an irradiation device which irradiates at least a portion of the powder layer with an energy beam to form a portion of the part from the powder layer; and a monitoring system which monitors the topography of at least one of the powderbed and a portion of the part. In some cases, the monitoring system includes: an illumination system to illuminate a region of interest, wherein the illumination system uses one of spot illumination, area of illumination, and ebeam illumination; a detection system to capture data in response to a region of interest being illuminated; and a processor for determining at least one of bed topography, melt region geometry, temperature, and powder quality based on the captured data. In some instances, the monitored topography comprises a shape of a melted and fused region, the melted and fused region forming a portion of the part.

In some embodiments, a 3D metrology system for determining a topography of a substrate includes: a fringe projection system that illuminates fringes at an angle to project a fringe pattern on a substrate, wherein the projected fringe pattern is configured to provide a sensitivity to height changes on the substrate; an observation system configured to detect reflected or scattered light generated by the projected fringe pattern projected on the substrate and to provide observation data based on the detected reflected or scattered light; and a processing system configured to: process the observation data; and determine a topography of a region of interest on the substrate based on the observation data. In some cases, a custom amount of tilt is applied between two beams to generate the fringes. For example, a custom amount of tilt can be applied using a Mach-Zehnder interferometer. Additionally or in the alternative, the custom amount of tilt is configured to enable dynamically setting a fringe pitch and fringe orientation to adjust a sensitivity of the system.

In some cases, adjusting the sensitivity of the system includes: measuring irradiance values to obtain measurements of the region of interest on the substrate, wherein a known phase shift of the projected fringes exists between subsequent measurements of a same location on the substrate. Moreover, adjusting the sensitivity of the system can include converting the measured irradiance values, including by using at least one of a phase shifting interferometry algorithm and a Least Squares Phase Shifting Interferometry (LSPSI) algorithms.

In some embodiments, the observation system is configured to view the scattered light at a normal incidence. In other cases, the observation system is configured to view the scattered light at an off-axis angle. In still other cases, the observation system is configured to view the scattered light at an angle that is different from the angle of the projected fringes illuminated on the substrate.

In some instances, the substrate includes a moving powder bed. The projected fringe pattern can be a fixed fringe pattern.

In some embodiments, determining the topography of the region of interest includes determining a phase map of the substrate from the observation data and determining the topography of the substrate based on the phase map. In some cases, the phase is a value of modulo 2pi to be converted into height, in microns. In some cases, the observation system includes a detector. Moreover, the region of interest can include a same location on the substrate.

In some cases, as the substrate moves under the projected fringe pattern, a plurality of measurements is taken, each measurement in the plurality of measurements measuring the region of interest with a different fringe phase. In some cases, the measurements include images, the region of interest is measured at least five times, and the phase shift between images for a given substrate location is a fraction of 2pi. In some cases, the phase shift between images for a given substrate location is at least one of about pi/2, about pi/3, or about pi/4. In some examples, the phase shift is not equal to an integer multiple of pi. In still other examples, the phase shift is not equal to or a*pi, where "a" is not less than about 1.1 and not greater than about 0.9.

In some embodiments, the substrate includes a powder bed in a 3D printing system, the measurements of the substrate are taken in-situ during a 3D printing process, and the 3D printing system moves the substrate in order to perform 3D printing of a part. In some cases, the measurement system is configured to measure a 3D topology of every printed layer in a 3D printing system by collecting and processing observed data as the powder bed moves. In still other cases, the measurement system is configured to provide real-time measurements from a 3D printer during the printing process with no reduction in printer throughput. Moreover, in some instances, the measurement system is configured to measure the powder bed after powder is deposited but before a 3D printing step, to verify a topology of the applied powder layer spread on the powder bed. In some cases, the measurement system is configured to measure a 3D printed layer after the 3D printed layer has been melted or fused into a portion of a part. In other cases, the measurement system is configured to measure a 3D printed layer after the 3D printed layer has been melted or fused into a portion of a part and before a subsequent powder layer is deposited.

In some embodiments, the measurements are used as a feedback input for a subsequent print step. The measurements can be taken both before and after printing. In some cases, the measurements are taken both before and after printing using two scanning systems. For example, the measurements can be taken both before and after printing using a linear system that scans underneath the fringe projection system between an exposure and a powder spreading region. In some instances, the fringes are rotated to image divisions between different phase regions to perform metrology on an entire 3D part. Additionally, the fringes on a fixed fringe projection can be shifted relative to the region of interest due to the movement of the powder bed.

In some embodiments, the powder bed is a linear powder bed configured to move in a linear motion under the projected fringe pattern. In some cases, the fringes are overscanned by an overscan amount. The overscan amount can include an amount sufficient to move the powder bed across at least one full period of the projected fringes.

In some cases, a linear scan direction is reverse for a next powder layer to be deposited. In other cases, the moving powder bed is a rotary powder bed, the rotary powder bed configured to rotate around an axis. In some examples, the fringes are oriented such that any location on a print region moves across at least 2pi of fringe phase as it moves under the projected fringes.

In some embodiments, the processing system is further configured to track a region of interest as the region of interest makes its way through the fringe projection field of view, allowing the measured data to be processed to obtain a topography of a location of interest on the powder bed.

In some embodiments, a method for determining a topography of a substrate includes: illuminating fringes at an angle to project a fringe pattern on a substrate, wherein the projected fringe pattern is configured to provide a sensitivity to height changes on the substrate; detecting reflected or scattered light generated by the projected fringe pattern projected on the substrate and providing observation data based on the detected reflected or scattered light; processing the observation data; and determining a topography of a region of interest on the substrate based on the observation data.

In some embodiments, a 3D metrology system for determining a topography of a substrate includes: an illumination system that illuminates a substrate with electron beam illumination patterns, the illumination system comprising a focusing element to focus the electron beam illumination patterns onto the substrate, wherein the substrate comprises a metal powder bed; a detection system configured to detect an intensity of x-rays generated by the illumination of the substrate with the electron beam illumination patterns and to provide x-ray intensity measurements; and a processing system configured to estimate a spatial distribution of metal density in an illuminated region of the substrate, the illuminated region comprising the electron beam illumination patterns. The estimate is based on the electron beam illumination patterns and the x-ray intensity measurements. The detection system can include a detector, including for example, a photo sensitive detector or a single element detector.

In some cases, the estimate provides information to assess a layer of a printed metal part as the part is being built on the metal powder bed in a 3D printing system.

In some embodiments, the illumination system includes: an LED array configured to generate desired illumination patterns; an imaging relay that transfers the desired illumination patterns to a photocathode, the photocathode being configured to convert the desired illumination patterns from photons to electrons. In some examples, the illumination system further comprises a control system configured to provide instructions to the LED array to generate the desired illumination patterns. In some cases, the illumination system includes a light source that illuminates a spatial light modulator, the spatial light modulator being configured to generate desired illumination patterns and an imaging relay that transfers the desired illumination patterns to a photocathode, the photocathode being configured to convert the desired illumination patterns from photons to electrons.

In some embodiments, the illumination system further comprises a control system configured to provide instructions to the spatial light modulator to generate the desired illumination patterns.

In some cases, the electron beam illumination patterns are generated and the x-ray intensity measurements are provided by focusing and scanning a single narrow electron beam on the substrate to trace an illumination trajectory. In these cases, the detection system detects the intensity of x-rays generated by the illumination of the substrate along the trajectory traced by the single narrow electron beam.

In some embodiments, the trajectory traced by the single narrow electron beam provides the electron beam illumination patterns on the substrate and the spatial distribution of metal density in an illuminated region of the substrate is estimated based on the electron beam illumination patterns and an integrated intensity measurement based on the x-ray intensity measurements generated by the trajectory traced by the single narrow electron beam. In some cases, the illumination system further comprises a steering mechanism for steering a position of the single narrow electron beam to trace an illumination trajectory.

In some embodiments, the electron beam illumination patterns are generated with sequential sets of orthogonal patterns or orthogonal basis patterns. As an example, the orthogonal patterns or orthogonal basis patterns can include at least one of Fourier spatial frequencies and Hadamard patterns.

In some embodiments, a 3D metrology system for determining a topography of a substrate includes an illumination system that illuminates a substrate by scanning a single narrow electron beam across a region of interest of a substrate. The illumination system can include a focusing element to focus the single narrow electron beam onto the substrate, wherein the substrate comprises a metal powder bed. Additionally, the 3D metrology system includes an imaging system configured to measure an intensity of x-rays generated by the illumination of the substrate to generate an image. Each pixel of the image corresponds to a measured intensity of x-rays generated at a corresponding position of the single narrow electron beam on the substrate. The 3D metrology system also includes a processing system configured to estimate a spatial distribution of metal density in the region of interest of the substrate based on the measured intensity of x-rays.

In some embodiments, a 3D metrology system for determining a topography of a metal powder bed substrate includes an electron beam applied to a region of interest on the metal powder bed substrate that generates x-rays and an image-forming element that allows at least a subset of the generated x-rays to form an image on a detector. The image-forming element and the detector are configured to detect an x-ray distribution across the region of interest on the metal powder bed substrate. The x-ray distribution is generated by the application of the electron beam to the region of interest. The detector provides a measurement of the x-ray distribution across the region of interest. Additionally, the 3D metrology system also includes a processing system configured to determine a spatial distribution of the region of interest based on the measurement of the x-ray distribution.

In some cases, the processing system is further configured to determine an electron beam profile based on the measurement of the x-ray distribution. In some instances, the image-forming element includes an imaging aperture. For example, the imaging aperture can include a pinhole aperture, a set of pinhole apertures, or a coded aperture.

In some embodiments, the detector includes a position-sensitive detector, and the image-forming element is disposed in a position between the detector and the metal powder bed substrate. In some cases, the 3D metrology system also includes a steering mechanism for steering a position of the electron beam to probe the substrate and to generate x-rays in the region of interest.

In some embodiments, a 3D metrology system for determining a topography of a metal powder bed substrate includes an electron beam applied to a region of interest on the metal powder bed substrate that generates x-rays and a Compton camera imager comprising at least two position-sensitive and energy-sensitive detectors configured in a Compton camera configuration, such that a first detector is disposed between a second detector and the metal powder bed substrate. In these embodiments, each detector in the Compton camera configuration provides an output comprising information related to an x-ray interaction on the detector including a two-dimensional position, a deposited energy, and a time of interaction.

In some cases, the 3D metrology system also includes a processing system configured to: provide an image corresponding to an estimate of a distribution of an origin of the x-rays interacting with the at least two position-sensitive and energy-sensitive detectors in the Compton camera imager. In these cases, the estimate is based on the output of each of the at least two position-sensitive and energy-sensitive detectors. In some instances, the estimate provides information to assess a layer of a printed metal part as the part is being built on the metal powder bed in a 3D printing system.

In some examples, the processing system is further configured to determine an electron beam profile based on the measurement of the x-ray distribution. In some cases, the 3D metrology system further comprises a steering mechanism for steering a position of the electron beam to probe the substrate and to generate x-rays in the region of interest.

In some embodiments, a method for determining a topography of a substrate includes: illuminating a substrate with electron beam illumination patterns, wherein the substrate comprises a metal powder bed; detecting an intensity of x-rays generated by the illumination of the substrate with the electron beam illumination patterns and providing x-ray intensity measurements; and estimating a spatial distribution of metal density in an illuminated region of the substrate, the illuminated region comprising the electron beam illumination patterns, wherein the estimate is based on the electron beam illumination patterns and the x-ray intensity measurements.

In some embodiments, a method for determining a topography of a metal powder bed substrate, includes: generating x-rays using an electron beam applied to a region of interest on a metal powder bed substrate; allowing at least a subset of the generated x-rays to form an image on a detector; detecting an x-ray distribution across the region of interest on the metal powder bed substrate, wherein the x-ray distribution is generated by the application of the electron beam to the region of interest; providing a measurement of the x-ray distribution across the region of interest; and determining a spatial distribution of the region of interest based on the measurement of the x-ray distribution.

In some embodiments, a method for determining a topography of a metal powder bed substrate, includes: generating x-rays by applying an electron beam to a region of interest on a metal powder bed substrate; providing an output comprising information related to an x-ray interaction on the detector including a two-dimensional position, a deposited energy, and a time of interaction; providing an image corresponding to an estimate of a distribution of an origin of the x-rays interacting with at least two position-sensitive and energy-sensitive detectors in a Compton camera imager, wherein the estimate is based on an output of each of the at least two position-sensitive and energy-sensitive detectors.

In some embodiments, a processing machine for building a build part, the processing machine includes a support device; and a powder supply device which supplies a powder to the support device to form a powder layer. The machine includes an irradiation device which irradiates at least a portion of the powder layer with an energy beam to form at least a portion of the build part from the powder layer. The machine includes a measurement device which detects at least one of a condition of the powder layer and at least a portion of the build part.

In some embodiments, the condition of the powder layer includes a topography of the powder layer after supplying the powder by the powder supply device and before being irradiated by the energy beam of the irradiation device. The condition of at least a portion of the build part includes a geometry being built by radiation of the energy beam from the irradiation device. The condition of at least one of the powder layer and the at least portion of the build part includes at least one of a particle size of the powder and a temperature. The measurement device detects the condition of the powder layer by detecting a reflected light reflected or scattered from at least one of the powder layer and the at least portion of the build part.

In some embodiments, the measurement device irradiates a measurement light onto at least one of the powder layer and the at least portion of the build part, the reflected light is the reflection from at least one of the powder layer and the at least portion of the build part, and the scattered light is scattered from at least one of the powder layer and the at least portion of the build part.

In some cases, the measurement light is a spot light. In some cases, the measurement light has a stripe pattern and in other cases, the measurement light has a fringe pattern. In some examples, the measurement device detects the condition of at least one of the powder layer and the at least a portion of the build part by detecting X-ray generated at the powder layer.

In some examples, the measurement device detects at least one of: at least the portion of the powder layer and a portion of the build part during the energy beam is irradiated on the powder layer. In other examples, the measurement device detects at least one of: at least the portion of the powder layer and at least a portion of the build part after irradiation of the beam and before the powder supply device supply the powder to form a subsequent powder layer.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 41B is a flow chart for another embodiment of a method 4101 for determining a topography of a substrate using x-ray imaging as disclosed herein.

DETAILED DESCRIPTION OF THE INVENTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
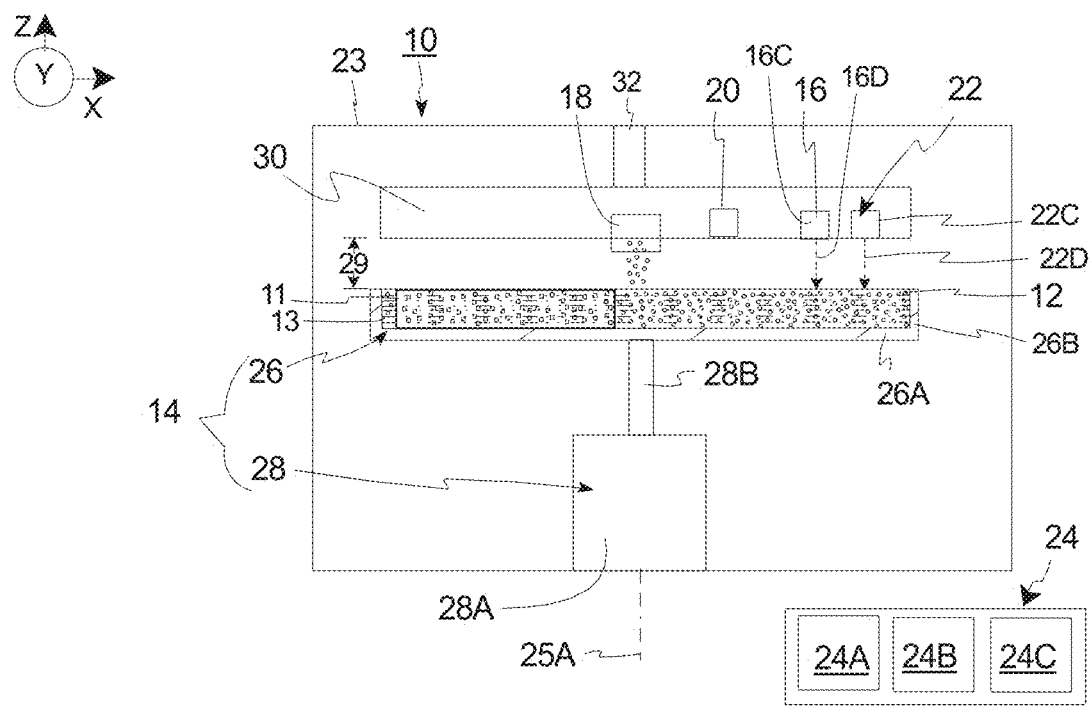
FIG. 1A is a simplified schematic side illustration of an exemplary processing machine used to manufacture one or more three-dimensional objects.

FIG. 1A is a simplified schematic side illustration of a processing machine 10 that may be used to manufacture one or more three-dimensional objects 11. As provided herein, the processing machine 10 can be an additive manufacturing system, e.g. a three-dimensional printer, in which a portion of the powder 12 (illustrated as small circles) in a series of powder layers 13 (illustrated as dashed horizontal lines) is joined, melted, solidified, and/or fused together to manufacture one or more three-dimensional object(s) 11. In FIG. 1A, the object 11 includes a plurality of small squares that represent the joining of the powder 12 to form the object 11.

The type of three-dimensional object(s) 11 manufactured with the processing machine 10 may be almost any shape or geometry. As a non-exclusive example, the three-dimensional object 11 may be a metal part, or another type of part, for example, a resin (plastic) part or a ceramic part, etc. The three-dimensional object 11 may also be referred to as a "built part".

The type of powder 12 joined and/or fused together may be varied to suit the desired properties of the object(s) 11. As a non-exclusive example, the powder 12 may include metal powder grains (e.g., including one or more of titanium, aluminum, vanadium, chromium, copper, stainless steel, or other suitable metals) or alloys for metal three-dimensional printing. Alternatively, the powder 12 may be non-metal powder, a plastic, polymer, glass, ceramic powder, organic powder, an inorganic powder, or any other material known to people skilled in the art. The powder 12 may also be referred to as "material".

A number of different designs of the processing machine 10 are provided herein. In certain implementations, the processing machine 10 includes (i) a powder bed assembly 14; (ii) a pre-heat device 16; (iii) a powder supply assembly 18 (illustrated as a box); (iii) a measurement device 20 (illustrated as a box); (iv) an energy system 22 (illustrated as a box); and (v) a control system 24 (illustrated as a box) that cooperate to make each three-dimensional object 11. The design of each of these components may be varied pursuant to the teachings provided herein. Further, the positions of the components of the processing machine 10 may be different than that illustrated in FIG. 1. Moreover, the processing machine 10 can include more components or fewer components than illustrated in FIG. 1A. For example, the processing machine 10 can include a cooling device (not shown in FIG. 1A) that uses radiation, conduction, and/or convection to cool the powder 12.

A number of different powder supply assemblies 18 are disclosed herein. As an overview, these powder supply assemblies 18 are uniquely designed to accurately, evenly, and quickly distribute the powder layers 13 onto the powder bed assembly 14. Further, in certain implementations, the powder supply assembly 18 is centerless, and uniformly distributes a fine layer of the powder 12 over a large and broad powder bed assembly 14. This will improve the accuracy of the built object 11, and reduce the time required to form the built object 11.

A number of figures include an orientation system that illustrates an X-axis, a Y-axis that is orthogonal to the X-axis, and a Z-axis that is orthogonal to the X and Y axes. It should be noted that any of these axes can also be referred to as the first, second, and/or third axes. Further, as used herein, movement with six degrees of freedom shall mean along and about the X, Y, and Z axes.

In FIG. 1A, a portion of the powder bed assembly 14 is illustrated in cut-away so that the powder 12, the powder layers 13 and the object 11 are visible. With the present design, one or more objects 11 can be simultaneously made with the processing machine 10. In FIG. 1A, only one object 11 is visible.

It should be noted that any of the processing machines 10 described herein may be operated in a controlled environment, e.g. such as a vacuum, using an environmental chamber 23 (illustrated in FIG. 1A as a box). For example, one or more of the components of the processing machine 10 can be positioned entirely or partly within the environmental chamber 23. Alternatively, at least a portion of one or more of the components of the processing machine 10 may be positioned outside the environmental chamber 23. Still alternatively, the processing machine 10 may be operated in a non-vacuum environment such as inert gas (e.g., nitrogen gas or argon gas) environment.

Figure 1B:
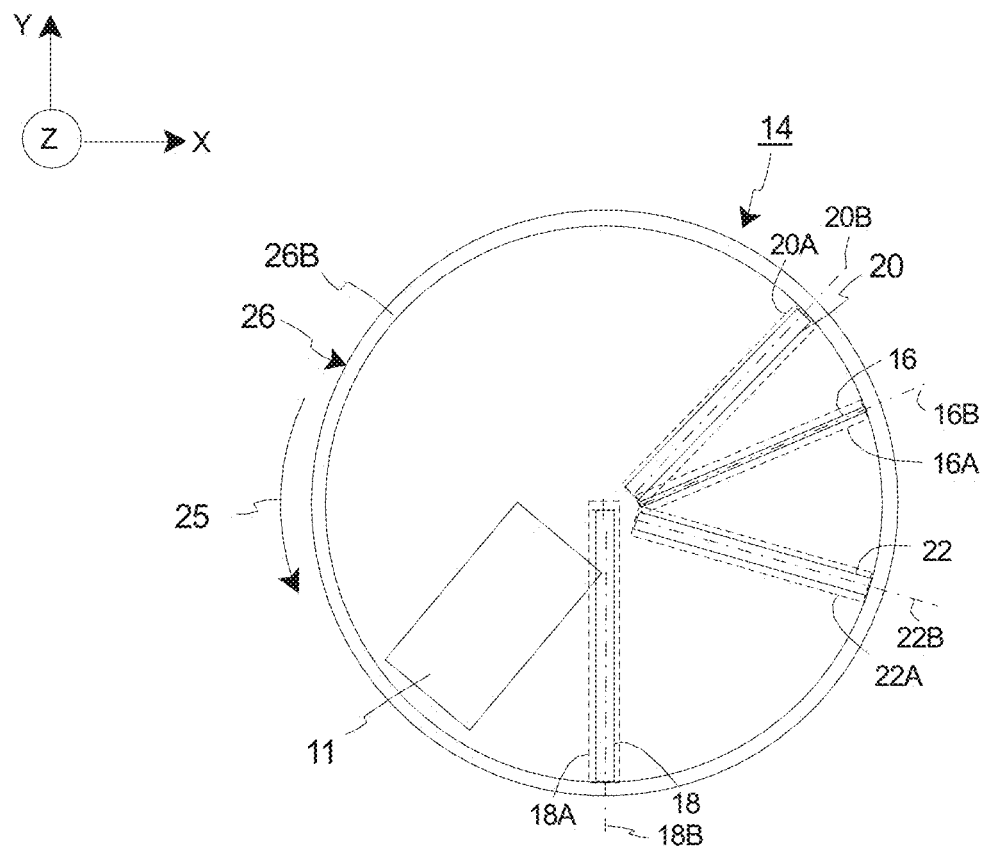
FIG. 1B is a simplified top view of a portion of the powder bed assembly that is shown in FIG. 1A and the three-dimensional object.

FIG. 1B is a simplified top view of a portion of the powder bed assembly 14 of FIG. 1A and the three-dimensional object 11. FIG. 1B also illustrates (i) the pre-heat device 16 (illustrated as box) and a pre-heat zone 16A (illustrated with dashed lines) which represents the approximate area in which the powder 12 can be pre-heated with the pre-heat device 16; (ii) the powder supply assembly 18 (illustrated as a box) and a deposit zone 18A (illustrated in phantom) which represents the approximate area in which the powder 12 can be added and/or spread to the powder bed assembly 14 by the powder supply assembly 18; (iii) the measurement device 20 (illustrated as a box) and a measurement zone 20A (illustrated in phantom) which represents the approximate area in which the powder 12 and/or the object 11 can be measured by the measurement device 20; and (iv) the energy system 22 (illustrated as a box) and an energy zone 22A which represents the approximate area in which the powder 12 can be melted and fused together by the energy system 22.

It should be noted that these zones may be spaced apart differently, oriented differently, or positioned differently from the non-exclusive example illustrated in FIG. 1B. Additionally, the relative sizes of the zones 16A, 18A, 20A, 22A may be different than what is illustrated in FIG. 1B.

In FIGS. 1A and 1B, in certain implementations, the processing machine 10 can be operated so that there is substantially constant relative motion along a moving direction 25 (illustrated by an arrow) between the object 11 being formed and one or more of the pre-heat device 16, the powder supply assembly 18, the measurement device 20, and the energy system 22. The moving direction 25 may include a rotation direction about a rotation axis 25A. With this design, the powder 12 may be deposited and fused relatively quickly. This allows for the faster forming of the objects 11, increased throughput of the processing machine 10, and reduced cost for the objects 11.

In the implementation illustrated in FIGS. 1A and 1B, the powder bed assembly 14 includes (i) a powder bed 26 that supports the powder 12 and the object 11 while being formed, and (ii) a device mover 28 (e.g. one or more actuators) that selectively moves the powder bed 26. In this implementation, the device mover 28 rotates the powder bed 26 about the rotation axis 25A relative to the pre-heat device 16 (and the pre-heat zone 16A), the powder supply assembly 18 (and the deposit zone 18A), the measurement device 20 (and the measurement zone 20A), and the energy system 22 (and the irradiation zone 22A). This allows nearly all of the rest of the components of the processing machine 10 to be fixed while the powder bed 26 is moved.

In the simplified schematic illustrated in FIGS. 1A and 1B, the powder bed 26 includes a build platform 26A and a support sidewall 26B. In this embodiment, the build platform 26A is flat disk shaped and has a support surface, and the support sidewall 26B is tubular shaped and extends upward from a perimeter of the support surface 26A. Alternatively, other shapes of the build platform 26A and the support sidewall 26B may be utilized. In some implementations, the build platform 26A is moved somewhat similar to a piston relative to the support sidewall 26B which act like as the piston's cylinder wall. For example, a platform mover (not shown) can selectively move the build platform 26A downward as each subsequent powder layer 13 is added.

In another implementation, the build platform 26A is flat, rectangular shaped, and the support sidewalls 26B are rectangular tube shaped and extends upward around the build platform 26A. Alternatively, other shapes of the build platform 26A and/or support sidewalls 26B may be utilized. As non-exclusive examples, the build platform 26A can be polygonal-shaped, with the support sidewalls 26B having the corresponding tubular-shape.

The device mover 28 can move the powder bed 26 at a substantially constant or variable angular velocity about the rotation axis 25A. As alternative, non-exclusive examples, the device mover 28 may move the powder bed 26 at a substantially constant angular velocity of at least approximately 2, 5, 10, 20, 30, 60, or more revolutions per minute (RPM). As used herein, the term "substantially constant angular velocity" shall mean a velocity that varies less than 5% over time. In one embodiment, the term "substantially constant angular velocity" shall mean a velocity that varies less 0.1 percent from the target velocity. The device mover 28 may also be referred to as a "drive device".

Additionally or alternatively, the device mover 28 may move the powder bed 26 at a variable velocity or in a stepped or other fashion. The rotation axis 25A may be aligned along with gravity direction, and may be along with an inclination direction about the gravity direction.

In FIG. 1A, the device mover 28 includes a motor 28A (i.e. a rotary motor) and a device connector 28B (i.e. a rigid shaft) that fixedly connects the motor 28A to the powder bed 26. In other embodiments, the device connector 28B may include a transmission device such as at least one gear, belt, chain, or friction drive.

The powder 12 used to make the object 11 is deposited onto the powder bed 26 in a series of powder layers 13. Depending upon the design of the processing machine 10, the powder bed 26 with the powder 12 may be very heavy. With the present design, this large mass may be rotated at a constant or substantially constant speed to avoid accelerations and decelerations, and the required motion is a continuous rotation of a large mass, with no non-centripetal acceleration other than at the beginning and end of the entire exposure process. The melting process may be performed during the period when the motion is constant velocity motion.

The pre-heat device 16 selectively preheats the powder 12 in the pre-heat zone 16A that has been deposited on the powder bed 26 during a pre-heat time. In certain embodiments, the pre-heat device 16 heats the powder 12 to a desired preheated temperature in the pre-heat zone 16A when the powder 12 is moved through the pre-heat zone 16A. The number of the pre-heat devices 16 may be one or plural.

In one embodiment, the pre-heat device 16 is positioned along a pre-heat axis (direction) 16B and is arranged between the measurement device 20 and the energy system 22. However, the pre-heat device 16 can be positioned at another location.

The design of the pre-heat device 16 and the desired preheated temperature may be varied. In one embodiment, the pre-heat device 16 may include one or more pre-heat energy source(s) 16C that direct one or more pre-heat beam(s) 16C at the powder 12. Each pre-heat beam 16D may be steered as necessary. As alternative, non-exclusive examples, each pre-heat energy source 16C may be an electron beam system, a mercury lamp, an infrared laser, a supply of heated air, thermal radiation system, a visual wavelength optical system or a microwave optical system. The desired preheated temperature may be 50 percent, 75 percent, 90 percent, or 95 percent of the melting temperature of the powder material used in the printing. It is understood that different powders have different melting points and therefore different desired pre-heating points. As a non-exclusive example, the desired preheated temperature may be at least 300, 500, 700, 900, or 1000 degrees Celsius.

The powder supply assembly 18 deposits the powder 12 onto the powder bed 26. In certain embodiments, the powder supply assembly 18 supplies the powder 12 to the powder bed 26 in the deposit zone 18A while the powder bed 26 is being moved to form each powder layer 13 on the powder bed 26.

In one implementation, the powder supply assembly 18 extends along a powder supply axis (direction) 18B and is arranged between the measurement device 20 and the energy system 22. The powder supply assembly 18 can include one or more powder containers (not shown in FIGS. 1A and 1B). The number of the powder supply assemblies 18 may be one or plural.

With the present design, the powder supply assembly 18 deposits the powder 12 onto the powder bed assembly 14 to sequentially form each powder layer 13. Once a portion of the powder layer 13 has been melted with the energy system 22, the powder supply assembly 18 evenly and uniformly deposits another (subsequent) powder layer 13.

It should be noted that the three-dimensional object 11 is formed through consecutive fusions of consecutively formed cross-sections of powder 12 in one or more powder layers 13. For simplicity, the example of FIG. 1A illustrates only a few, separate, stacked powder layers 13. However, it should be noted that depending upon the design of the object 11, the building process will require numerous powder layers 13.

A number of alternative powder supply assemblies 18 is described in more detail below. In these embodiments, the powder supply assembly 18 is an overhead powder supply that supplies the powder 12 onto the top of the powder bed assembly 14.

The measurement device 20 inspects and monitors the melted (fused) layers of the object 11 as that are being built, and/or the deposition of the powder layers 13. The number of the measurement devices 20 may be one or plural.

As non-exclusive examples, the measurement device 20 may include one or more optical elements such as a uniform illumination device, a structured illumination device, fringe illumination device, cameras that function at one or more wavelengths, lens, interferometer, or photodetector, or a non-optical measurement device such as an ultrasonic, eddy current, or capacitive sensor.

In one implementation, the measurement device 20 is arranged between the powder supply assembly 18 and the pre-heat device 16, however, the measurement device 20 may alternatively located.

The energy system 22 can selectively heat and melt the powder 12 in the energy zone 22A to sequentially form each of the layers of the object 11 while the powder bed 26 and the object 11 are being moved. The energy system 22 can selectively melt the powder 12 at least based on a data regarding to the object 11 to be built. The data may be corresponding to a computer-aided design (CAD) model data. The number of energy systems 22 may be one or plural.

In one embodiment, the energy system 22 is positioned along an energy axis (direction) 22B and is arranged between the pre-heat device 16 and the powder supply assembly 18. The design of the energy system 22 can be varied. In one embodiment, the energy system 22 may include one or more energy source(s) 22C ("irradiation systems") that direct one or more irradiation (energy) beam(s) 22D at the powder 12. The one or more energy sources 22C can be controlled to steer the energy beam(s) 22D to melt the powder 12.

As alternative, non-exclusives examples, each of the energy sources 22C can be designed to include one or more of the following: (i) an electron beam generator that generates a charged particle electron beam; (ii) an irradiation system that generates an irradiation beam; (iii) an infrared laser that generates an infrared beam; (iv) a mercury lamp; (v) a thermal radiation system; (vi) a visual wavelength system; (vii) a microwave wavelength system; or (viii) an ion beam system.

Different powders 12 have different melting points. As non-exclusive examples, the desired melting temperature may be at least 1000, 1400, 1700, 2000, or more degrees Celsius.

The control system 24 controls the components of the processing machine 10 to build the three-dimensional object 11 from the computer-aided design (CAD) model by successively melting portions of one or more of the powder layers 13. The control system 24 can be a distributed system.

The control system 24 may include, for example, a CPU (Central Processing Unit) 24A, a GPU (Graphics Processing Unit) 24B, and electronic memory 24C. The control system 24 functions as a device that controls the operation of the processing machine 10 by the CPU executing the computer program. This computer program is a computer program for causing the control system 24 (for example, a CPU) to perform an operation to be described later to be performed by the control system 24 (that is, to execute it). That is, this computer program is a computer program for making the control system 24 function so that the processing machine 10 will perform the operation to be described later. A computer program executed by the CPU may be recorded in a memory (that is, a recording medium) included in the control system 24, or an arbitrary storage medium built in the control system 24 or externally attachable to the control system 24, for example, a hard disk or a semiconductor memory. Alternatively, the CPU may download a computer program to be executed from a device external to the control system 24 via the network interface. Further, the control system 24 may not be disposed inside the processing machine 10, and may be arranged as a server or the like outside the processing machine 10, for example. In this case, the control system 24 and the processing machine 10 may be connected via a communication line such as a wired communications line (cable communications), a wireless communications line, or a network. In case of physically connecting with wired, it is possible to use serial connection or parallel connection of IEEE1394, RS-232x, RS-422, RS-423, RS-485, USB, etc. or 10BASE-T, 100BASE-TX, 1000BASE-T or the like via a network. Further, when connecting using radio, radio waves such as IEEE 802.1x, OFDM, or the like, radio waves such as Bluetooth (registered trademark), infrared rays, optical communication, and the like may be used. In this case, the control system 24 and the processing machine 10 may be configured to be able to transmit and receive various types of information via a communication line or a network. Further, the control system 24 may be capable of transmitting information such as commands and control parameters to the processing machine 10 via the communication line and the network. The processing machine 10 may include a receiving device (receiver) that receives information such as commands and control parameters from the control system 24 via the communication line or the network. As a recording medium for recording the computer program executed by the CPU, a CD-ROM, a CD-R, a CD-RW, a flexible disk, an MO, a DVD-ROM, a DVD-RAM, a DVD-R, a DVD+R, a DVD-RW, a magnetic medium such as a magnetic disk and a magnetic tape such as DVD+RW and Blu-ray (registered trademark), a semiconductor memory such as an optical disk, a magneto-optical disk, a USB memory, or the like, and a medium capable of storing other programs. In addition to the program stored in the recording medium and distributed, the program includes a form distributed by downloading through a network line such as the Internet. Further, the recording medium includes a device capable of recording a program, for example, a general-purpose or dedicated device mounted in a state in which the program can be executed in the form of software, firmware or the like. Furthermore, each processing and function included in the program may be executed by program software that can be executed by a computer, or processing of each part may be executed by hardware such as a predetermined gate array (FPGA, ASIC) or program software, and a partial hardware module that realizes a part of hardware elements may be implemented in a mixed form.

It should also be noted that with the unique design provided herein, multiple operations may be performed at the same time (simultaneously) to improve the throughput of the processing machine 10. Stated in another fashion, one or more of (i) pre-heating with the pre-heat device 16, (ii) measuring with the measurement device 20, (iii) depositing powder 12 with the powder supply assembly 18, and (iv) melting the powder with the energy system 22 may be partly or fully overlapping in time on different parts of the powder bed 26 to improve the throughput of the processing machine 10. For example, two, three, four, or all five of these functions may be partly or fully overlapping.

In certain implementations, the powder bed 26 may be moved down with the device mover 28 along the rotation axis 25A in a continuous rate via a fine pitch screw or some equivalent method. With this design, a height 29 between the most recent (top) powder layer 13 and the powder supply assembly 18 (and other components) may be maintained substantially constant for the entire process. Alternatively, the powder bed 26 may be moved down in a step down fashion at each rotation, which could lead to the possibility of a discontinuity at one radial position in the powder bed 26. As used herein, "substantially constant" shall mean the height 29 varies by less than a factor of three, since the typical thickness of each powder layer is less than one millimeter. In another embodiment, "substantially constant" shall mean the height 29 varies less than ten percent of the height 29 during the manufacturing process.

In this implementation, only the powder bed 26 is primarily moved, while everything else (pre-heat device 16, powder supply assembly 18, measurement device 20, energy system 22) are all fixed, making the overall system simpler. Also, the throughput of a rotary based powder bed 26 system is much higher since one or more steps can be performed in parallel rather than serially.

In the simplified example of FIG. 1A, the processing machine 10 additionally includes a component housing 30 that retains the pre-heat device 16, the powder depositor 18, the measurement device 20, and the energy system 22. Collectively these components may be referred to as the top assembly. Further, the processing machine 10 can include a housing mover 32 that can be controlled to selectively move the top assembly. The housing mover 32 and the device mover 28 may each include one or more actuators (e.g. linear or rotary). The housing mover 32 and/or the device mover 28 may be referred to as a first mover or a second mover.

It should be noted that processing machine 10 can be designed to have one or more of the following features: (i) one or more of the pre-heat device 16, the powder supply assembly 18, the measurement device 20, and the energy system 22 can be selectively moved relative to the component housing 30 and/or the powder bed 26 with one or more of the six degrees of freedom; (ii) the component housing 30 with one or more of the pre-heat device 16, the powder supply assembly 18, the measurement device 20, and the energy system 22 can be selectively moved relative to the powder bed 26 with one or more of the six degrees of freedom; and/or (iii) the powder bed 26 can be selectively moved relative to the component housing 30 with one or more of the six degrees of freedom.

In a specific, alternative implementation, the housing mover 32 can move the top assembly (or a portion thereof) upward (e.g. along and/or transverse to the rotation axis 25A) relative to the powder bed 26 at a continuous (or stepped) rate while the powder 12 is being deposited to maintain the desired height 29.

Additionally, or alternatively, the housing mover 32 can rotate the top assembly (or a portion thereof) relative to the powder bed 26 about the rotation axis 25A relative to the powder bed 26 during the printing of the object 11. In this implementation, the powder bed 26 can be stationary, rotated about the rotation axis in the clockwise direction, rotated about the rotation axis in the counterclockwise direction, and/or moved linearly along and/or transverse to the rotation axis 25A.

Stated in another fashion, the processing machine 10 illustrated in FIGS. 1A and 1B may be designed so that (i) the powder bed 26 is rotated about the Z-axis and moved along the rotation axis 25A; or (ii) the powder bed 26 is rotated about the rotation axis 25A, and the component housing 30 and the top assembly are moved along the rotation axis 25A only to maintain the desired height 29. In certain embodiments, it may make sense to assign movement along the rotation axis 25A to one component and rotation about the rotation axis 25A to the other.

Figure 2:
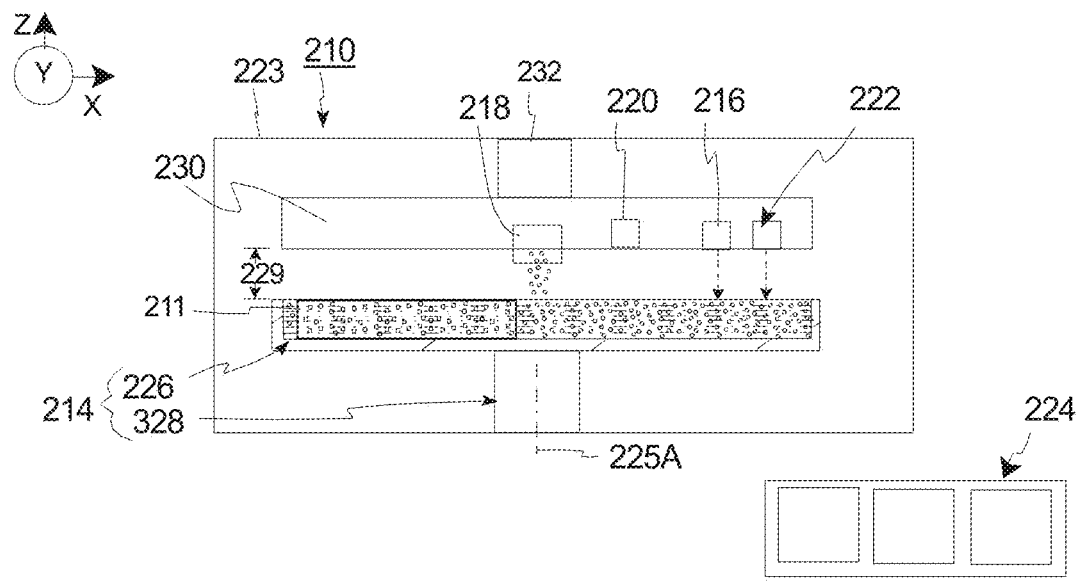
FIG. 2 is a simplified side view of another embodiment of a processing machine for making the object with a portion of the powder bed assembly illustrated in cut-away.

FIG. 2 is a simplified side view of another embodiment of a processing machine 210 for making the object 11 with a portion of the powder bed assembly 214 illustrated in cut-away. In this embodiment, the three-dimensional printer 210 includes (i) a powder bed assembly 214; (ii) a pre-heat device 216 (illustrated as a box); (iii) a powder supply assembly 218 (illustrated as a box); (iv) a measurement device 220 (illustrated as a box); (v) an energy system 222 (illustrated as a box); (vi) an environmental chamber 223; and (vii) a control system 224 that are somewhat similar to the corresponding components described above. However, in this embodiment, the powder bed 226 of the powder bed assembly 214 is stationary, and the housing mover 232 that moves the component housing 230 with one or more of the pre-heat device 216, the powder supply assembly 218, the measurement device 220, and the energy system 222 relative to the powder bed 226.

As a non-exclusive example, the housing mover 232 may rotate the component housing 230 with the pre-heat device 216, the powder supply assembly 218, the measurement device 220, and the energy system 222 (collectively "top assembly") at a constant or variable velocity about the rotation axis 225A. Additionally, or alternatively, the housing mover 232 may move the top assembly along the rotation axis 225A.

It should be noted that the processing machine 210 of FIG. 2 may be designed so that (i) the top assembly is rotated about the Z-axis and moved along the Z-axis to maintain the desired height 233 with the housing mover 232; or (ii) the top assembly is rotated about the Z-axis, and the powder bed 226 is moved along the Z-axis only with a device mover 228 to maintain the desired height 229. In certain embodiments, it may make sense to assign Z movement to one component and rotation to the other.

In this embodiment, the powder bed assembly 214 can be generally circularly disk shaped or rectangular shaped.

Figure 3:
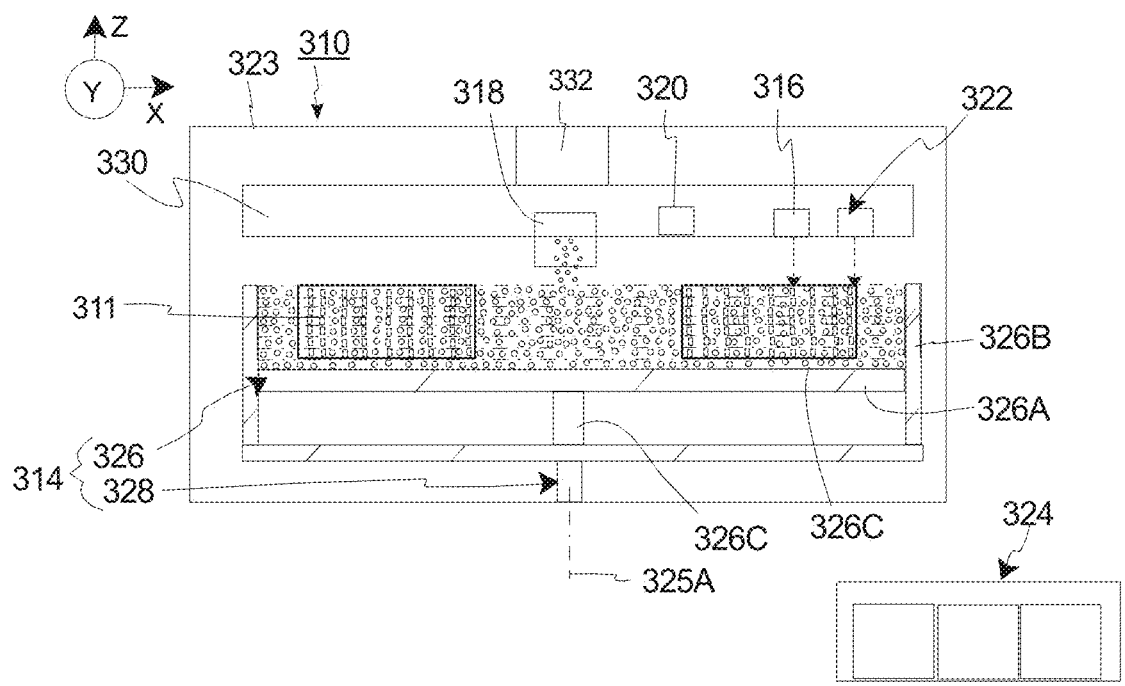
FIG. 3 is a simplified side view of another embodiment of a processing machine for making one or more objects with a portion of the powder bed assembly illustrated in cut-away.

FIG. 3 is a simplified side view of another embodiment of a processing machine 310 for making one or more object(s) 11 (two are illustrated) with a portion of the powder bed assembly 314 illustrated in cut-away. In this implementation, the three-dimensional printer 310 includes (i) a powder bed assembly 314; (ii) a pre-heat device 316 (illustrated as a box); (iii) a powder supply assembly 318 (illustrated as a box); (iv) a measurement device 320 (illustrated as a box); (v) an energy system 322 (illustrated as a box); (vi) an environmental chamber 323; and (vii) a control system 324 that are somewhat similar to the corresponding components described above. However, in this embodiment, the powder bed 326 includes a platform mover 326C in addition with the build platform 326A and the support sidewall 326B. In this implementation, the build platform 326A can be moved linearly downward as each subsequent powder layer is added relative to the support sidewall 326B with the platform mover 326C.

In alternative, non-exclusive implementations, the build platform 26A can have a build area 326C that is (i) flat, circular disk shaped with a corresponding circular tube shaped support sidewall 326B; (ii) flat rectangular shaped with a corresponding rectangular tube shaped support sidewall 326B, or (iii) polygonal-shaped with a corresponding polygonal tube shaped support sidewall 326B.

It should be noted that the processing machine 310 of FIG. 3 may be designed so that (i) one or more of the pre-heat device 316, the powder supply assembly 318, the measurement device 320, and the energy system 322 can be selectively moved relative to the component housing 330 and/or the powder bed 326 with one or more of the six degrees of freedom; (ii) the component housing 330 with one or more of the pre-heat device 316, the powder supply assembly 318, the measurement device 320, and the energy system 322 can be selectively moved relative to the powder bed 326 with one or more of the six degrees of freedom; and/or (iii) the powder bed 326 can be selectively moved relative to the component housing 330 with one or more of the six degrees of freedom.

Figure 4:
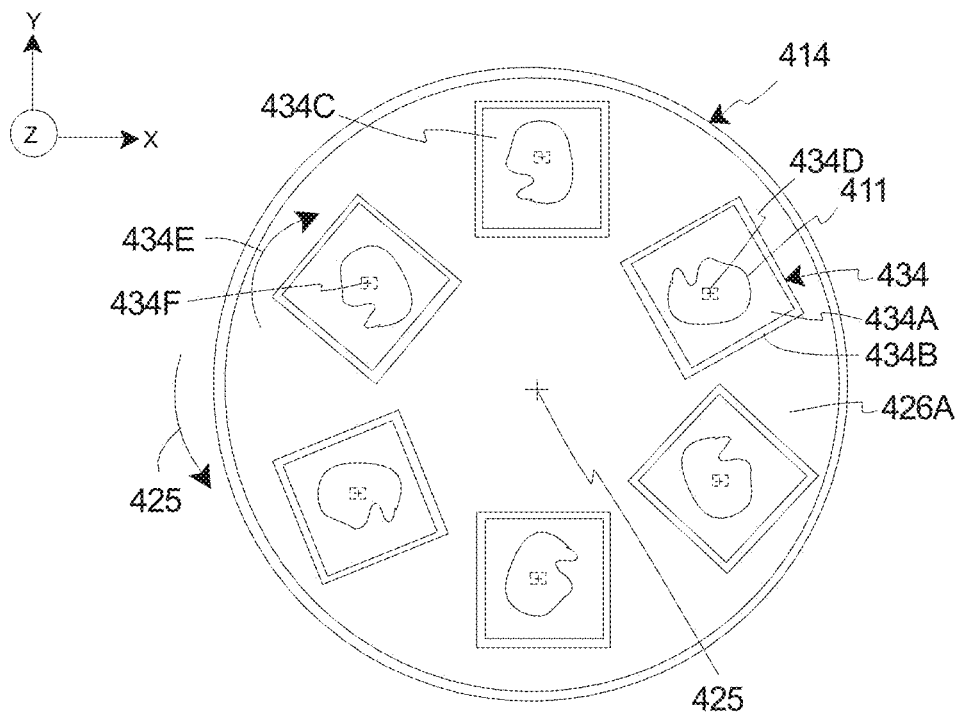
FIG. 4 is a simplified top illustration of a powder bed assembly that can be used in any of the processing machines that are described in this description.

FIG. 4 is a simplified top illustration of a powder bed assembly 414 that can be used in any of the processing machines 10, 210, 310 disclosed herein. In this embodiment, the powder bed assembly 414 can be used to make multiple objects 411 substantially simultaneously. The number of objects 411 that may be made concurrently can vary according the type of object 411 and the design of the processing machine 10, 210, 310. In FIG. 4, six objects 411 are made simultaneously. Alternatively, more than six or fewer than six objects 411 may be made simultaneously.

In FIG. 4, each of the objects 411 is the same design. Alternatively, for example, the processing machine 10, 210, 310 may be controlled so that one or more different types of objects 411 are made simultaneously.

In FIG. 4, the powder bed assembly 414 includes a relatively large support platform 426A, and a plurality of separate, spaced apart, build assemblies 434 that are positioned on and supported by the support platform 426A. The number of separate build assemblies 434 can be varied. In FIG. 4, the powder bed assembly 414 includes six separate build assemblies 414, one for each object 411. With this design, a single object 411 is made in each build assembly 434. Alternatively, more than one object 411 may be built in each build assembly 434. Still alternatively, the powder bed assembly 414 can include more than six or fewer than six separate build assemblies 434.

In one, non-exclusive embodiment, the support platform 426A with the build assemblies 434 can be rotated like a turntable during printing of the objects 411 in a moving direction 425 about a support rotation axis 425A (illustrated with a "+", e.g. the Z axis). Further, in this embodiment, the separate build assemblies 434 are positioned and spaced apart on the large common support platform 426A. As non-exclusive examples, the support platform 426A can be disk shaped or rectangular shaped.

As provided herein, each of the build assemblies 434 defines a separate, discrete build region. For example, each build assembly 434 can include a build platform 434A, and a sidewall assembly 434B. In one embodiment, each build assembly 434 is an open container in which the object 411 can be built. In this design, after the object 411 is printed, the build assembly 434 with the printed object 411 can be removed from the support platform 426A via a robotic arm (not shown in FIG. 4) and replaced with an empty build assembly 434 for subsequent fabrication of the next object 411.

As non-exclusive examples, each build platform 434A can define a build area 434C that is rectangular, circular, or polygonal shaped.

In an alternative embodiment, one or more of the build platforms 434A can be moved somewhat like an elevator vertically (along the Z-axis) relative to its sidewall assembly 434B with a platform mover 434D (illustrated in phantom with a box) during fabrication of the objects 411. Fabrication can begin with the build platform 434A placed near the top of the sidewall assembly 434B. The powder supply assembly (not shown in FIG. 4) deposits a thin layer of powder into each build assembly 434 as it is moved (e.g. rotated) below the powder supply assembly. At an appropriate time, the build platform 434A in each build assembly 434 is stepped down by one layer thickness so the next layer of powder may be distributed properly.

In some embodiments, one or more assembly movers 434D can be used to move (e.g. rotate) one or more of the build assemblies 434 relative to the support platform 426A and each other in a platform direction 434E about a platform rotation axis 434F (illustrated with a "+", e.g. the Z-axis). In one, non-exclusive example, the support platform 426A can be rotated (e.g., at a substantially constant rate) in the moving direction 425 (e.g. counterclockwise), and one or more of the build assemblies 434 can be moved (e.g. rotated) relative to the support platform 426A in the opposite direction 434E (e.g. clockwise) during the printing process. In this example, the rotational speed of the support platform 426A about the support rotational axis 425A can be approximately the same or different from the rotational speed of each build assembly 434 relative to the support platform 426A about the platform rotational axis 434F.

Alternatively, the support platform 426A can be rotated (e.g., at a substantially constant rate) in the moving direction 425 (e.g. counterclockwise), and one or more of the build assemblies 434 can be moved (e.g. rotated) relative to the support platform 426A in the same direction 434E (e.g. counterclockwise) during the printing process.

Figure 5:
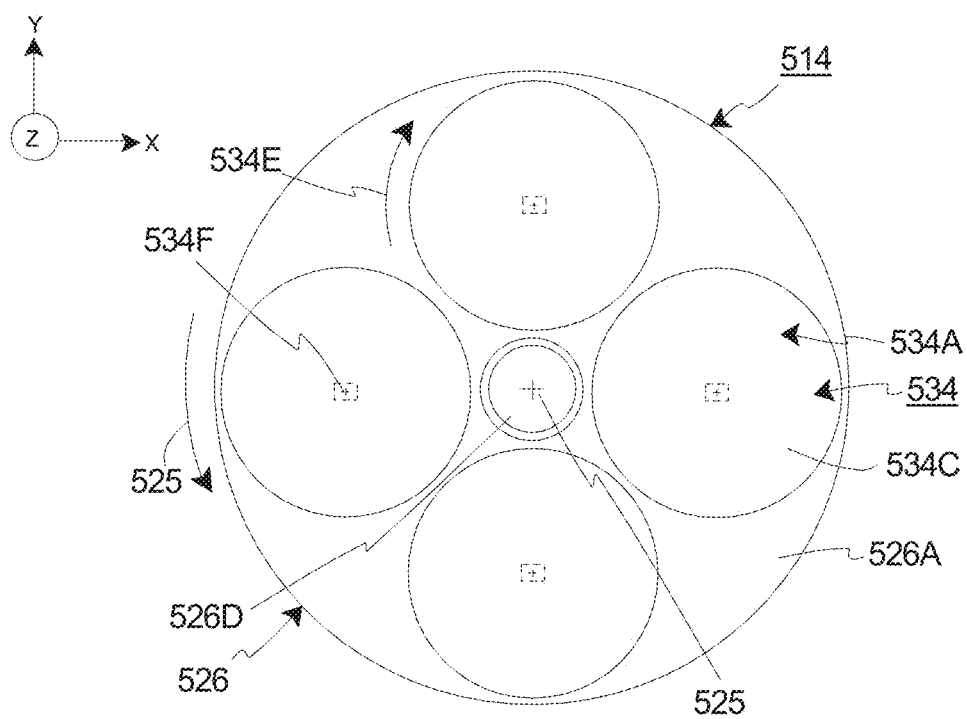
FIG. 5 is a simplified top illustration of another implementation of a powder bed assembly that can be used in any of the processing machines described in this description.

FIG. 5 is a simplified top illustration of another implementation of a powder bed assembly 514 that can be used in any of the processing machines 10, 210, 310 disclosed herein. In this implementation, the powder bed assembly 514 can be used to make multiple objects (not shown in FIG. 5) substantially simultaneously.

In FIG. 5, the powder bed assembly 514 includes a relatively large support platform 526A, and a plurality of separate, spaced apart, build assemblies 534 that are integrated into the support platform 526A. The number of separate build assemblies 534 can be varied. In FIG. 5, the powder bed assembly 514 includes four separate build assemblies 534. With this design, one or more objects can be made on each build assembly 534. Alternatively, the powder bed assembly 514 can include more than four or fewer than four separate build assemblies 534.

In FIG. 5, each build assembly 534 defines a separate build platform 534A that is selectively lowered like an elevator with a platform mover 534D (illustrated in phantom with a box) into the support platform 526A during the manufacturing process. With this design, the support platform 526A can define the support sidewall for each build platform 534A. Fabrication can begin with the build platform 534A placed near the top of the support platform 526A. The powder supply assembly (not shown in FIG. 5) deposits a thin layer of powder onto each build platform 534A as it is moved (e.g. rotated) below the powder supply assembly. At an appropriate time, each build platform 534A is stepped down by one layer thickness so the next layer of powder may be distributed properly.

In this Figure, each build platform 534A defines a circular shaped build area 534C that receives the powder (not shown in FIG. 5). Alternatively, for example, each build area 534C can have a different configuration, e.g. rectangular or polygonal shaped.

Additionally, the support platform 526A can be annular shaped and powder bed 526 can include a central, support hub 526D. In this implementation, there can be relative movement (e.g. rotation) between the support platform 526A and the support hub 526D. As a result thereof, one or more of the other components (e.g. the powder supply assembly) of the processing machine (not shown in FIG. 5) can be coupled to the support hub 526D.

In one, non-exclusive embodiment, the support platform 526A with the build assemblies 534 can be rotated like a turntable during printing of the objects in a moving direction 525 about the support rotation axis 525A (illustrated with a "+") relative to the support hub 526D.

In some embodiments, one or more platform movers 534D can be used to move (e.g. rotate) one or more of the build assemblies 534 relative to the support platform 526A and each other in a platform direction 534E about a platform rotational axis 534F (illustrated with a "+", e.g. along the Z-axis).

In one, non-exclusive example, the support platform 526A can be rotated (e.g., at a substantially constant rate) in the moving direction 525 (e.g. counterclockwise), and one or more of the build assemblies 534 can be moved (e.g. rotated) relative to the support platform 526A in the opposite direction 534D (e.g. clockwise) during the printing process. In this example, the rotational speed of the support platform 526A about the support rotational axis 525A can be approximately the same or different from the rotational speed of each build assembly 534 relative to the support platform 526A about the platform rotational axis 434F.

Alternatively, the support platform 526A can be rotated (e.g., at a substantially constant rate) in the moving direction 525 (e.g. counterclockwise), and one or more of the build assemblies 534 can be moved (e.g. rotated) relative to the support platform 526A in the same direction 534E (e.g. counterclockwise) during the printing process.

It should be noted that in FIGS. 4 and 5, that a separate platform mover 434D, 534D is used for each build assembly 434, 534. Alternatively, one or more actuators can be designed to concurrently move more than one build assembly 434,534.

Figure 6:
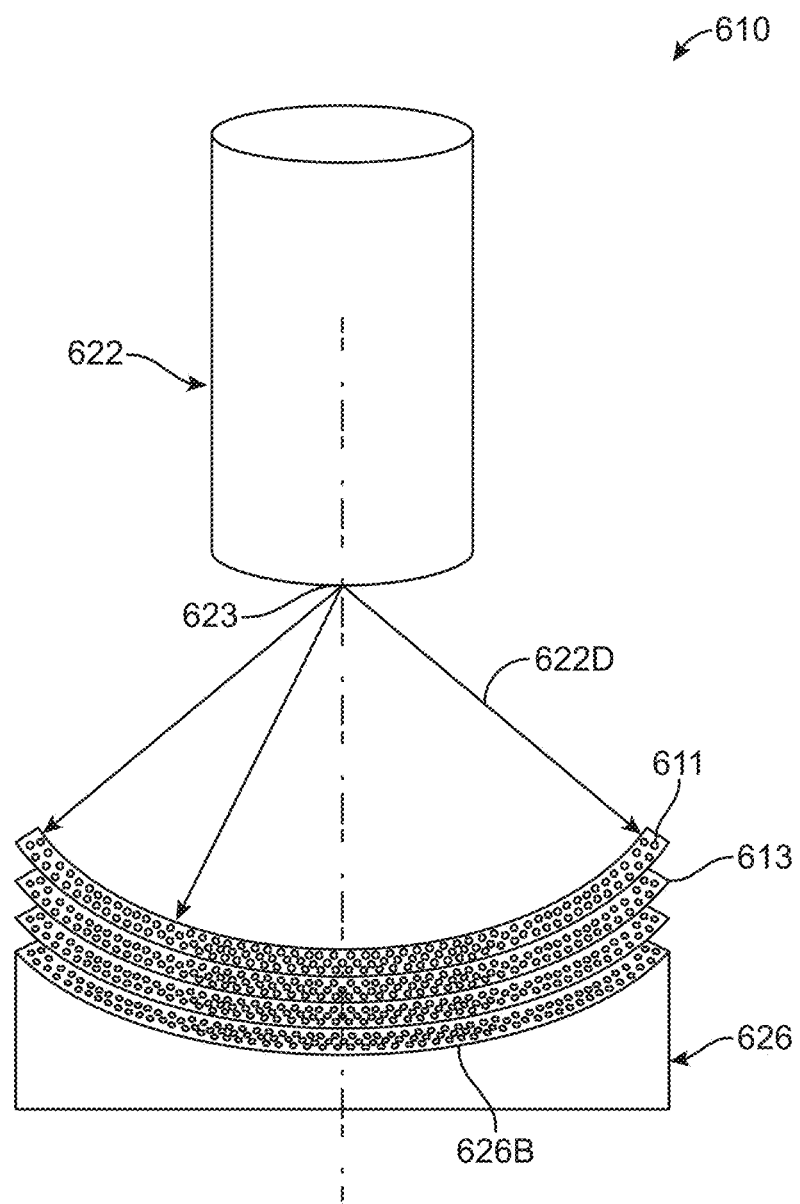
FIG. 6 is a simplified side illustration of a portion of yet another embodiment of the processing machine.

FIG. 6 is a simplified side illustration of a portion of yet another embodiment of the processing machine 610. In this embodiment, the processing machine 610 includes (i) the powder bed 626 that supports the powder 611; and (ii) the irradiation device 622. It should be noted that the processing machine 610 may include the powder depositor, pre-heat device, the cooler device, the measurement device, and the control system, that have been omitted from FIG. 6 for clarity. The powder depositor, the irradiation device 622, the pre-heat device, the cooler device, and the measurement device may collectively be referred to as the top assembly.

In this embodiment, the irradiation device 622 generates the irradiation energy beam 622D to selectively heat the powder 611 in each subsequent powder layer 613 to form the part. In the embodiment of FIG. 6, the energy beam 622D may be selectively steered to any direction within a cone-shaped workspace. In FIG. 6 three possible directions for the energy beam 622D are represented by three arrows.

Additionally, in FIG. 6, the support surface 626B of the powder bed 626 is uniquely designed to have a concave, curved shape. As a result thereof, each powder layer 613 will have a curved shape.

As provided herein, scanning the energy beam 622D across a large angle at a planar powder surface would create focus errors because the distance from the deflection center to the powder changes with the cosine of the deflection angle. To avoid focus errors, in one embodiment of the system shown in FIG. 6, the support surface 626B and each powder layer 613 have a spherical shape with the center of the sphere at the center of deflection 623 of the energy beam 622D. As a result thereof, the energy beam 622D is properly focused at every point on the spherical surface of the powder 611, and the energy beam 622D has a constant beam spot shape at the powder layer 613. In FIG. 6, the powder 611 is spread on the concave support surface 626B centered at a beam deflection center 623. For a processing machine 610 having a single irradiation energy source as illustrated in FIG. 6, the powder 611 may be spread over the single concave support surface 626B. Alternatively, for a processing machine 610 having multiple, irradiation energy sources, the powder 611 may optionally be spread on multiple curved surfaces, each centered on the deflection center 623 of the respective energy sources.

For an alternative embodiment of the processing machine 610 that uses linear scanning of the powder bed 626 (or the column) into and out of the page, the curved support surface 626B would be a cylindrical-shape. Alternatively, for an embodiment where the powder bed 626 is rotated about a rotation axis, the curved surface support surface 626B would be designed to have a spherical shape.

In these embodiments, the size and shape of the curved support surface 626B is designed to correspond to (i) the beam deflection of the energy beam 622D at the top powder layer 613, and (ii) the type or relative movement between the energy beam 622D and the powder layer 613. Stated in another fashion, the size and shape of the curved support surface 626B is designed so that the energy beam 622D has a substantially constant focal distance to the top powder layer 613 during relative movement between the energy beam 622D and the powder layer 613. As used herein, the term substantially constant focus distance shall mean variations in the focal distance of less than five percent. In alternative embodiments, the term substantially constant focus distance shall mean the focus distance changes no more than ten, five, four, three, two, or one percent.

In FIG. 6, the problem of building a three-dimensional printer 610 with focus variations caused by a large beam deflection angle is solved by providing at least one cylindrical or spherical, bowl-shaped support surface 626B that maintains a constant focal distance for the irradiation energy beam 622D. In other words, the embodiment of FIG. 6 includes the support device which includes a non-flat (e.g., the curved) support surface, the powder supply device which supplies the powder to the support device and which forms the curved powder layer, and the irradiation device which irradiates the curved powder layer. In this situation, the irradiation device sweeps the energy beam in at least a swept plane (e.g., the paper plane of FIG. 6), which includes a swept direction. And the curved support surface includes a curvature in the swept plane. The non-flat support surface may be a part of polygonal shape (a shape made of a plurality of straight lines which cross each other).

Figure 7A:
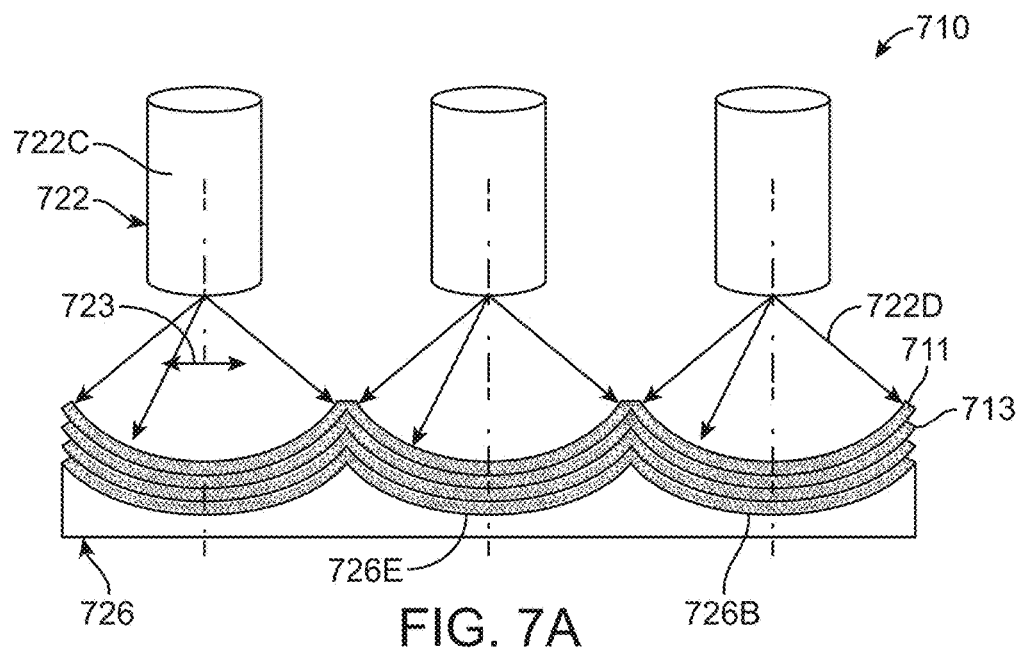
FIG. 7A is a simplified side illustration of a portion of yet another embodiment of the processing machine.

FIG. 7A is a simplified side illustration of a portion of yet another embodiment of the processing machine 710. In this embodiment, the processing machine 710 includes (i) the powder bed 726 that supports the powder 711; and (ii) the irradiation device 722. It should be noted that the processing machine 710 may include the powder depositor, pre-heat device, the cooler device, the measurement device, and the control system, that have been omitted from FIG. 7A for clarity. The powder depositor, the irradiation device 722, the pre-heat device, and the measurement device may collectively be referred to as the top assembly.

In this embodiment, the irradiation device 722 includes multiple (e.g. three) irradiation energy sources 722C that each generates a separate irradiation energy beam 722D that may be steered (scanned) to selectively heat the powder 711 in each subsequent powder layer 713 to form the part. In FIG. 7A, each energy beam 722D may be controllably steered throughout a cone-shaped workspace that diverges from the respective energy source 722C. In FIG. 7, the possible directions of each energy beam 722D are each represented by three arrows.

In FIG. 7A, the support surface 726B of the powder bed 726 is uniquely designed to have three concave, curved shaped regions 726E. Stated in another fashion, the support surface 726B includes a separate curved shaped region 726E for each irradiation energy source 722C. As a result thereof, each powder layer 713 will have a dimpled curved shape.

As provided above, scanning each energy beam 722D across a large angle would create focus errors if the surface of the powder 711 were a flat plane because the distance from the deflection center to the powder 711 would change with the cosine of the deflection angle. In the embodiment illustrated in FIG. 7, however, the powder 711 is spread on the three lobed, curved support surface 726B and the distance between the deflection center of each energy beam 722D and the surface of the powder 711 is constant so there are no significant focus errors.

In certain embodiments, such as a system where the powder support surface 726B is rotating in a manner similar to the previously described embodiments, it may be more practical to distribute the powder across a single curved spherical surface. In this case, the columns providing each energy beam 722D may be offset from each other in the vertical direction to more closely align the focal surface of each energy beam 722D with the powder surface. In other words, the shape of the surface of the powder 711 is not precisely matched to the focal distance of each energy beam 722D, but the deviations from optimal focus are small enough with respect to the depth of focus of each energy beam 722D that the proper part geometry may be formed in the powder 711.

The processing machine 710 illustrated in FIG. 7A, may be used with a linear scanning powder bed 726, or a rotating powder bed 726. For a rotating system, it may be preferable to distribute the multiple columns across the powder bed 726 radius, not its diameter. In this case, the powder bed axis of rotation would be at the right edge of the diagrams.

In these embodiments, the size and shape of the curved support regions 726E are designed to correspond to (i) the beam deflection of each energy beam 722D at the top powder layer 713, and (ii) the type of relative movement between the energy beam 722D and the powder layer 713. Stated in another fashion, the size and shape of each curved support region 726E is designed so that the energy beam 722D has a substantially constant focus distance at the top powder layer 713 during relative movement between the energy beam 722D and the powder layer 713. Stated in yet another fashion, the shape of the support region 726E, and the position of the energy beams 722D are linked to the type of relative movement between the support region 726E and the energy beams 722D so that the energy beams 722D have a substantially constant focus distance at the top powder layer 713.

Figure 7B:
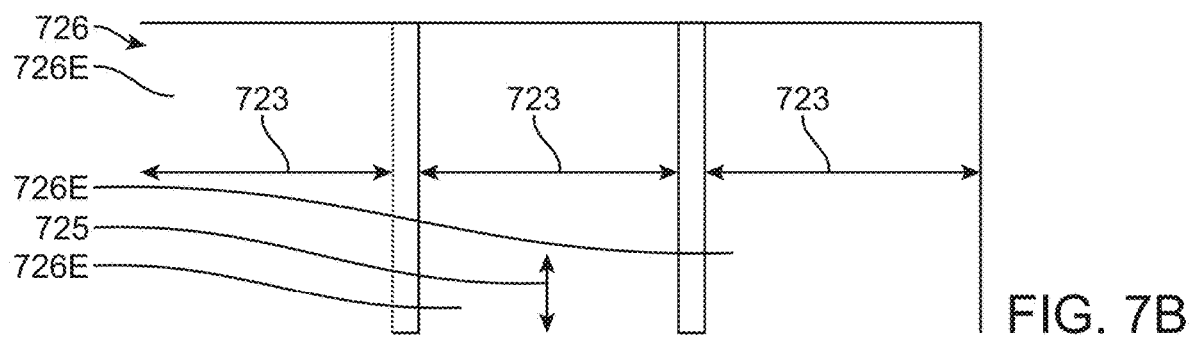
FIG. 7B is a top view of a support bed in which the curved support regions are shaped into linear rows.

For example, FIG. 7B is a top view of a support bed 726 in which the curved support regions 726E are shaped into linear rows. In this embodiment, there is linear relative movement along a movement axis 725 between the powder bed 726 and the irradiation device 722 (illustrated in FIG. 7A) while maintaining a substantially constant focus distance. A sweep (scan) direction 723 of each beam 722D (illustrated in FIG. 7A) is illustrated with a two-headed arrow in FIG. 7B.

Figure 7C:
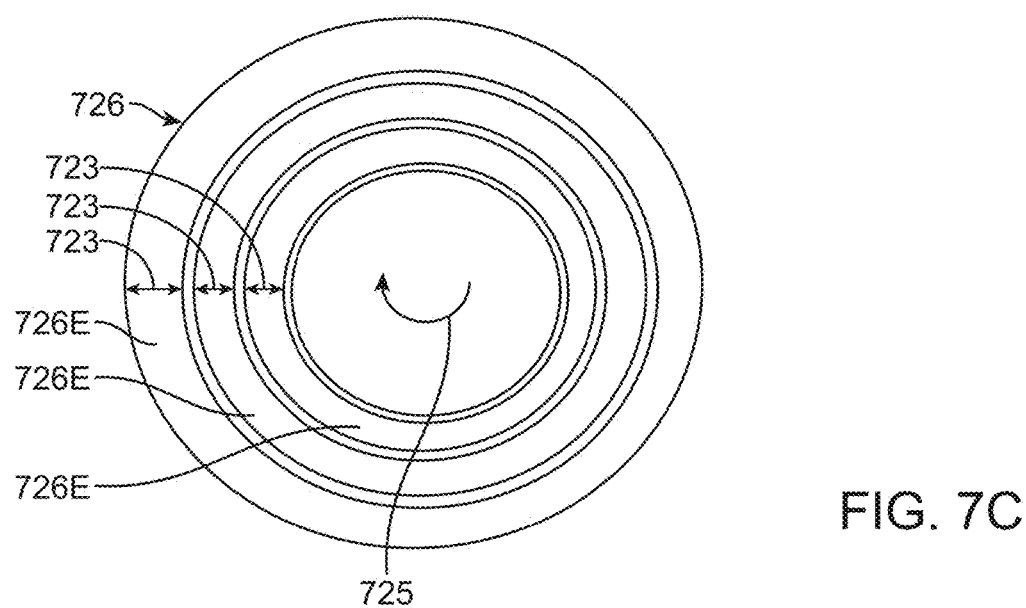
FIG. 7C is a top view of a support bed in which the curved support regions are shaped into annular rows.

Alternatively, for example, FIG. 7C is a top view of a support bed 726 in which the curved support regions 726E are shaped into annular rows. In this embodiment, there is rotational relative movement along a movement axis 725 between the powder bed 726 and the irradiation device 722 (illustrated in FIG. 7A) while maintaining a substantially constant focus distance. A sweep (scan) direction 723 of each beam 722D (illustrated in FIG. 7A) is illustrated with a two-headed arrow in FIG. 7C.

As provided herein, maintaining a constant focal distance will improve the part quality by controlling aberrations and the beam spot size.

Referring back FIG. 7A, in this embodiment, (i) the powder bed 726 has a non-flat support region (support surface) 726E, (ii) the powder supply device (not shown in FIG. 7A) supplies the powder 711 to the powder bed 716 to form the curved powder layer 713; and (iii) the irradiation device 722 irradiates the layer 713 with an energy beam 722D to form the built part (not shown in FIG. 7A) from the powder layer 713. In this embodiment, the non-flat support surface 726E may have a curvature. Further, the irradiation device 722 may sweep the energy beam 722D back and forth along a swept direction 723, and wherein the curved support surface 726E includes the curvature in a plane where the energy beam 722D pass through.

Figure 8:
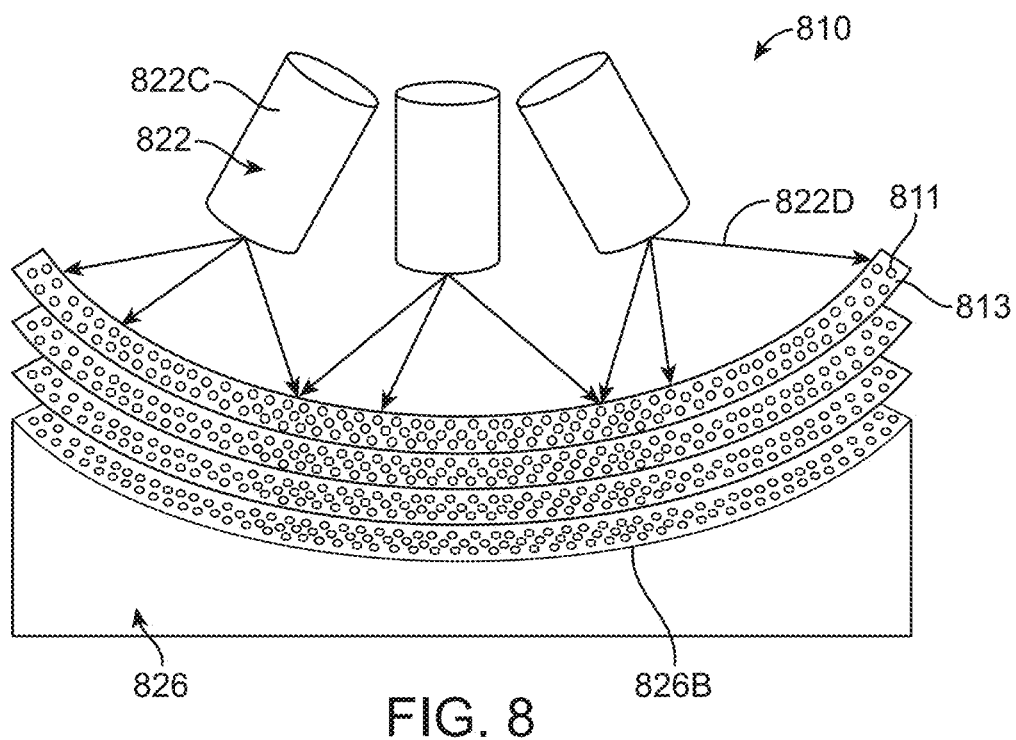
FIG. 8 is a simplified side illustration of a portion of still another embodiment of the processing machine.

FIG. 8 is a simplified side illustration of a portion of still another embodiment of the processing machine 810. In this embodiment, the processing machine 810 includes (i) the powder bed 826 that supports the powder 811; and (ii) the irradiation device 822 that are somewhat similar to the corresponding components described above and illustrated in FIG. 7A. It should be noted that the processing machine 810 may include the powder depositor, pre-heat device, the cooler device, the measurement device, and the control system, that have been omitted from FIG. 8 for clarity. The powder depositor, the irradiation device 822, the pre-heat device, and the measurement device may collectively be referred to as the top assembly.

In this embodiment, the irradiation device 822 includes multiple (e.g., three) irradiation energy sources 822C that each generates a separate irradiation energy beam 822D that may be steered (scanned) to selectively heat the powder 811 in each subsequent powder layer 813 to form the part. In FIG. 8, each energy beam 822D may be controllably steered throughout a cone-shaped workspace that diverges from the respective energy source 822C. In FIG. 8, the possible directions of each energy beam 822D are each represented by three arrows.

In FIG. 8, the support surface 826B of the powder bed 826 is uniquely designed to have a large concave curved surface. Stated in another fashion, the support surface 826B is curved shaped.

As provided above, scanning each energy beam 822D across a large angle would create focus errors if the surface of the powder 811 were a flat plane because the distance from the deflection center to the powder 811 would change with the cosine of the deflection angle. In the embodiment illustrated in FIG. 8, however, the powder 811 is spread on the curved support surface 726B, and the irradiation energy sources 822C are tilted relative to each other so that the distance between the deflection center of each energy beam 822D and the surface of the powder 811 is substantially constant, so there are no significant focus errors.

In the embodiment illustrated in FIG. 8, the powder support surface 826B is rotating in a manner similar to the previously described embodiments, and the powder 811 is distributed across a single curved spherical surface 826B. In this case, the columns providing each energy beam 822D may be offset from each other in the vertical direction (and angled) to more closely align the focal surface of each energy beam 822D with the powder surface. In other words, the shape of the surface of the powder 811 is not precisely matched to the focal distance of each energy beam 822D, but the deviations from optimal focus are small enough with respect to the depth of focus of each energy beam 822D that the proper part geometry may be formed in the powder 811.

The processing machine 810 illustrated in FIG. 8, may be used with a linear scanning powder bed 826, or a rotating powder bed 826. In these embodiments, the size and shape of the curved support surface 826B is designed and the irradiation energy sources 822C are oriented and positioned (i) so that each energy beam 822D has a substantially constant focus distance at the top powder layer 813, and (ii) to match the type of relative movement between the energy beam 822D and the powder layer 813. Stated in yet another fashion, the shape of the support region 826E, and the position of the energy beams 822D are linked to the type of relative movement between the support region 826E and the energy beams 822D so that the energy beams 822D have a substantially constant focus distance at the top powder layer 813.

Figure 9:
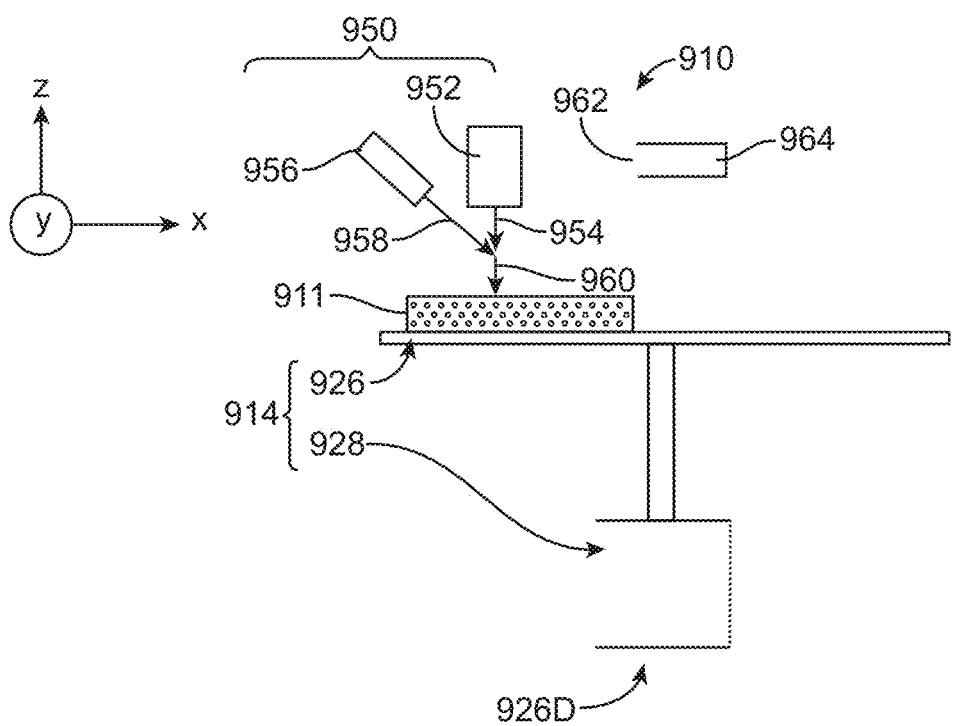
FIG. 9 is a simplified side perspective illustration of a portion of yet another embodiment of the processing machine for making a three-dimensional part.

FIG. 9 is a simplified side perspective illustration of a portion of yet another embodiment of the processing machine 910 for making a three-dimensional part 911. In this embodiment, the processing machine 910 is a wire feed, three-dimensional printer that includes (i) the material bed assembly 914 that supports the three-dimensional part 911; and (ii) a material depositor 950.

In FIG. 9, the material bed assembly 914 includes the material bed 926 and a device mover 928 that rotates the material bed 926 about the support rotation axis 926D.

Further, in FIG. 9, the material depositor 950 includes (i) an irradiation device 952 that generates an irradiation energy beam 954; and (ii) a wire source 956 that provides a continuous feed of wire 958. In this embodiment, the irradiation energy beam 954 illuminates and melts the wire 958 to form molten material 960 that is deposited onto the material bed 926 to make the part 911.

As provided herein, the problem of manufacturing high precision rotationally symmetric parts 911 by three-dimensional printing is solved by using a rotating material bed 926 (build platform), the wire source 956 (wire feed mechanism) that supplies the wire 958, and the irradiation energy beam 954 for melting the wire 958.

In one embodiment, as the material bed 926 is rotated about the rotation axis 926D, the material depositor 950 may provide the molten material 960 to form the part 911. Further, material depositor 950 (irradiation device 952 and wire source 956) may be moved transversely (e.g., along arrow 962) with a depositor mover 964 relative to the rotating material bed 926 to build the part 911. Further, the material bed 926, the material depositor, or both 950 may be moved vertically (e.g., by one of the movers 928, 964) to maintain the desired height between the material depositor 950 and the part 911.

Alternatively, the depositor mover 964 may be designed to rotate the material depositor 950 about a rotation axis and move the material depositor 950 transversely to the rotation axis relative to the stationary material bed 926. Still alternatively, the depositor mover 964 may be designed to rotate the material depositor 950 about a rotation axis relative to the material bed 926, and the material bed 926 may be moved transversely to the rotation axis with the device mover 928.

Round, substantially rotationally symmetric parts 911 may be built by rotating the material bed 926 and depositing metal by using the energy beam 954 to melt the wire feed 958. The basic operation is analogous to a normal metal cutting lathe, except that the "tool" is depositing metal 960 instead of removing it.

Those of ordinary skill in the art will realize that the following detailed description of the present embodiment is illustrative only and is not intended to be in any way limiting. Other embodiments of the present embodiment will readily suggest themselves to such skilled persons having the benefit of this disclosure. Reference will now be made in detail to implementations of the present embodiment as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Powder Bed Monitor

The measurement device (e.g., measurement device 20, measurement device 220, measurement device 320, etc.) mentioned above may scan a spot of light across the powder bed and may collect and process specularly reflected light, scattered light, backscattered light, or any combination of these to obtain spot position, reflectance, scatter distribution, time of flight, or any combination of these, which can be used to infer bed topography, melt region geometry, temperature, powder quality, or any combination of these. Typically, the measurement device may scan the spot of light across the moving direction within a measurement zone (e.g., measurement zone 20A). The spot may have a certain dimension (size). Ideal three-dimensional (3D) printing may typically requires several conditions of the powder bed.

The temperature should be within an acceptable range.
Powder surface should be flat within an acceptable range (e.g. 5-10 micrometers).
Powder particle sizes should be consistent (e.g., within 1%).

Therefore, some apparatus that can monitor these conditions and provide feedback so they can be maintained while the printing process is occurring. In addition, the same apparatus should provide information about the geometry of the as-built shape.

This idea of the disclosed is to scan a spot of light across the surface of the powder and detect the scattered/reflected light in multiple ways to obtain the needed information.

Laser Radar—Topography and As-Built Geometry

If the source is properly conditioned and the backscattered light is collected (with an appropriately placed beam splitter) then the time of flight can be measured and the bed surface topography can be determined. If incoherent laser radar is used, the resolution can be a few tens of microns, but coherent laser radar (also known as Fourier domain optical coherence tomography (OCT)) can provide about 1 micrometer (or even 0.1 micrometers) resolution.

Since the amplitude of the scattered light will be different in melted/fused regions allowing estimation of the as-built geometry (layer by layer).

Spot Image Position—Topography

The source direction and imaging (non-backscatter) direction can be configured to estimate the topography of the powder bed. For example, if the light is directed from a known off-normal direction, but the imaging system that collects the scattered light is imaging from another known direction and location, then the position of the spot (on the detector) can be used to estimate the position at which it was scattered. A scanned spot, in this manner, can then be used to build a map of the powder bed surface.

Spot Brightness-As-Built Geometry

Furthermore, since the amplitude of scattered light will change drastically when the powder is fused (i.e., melted), the spot image intensity can be processed to provide a layer-by-layer map of the as-built geometry.

Scatter Distribution—Powder Quality and Temperature

By collecting the distribution of scattered light (with a large numerical aperture (NA) system, or a series of sensors), estimates of the scatter distribution can be made and inferences of the particle size and temperature (which will change the refractive index surface reflectance) can be made by comparing to a Mie scatter model or calibration measurements of well-characterized powders.

Additional Embodiments

The spot projection system may be configured in many ways. It may, for example, be projected at a single angle by placing the scan mirror at the focus of a parabolic reflector. If the powder bed moves, then the scan mirror could be one-dimensional and the parabolic reflector may be a narrow strip. Also, if the angle of projection is very off-normal 70 degrees), then the scan mirror could also be quite narrow in the other direction.

Alternatively, the scanning system could be non-telecentric (not a single angle of incidence), which could have the advantage of no optics between the scan mirror and the powder bed. This arrangement would slightly complicate topography measurement since a same spot-shift will imply a different powder bed height at different positions in the field of view.

Multiple detection schemes are highly desirable because they should lead to higher signal-to-noise (SNR), particularly for spot position-dependent topography measurements and powder quality measurements. Improved productivity is thereby possible because this information can be used as feedback to control the printing process for maximum speed and fewer errors.

What is disclosed is:
1. A system for 3D printing that includes:
A powder bed monitor, wherein the powder bed monitor scans a beam of light across a surface of a powder to measure the surface.
2. A system of 1, where the powder bed monitor includes a laser radar.
3. A system of 2, wherein the laser radar measures a time of flight of the beam of light backscattered from the surface of the powder.
4. A system of 2, where the laser radar includes a coherent laser radar.
5. A system of 1, where the powder bed monitor includes a spot image position system.
6. A system of 1, where the powder bed monitor includes a spot brightness system.
7. A system of 1, where the powder bed monitor includes a scatter distribution system.
8. A system of 1, where the powder bed monitor includes an interferometric system.

Fringe Projection for Real-Time, Single Layer Metrology for a 3D Printer

When a fringe projection system is used as the measuring device (e.g., measurement device 20, measurement device 220, measurement device 320, etc.), the 3D topography of every printed layer in a 3D (additive manufacturing) printer can be obtained without a decrease in throughput.

3D printers work by building a part one layer at a time, allowing for shapes (including cavities) that could not be made any other way. Metrology of such a finished part is difficult because some of the part is not accessible by anything other than x-rays. Using x-ray computed tomography (CT) to measure every part is expensive and time-consuming and subject to errors, especially for high-density metal parts.

Some solutions have proposed using fringe projection to make measurements of a stationary powder bed by sequentially phase shifting the fringes across the powder bed in time. This works, but it requires 4-7 images to be taken while the powder bed is stationary, which will slow down the 3D printing process considerably.

Metal 3D printing routinely takes 8+ hours; adding another 4 hours for metrology is untenable.

The technique disclosed herein uses a fringe scan method of fringe projection to measure the powder bed. This technique can be used to either measure the powder bed after the powder is deposited but before the 3D printing step, to verify powder spreading was correct. And/or, it can be used to measure the 3D printed layer after it has been printed/melted.

Figure 10A:
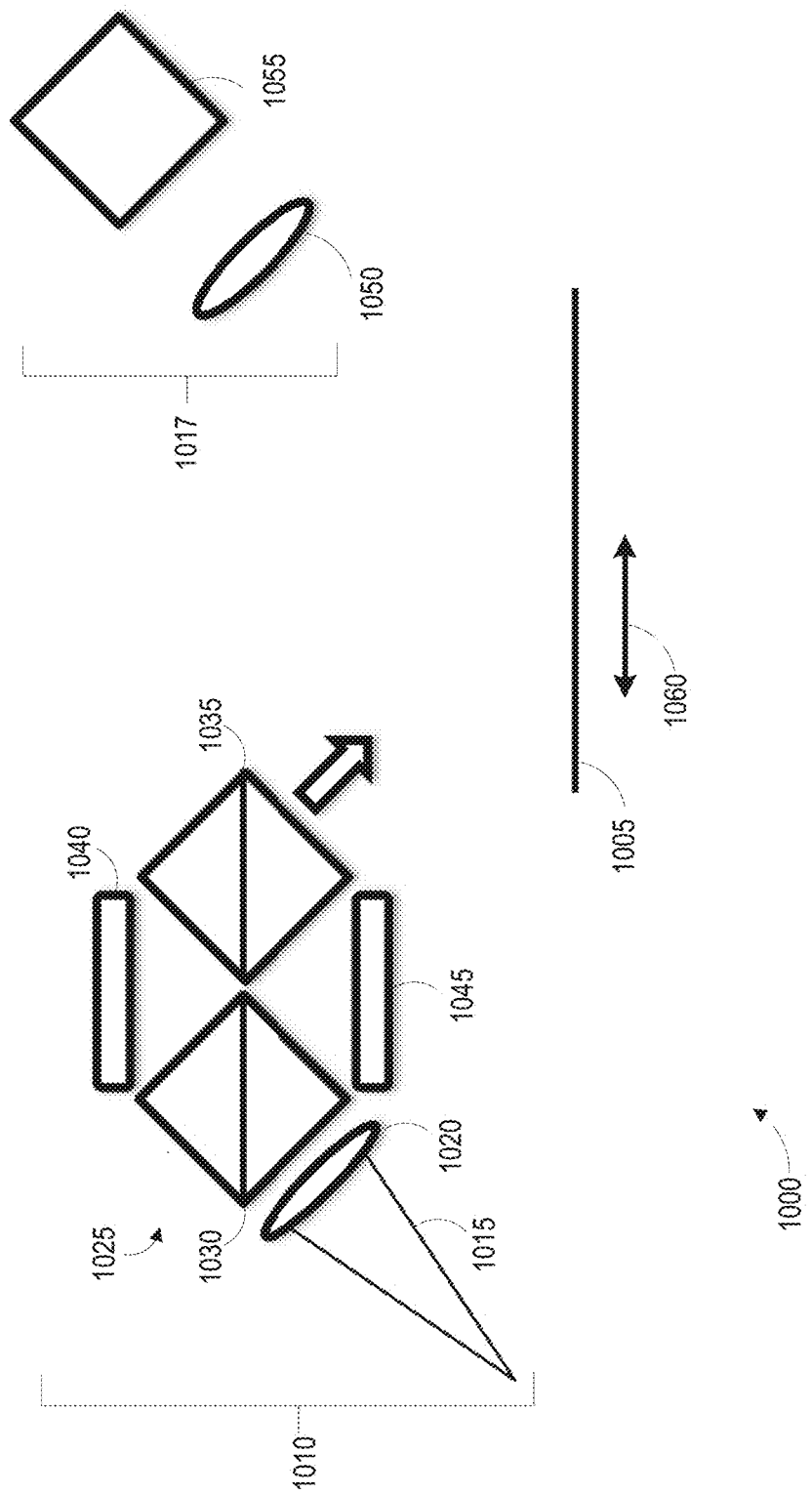
FIGS. 10A and 10B show an example of a fringe projection system used to illuminate the powder bed.

FIG. 10A shows an example of a fringe projection system that can be used to illuminate a powder bed 1005 of a three-dimensional printing system 1000 and make metrology measurement of the powder bed, a part being printed in the powder bed, or both. Fringe projection system 1000 includes a projection system 1010 and an observation system 1015. The projection system is optically coupled to the observation system via the powder bed.

Projection system 1010 includes a light source 1015, a lens system 1020 (e.g., a collimating lens), and an interferometer 1025. Light source 1015 may include one or more optical fibers and one or more light generators, such as one or more lasers (e.g., diode lasers). Light source 1015 may be optically coupled to lens system 1020 and may transmit generated light through the lens system to the interferometer.

Interferometer 1010 may be a Mach-Zehnder interferometer or another type of interferometer. The interferometer includes a first beam splitter 1030, a second beam splitter 1035, a first mirror 1040, and a second mirror 1045.

In an implementation, one of the first or second mirrors is set at a predetermined angle with respect to the optical axis of light received from the first beam splitter such that light (e.g., two beams) reflected from the first mirror and light reflected from the second mirror interfere. Specifically, by using a Mach-Zehnder interferometer, the custom amount of tilt introduced by one of the mirrors, and the two interfering beams being transmitted from the interferometer, a fringe pattern is created on the powder bed. The fringe pitch and orientation of the fringe pattern on the powder bed can be dynamically set to change the sensitivity of metrology measurements made by the system.

In an embodiment, observation system 1017 includes a lens system 1050 and a camera 1055. A lens system may include a set of lenses (e.g., one or more lenses) or a number of lenses (e.g., two or more lenses). The observation system can be looking down (at normal incidence), or, as shown in FIG. 10A, at an off-axis angle (i.e., at an inclined incidence). Lens system 1050 of the observation system can collect light scattered from the powder and image the fringe patterns reflected from the powder bed on a detector array of the camera. The observation system looks at the scattered light, so it does not need to be at the same angle as the projection system (an optical axis of the observation system may not be a relationship of regular reflection to an optical axis of the projection system). The projection system does need to illuminate the fringes at an angle so that there is sensitivity to height changes of the powder bed, a part being printed in the powder bed, or both. The powder bed can be translated (translation directions 1060) so that the fringe patterns illuminate different portions of the powder bed or a part in the powder bed so that the height and height changes of different portions of the powder bed and part can be determined by the system and can be measured by the system as a layer of the part are printed and the height of the top of the part changes. That is, the fringes in the fringe pattern projected on the powder bed and part will change as the height of the part changes.

For example, the sensitivity of the fringe projection works by converting the measured irradiance values, with a known (or calculated) phase shift between subsequent measurements of the same location on the powder bed or substrate, into the phase of the fringe. This is done using phase-shifting interferometry algorithms or Least Squares Phase Shifting Interferometry (LSPSI) algorithms. The phase, which is a value that is modulo 2pi, needs to be converted into height, in microns. This is done using Equation 1, where Twafer is the pitch of the fringes on the substrate in the plane made by the optical axis of the projection system and the normal to the substrate. θ is the average angle of incidence of the two projected plane waves relative to the substrate normal. Zperiod is the distance the substrate has to move in z for the fringe pattern to shift one full period. So, conversion from phase into Z is done by taking $\varphi*(Zperiod/2\pi)$. This is shown graphically in FIG. 10B. As described above, the fringes of the fringe pattern are created on the surface under test by the interferometer that splits a beam and causes the split beams to interfere with each other. The optical elements of the observation system 1017 may focus the beam at the detector array of the camera such that the fringes on the system under test are imaged on the detector array.

Appendix Equation 1:

$$Z_{Period} = \frac{T_{Wafer}\tan(90-\theta)}{2}$$

Figure 11:
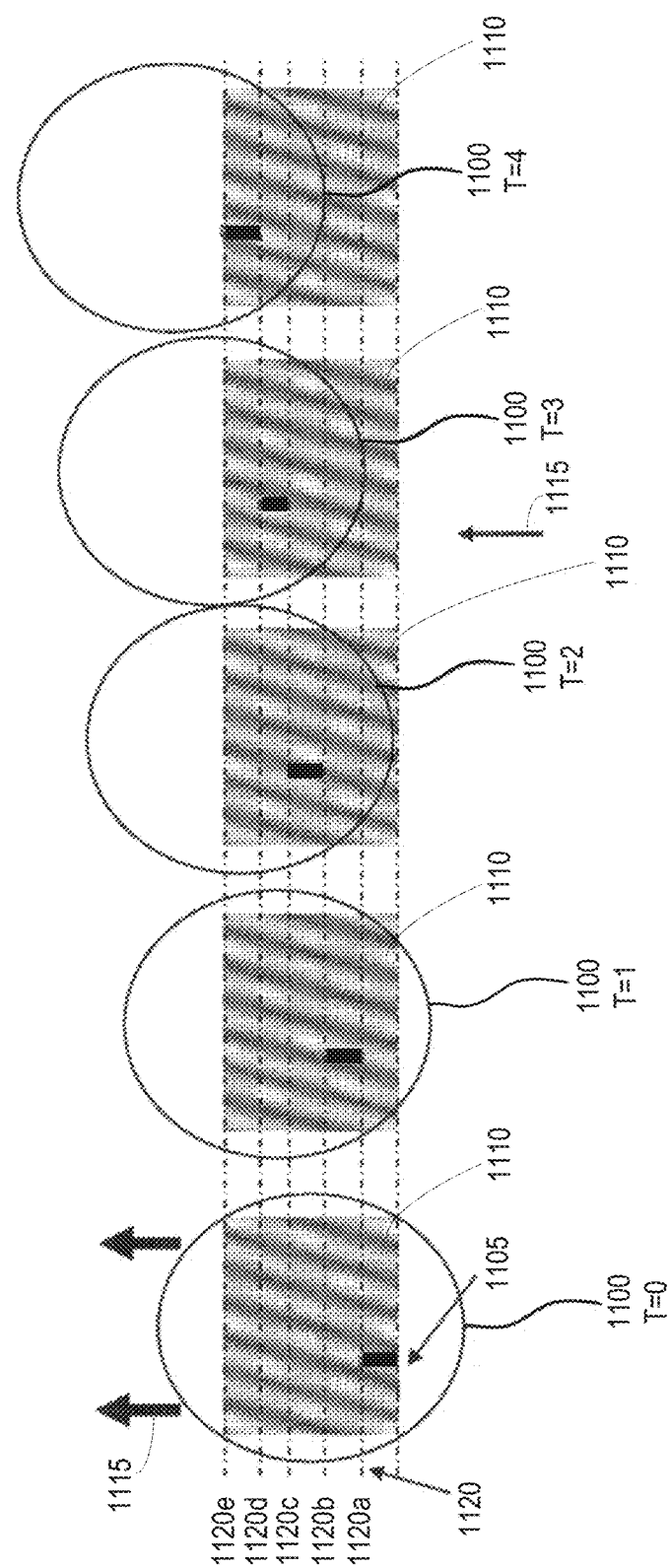
FIG. 11 shows the concept of a fringe scan. A region of interest is indicated as a small black rectangle that is the same location on the powder bed (powder layer) for all five images.

FIG. 11 shows the concept of a fringe scan of a powder bed 1100. The region of interest 1105 on the powder bed is indicated as a small black rectangle that is the same location on the powder bed (substrate) for all 5 images of the bed. The fringe pattern 1110 that is projected is fixed. As the substrate moves in y (indicated by reference numeral 1115), it is measured with a different fringe phase. Each location on the substrate is measured at least 5 times, and the phase shift of the fringes of the fringe pattern of the region of interest between images for a given substrate location can be π/2, π/3, or some other fraction of 2π without any moving parts other than the substrate motion. In the particular example shown in FIG. 11, the left-most fringe patterns is for a time t=0 and phase 0, the next fringe pattern is for a time t=1 and phase π/2, the next fringe pattern is for a time t=2 and phase π, the next fringe pattern is for a time t=3 and phase 3π/2, and the last and most right fringe pattern is for a time t=4 and phase 2π where the lengths of time T are arbitrary.

The only requirement is that the phase shift not be equal to pi, or a*π, where "a" cannot be less than about 1.1 and greater than about 0.9. In a 3D printer that already moves the substrate in order to do the 3D printing, there is no extra motion required to make the fringe projection measurement illustrated in FIG. 11. This means there is no extra time taken to make the measurement.

The horizontal rows 1120 in FIG. 11 represent the adjacent rows of a detector array (e.g., CCD) of a camera, such as camera 1055 shown in FIG. 10. In the example of FIG. 11, the particular adjacent rows are labeled with reference numeral 1120a, 1120b, 1120c, 1120d, and 1120e. The array will typically include more rows than shown in FIG. 11. Thus, FIG. 11 not only illustrates movement of the powder bed across the fringe pattern but also illustrates image capture by the detector array rows of the movement of the powder bed across the fringe pattern.

Figure 12:
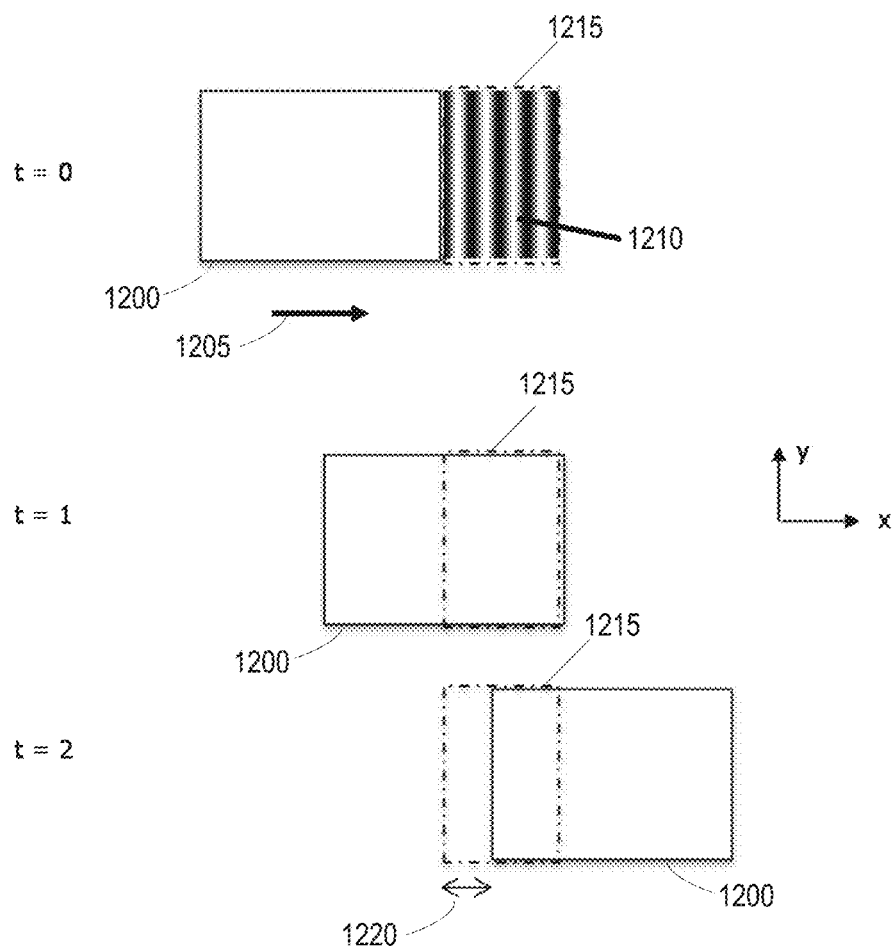
FIG. 12 shows an example of a linear powder bed, where the powder bed (powder layer) scans in x under the fringe pattern.

FIG. 12 shows a linear powder bed 1200, where the substrate (powder bed) scans in the x-direction 1205 under the fringe pattern 1210. The dashed box 1215 in FIG. 12 represents the field of view of interest of the fringe projection system. At t=2 (note the times represented in this Figure are different from those in FIG. 11), the powder bed does have to over scan 1210 by the amount shown. The amount of over scan is sufficient such that the far left edge of the powder bed moves across at least 1 full period of the projected fringes. As long as the scan of the fringe pattern on the powder bed goes this far (e.g., this much over scan), then the data collected by the camera (e.g., camera 1055 shown in FIG. 10) can be used to measure the height of the powder bed, three-dimension printed part in the powder bed, or both. Thus, the linear scan can reverse for the next powder layer to be deposited. In some embodiments, the example shown in FIG. 12 is combined with the example shown in FIG. 4. In this case, the measuring device (the fringe projection system) translates across powder bed 426 and measures the powder bed across support surface 426B. In the FIG. 12, a plurality of periods of the fringes are formed in the field of view of interest 1215, however a part of one cycle of fringe may be formed in the field of view of interest 1215.

Figure 13A:
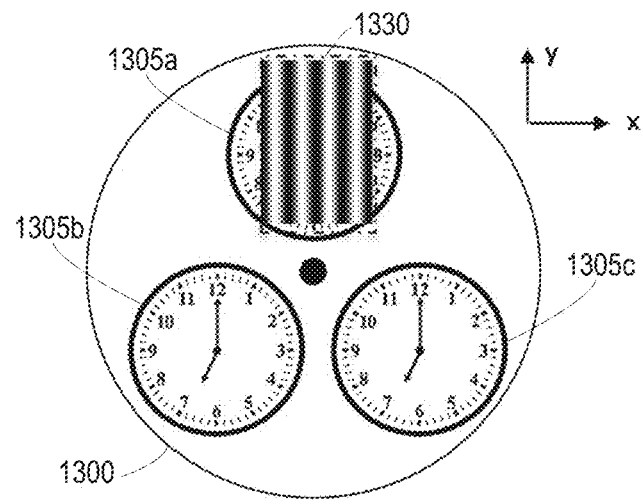
FIGS. 13A and 13B show an exemplary rotary powder bed system having three print regions contained inside a drum that rotates about the center axis.

FIG. 13A shows a rotary powder bed system 1300 where there are three print regions 1305a, 1305b, and 1305b (represented by clock faces) that are contained inside a drum (e.g., powder bed) that rotates (e.g., rotation direction 1320) about a center axis 1310. In this example, the three print regions 1305a, 1305b, and 1305b always keep their orientations with the 12 in the +y direction. That is, as the powder bed rotates, the regions of interest rotate relative to the powder bed rotate to maintain a fixed orientation in space. Stated alternatively, the regions of interest do not rotate in space. However, this idea would also work if the drum simply rotated about the center axis as one, with the clock faces also rotating once per cycle.

Figure 13B:
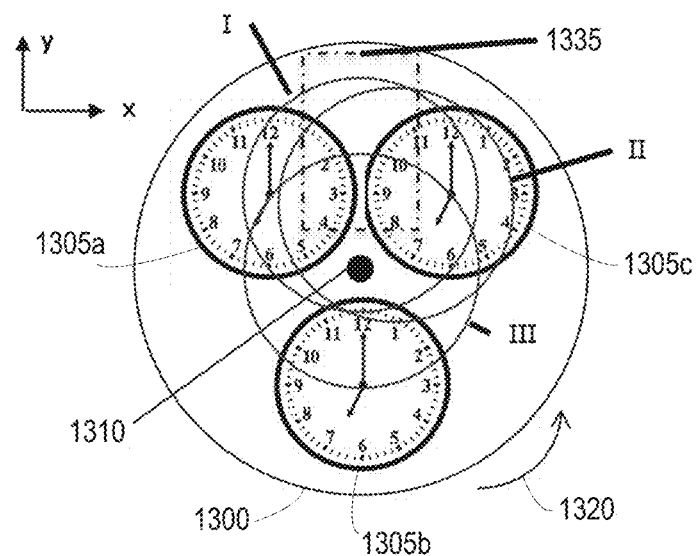

The fringes of the fringe pattern 1330 are oriented such that any location on the print regions moves across at least 2pi of fringe phase as it moves under the projected fringes. FIG. 13B does not show the fringes of the fringe pattern for simplicity and shows the field of view (e.g., area of interest) with a dashed line to indicate the region of interest 1335 of the fringe pattern. FIG. 13B shows three circles (I, II, and III) that represent the path of the regions of interest (12 o'clock, 1 o'clock and the clock face center, respectively) as they rotated about the center axis. FIG. 13B shows that all three clock patterns will move primarily in the x-direction across the full width of the field of view of the fringe projection system. Using software, every region of interest on the print region is tracked as it makes its way through the fringe projection field of view, allowing the measured data to be processed to obtain the height of every location on the powder bed. A detector (for example, an encoder) that detects the position of the print regions 1305a, 1305b, and 1305c in the xy-plane may be provided. The detection output of that detector may be used to process the output from the camera 1055.

Fringes of the fringe patterns may be parallel to the direction of movement of the powder bed or may be perpendicular to the direction of movement of the powder bed.

This measurement could be done after powder spreading but before the 3D printing step, as a check on the quality of the powder layer. Alternatively, it could be used after the 3D printing step but before the next powder layer is put down. This measurement also could be used as feedback for the print step. Additionally, the system may be used to measure both before and after printing. This would be done either using two systems, or a linear system that scans underneath the fringe projection system between the exposure and powder spreading regions.

The disclosed measurement system allows real-time 3D metrology (topography) of a 3D printed part without reducing the speed of the printing process.

The fringe projection system may capture five or more phase-shifted images of the projected fringes on the test part, which lets the necessary information be gathered as the powder bed moves such that the measurement is made with no reduction in printer throughput.

The main idea here is to apply fringe projection to measuring a powder bed that is continuously moving along a known trajectory through the field of view of the measurement system. Others have applied fringe projection to powder bed metrology but they require phase shifting versus time, which is not compatible with a rotary powder bed system.

Using the disclosed techniques, fringes are projected such that the part moves across the fringes, from light to dark regions, allowing for the measure of the test surface with sufficient phase diversity, allowing collection of all the data needed while the 3D printer performs normal part motion.

The FP measurement is done without any time burden added to the process. The above works for a linear or rotary powder bed.

Simultaneous Fringe Projection for Real-Time, Single Layer Metrology for a 3D Printer 3D printers work by building a part one layer at a time, allowing for shapes (including cavities) that could not be made any other way. Metrology of such a finished part is difficult because some of the part is not accessible by anything other than x-rays. Using x-ray computed tomography (CT) to measure every part is expensive and time-consuming and subject to errors, especially for high-density metal parts.

Others have proposed using fringe projection to make measurements of a stationary powder bed by sequentially phase shifting the fringes across the powder bed in time. This works, but it requires 4-7 images to be taken while the powder bed is stationary, which will slow down the 3D printing process considerably. Metal 3D printing routinely takes 8+ hours; adding another 4 hours for metrology is untenable.

Above describes a viable method, where projected fringes are fixed in space but the sample scans underneath the fringes (fringe scan), allowing phase shifting of the fringes to happen as the part scans. There is no reduction in throughput to accommodate the metrology. However, the above embodiment as depicted in FIG. 10A requires alignment of the subsequent images in software such that the same region on the powder bed (or substrate) is used for all of the phase values of the projected fringes. For a linear scan system, this is straightforward.

For a rotary powder bed, depending on the rotation motion employed, the arc traversed by the powder bed locations and the square CCD grid can make it difficult to achieve proper alignment of the measurements taken in time.

The technique as disclosed herein uses a new, simultaneous fringe projection method to measure the powder bed. The disclosed technique can be used to measure the powder bed after the powder is deposited but before the 3D printing step, to verify powder spreading was correct. Additionally or in the alternative, the disclosed technique can be used to measure the 3D printed layer after it has been printed/melted.

An advantage is that all of the data needed to make a fringe projection measurement can be captured simultaneously, and there is no need for complicated software to map the trajectory of every point on the measured substrate as it moves across the camera field of view.

FIG. 10A shows an example of a fringe projection system that can be used to illuminate the powder bed. By using a Mach-Zehnder interferometer, a custom amount of tilt can be introduced (using one of the mirrors) between the two beams, which lets the fringe pitch and orientation be dynamically set to change the sensitivity of the system. There is an observation system that can be looking down (at normal incidence), or, as shown in FIG. 10A, at an off-axis angle. The observation system looks at the scattered light, so it does not need to be at the same angle as the projection system. The projection system does need to illuminate the fringes at an angle so that there is sensitivity to height changes. This is one example of how to create the desired fringe pattern; others are certainly possible, such as gratings or another interferometer arrangement.

The sensitivity of the fringe projection works by converting the measured irradiance values, with a known (or calculated) phase shift between subsequent measurements of the same location on the powder bed or substrate, into the phase of the fringe. This is done using phase-shifting interferometry algorithms (such as the Schwider-Hariharan 5-step algorithm) or Least Squares Phase Shifting Interferometry (LSPSI) algorithms. The phase, which is a value that is modulo 2pi, needs to be converted into height, in microns. This is done using above Equation 1. This is shown graphically in FIG. 10B.

Figure 14A:
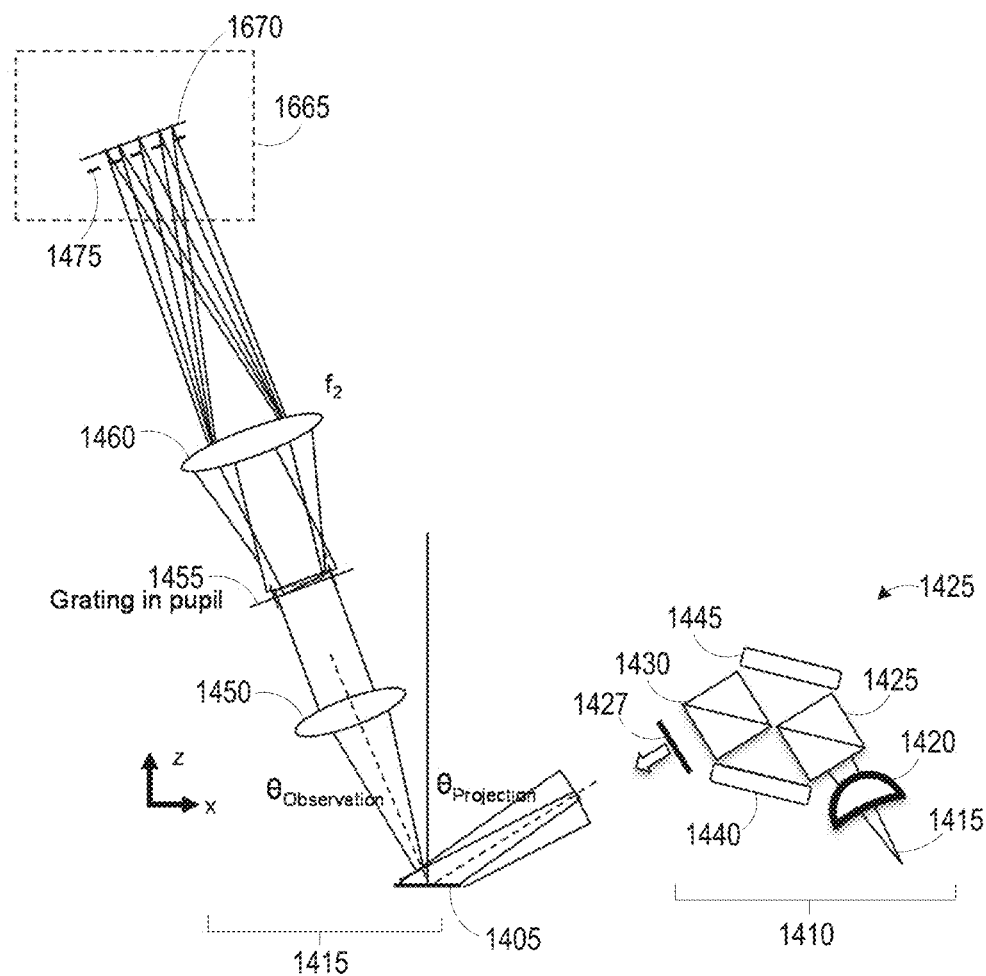
FIGS. 14A-F show an exemplary method for measuring the topography using phase-shifting fringe projection.

FIG. 14A shows an example optical metrology system for a fringe projection system that can be used to illuminate a powder bed 1405 of a three-dimensional printing system 1400 and make metrology measurement of the powder bed, a part being printed in the powder bed, or both. Fringe projection system 1400 includes a projection system 1410 and an observation system 1415. The projection system is optically coupled to the observation system via the powder bed.

Projection system 1410 includes a light source 1415, a lens system 1420 (e.g., a collimating lens), an interferometer 1425, and a waveplate 1427 (e.g., a quarter-wave plate). Light source 1415 may include one or more optical fibers and one or more light generators, such as one or more lasers (e.g., diode lasers). Light source 1415 may be optically coupled to lens system 1420 and may transmit generated light through the lens system to the interferometer. Observation system 1415 includes observation system lens 1450, a diffraction grating 1455, an imaging lens system 1460 that includes at least two lenses, a camera 1470 that include a detector array, and a set of polarizers 1475 (e.g., a set of five polarizers or another number of polarizers).

Interferometer 1410 may be a Mach-Zehnder interferometer or another type of interferometer. The interferometer includes a first beam splitter 1425 (e.g., a polarizing beam splitter), a second beam splitter 1430 (e.g., a polarizing beam splitter), a first mirror 1440, and a second mirror 1445.

As in the above described embodiment, the Mach-Zehnder interferometer is adapted for illumination, such that tilting either the first mirror or the second mirror facilitates control over the fringe pitch and orientation of the fringe pitch. This allows the system to be varied so that the sensitivity of the system may be varied according to equation 1. The difference with respect to the above described embodiments is that the beams splitters are polarization beamspliters (PBS), so the two beams that are projected at $\theta_{Projection}$ towards the substrate are orthogonally linearly polarized, exiting the second PBS in FIG. 14A Both beams are transmitted from the PBSs and are transmitted through the quarter-wave plate (QWP) oriented with the fast axis at 45° about the optical axis relative to the two linear polarization states. The two beams are polarized into a right hand circular (RHC) polarized beam and left hand circular (LHC) polarized beam that are transmitted from the quarter-wave plate and incident on the substrate or powder bed.

Figure 14B:
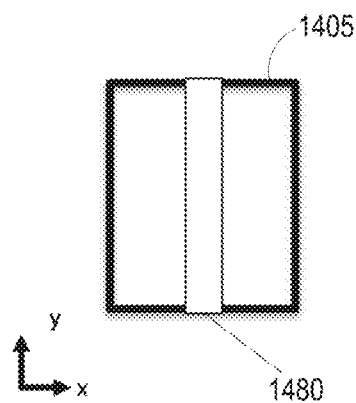

In an embodiment, the cylindrical lens or other optics (e.g., an anamorphic optics) might be used to illuminate an oblong region or a rectangular region 1480 on the substrate as shown in FIG. 14B. The illuminated region may illuminate the full width in the y (non-scan) direction but may illuminate a smaller region along the scan (x) direction. Note that for a rotary system the scan direction is not limited to a single axis (x or y) but the system can be arranged such that the scan direction is primarily along one of these two axes.

The two RHC and LHC polarized beams illuminate the substrate as shown in FIG. 14B, but no fringes are generated because the beams are orthogonally polarized at the substrate. The substrate scatters light from both beams, which are then captured by an observation system lens 1450 of observation system 1415, at a mean angle of $\theta_{observation}$. The lens system 1460 is configured to image the substrate, the illumination portion 1480 of the substrate (e.g., a rectangular illumination regions), or both onto the detector array of the camera. In one embodiment, the illumination satisfies Scheimpflug via the tilt of the camera relative to the observation optical axis, as the illuminated region is narrow in the x-direction. See FIG. 14B. Thus, the depth of focus range is small compared to imaging the full powder bed width in x at off-axis angle $\theta_{observation}$. In an embodiment, grating 1455 is in the pupil of the observation system and diffracts the incoming beam so that a number of copies (e.g., five copies) of the scattered light are generated and exit the pupil at different angles. The second lens system 1460 performs a Fourier transform on the pupil plane, creating the copies of the image at different spatial locations along the x-axis, as the angle differences become position differences due to the Fourier transform operation. The grating creates an angle difference $\varphi$ between the orders, and the second lens group 1460 has a focal length of f2; therefore, the separation 's' between the images is $s=f2*\tan(\varphi)$. The value of s should be slightly larger than the width of the image of the illuminated region. The illumination system may need to include an aperture of some kind that limits the size of the illuminated region to have somewhat sharp boundaries so that the multiple image copies at the camera do not overlap each other.

Figure 14C:
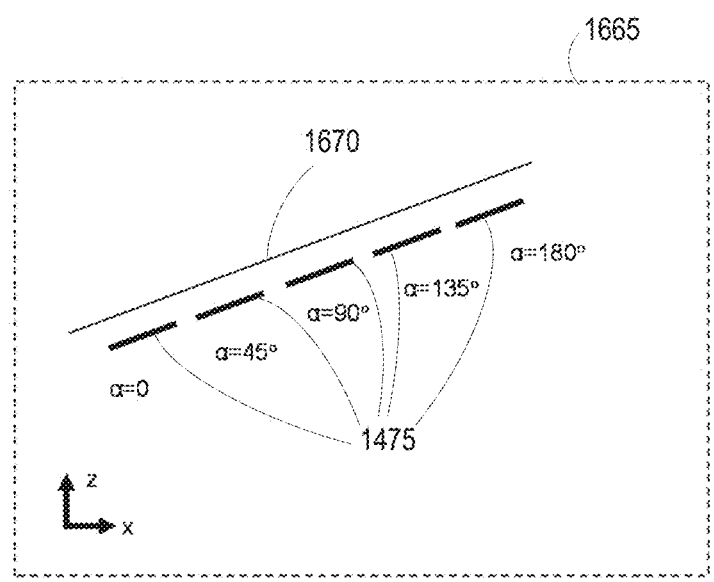
Figure 14D:
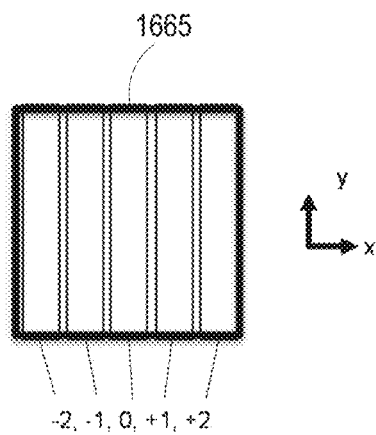
Figure 14E:
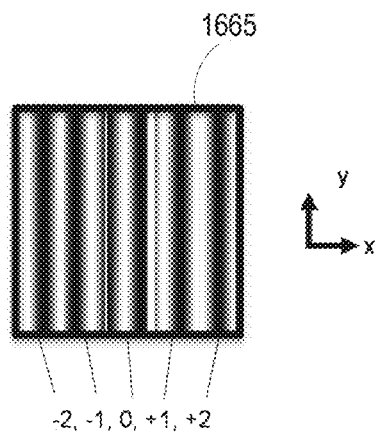
Figure 14F:
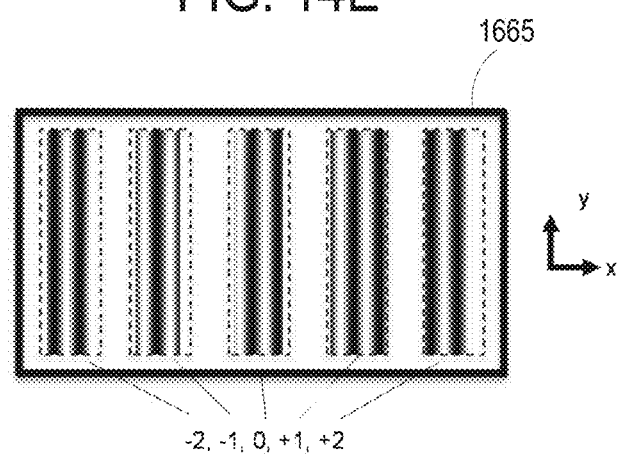

As described so far, the system creates five copies of the powder bed image on the detector array of the camera, as shown in FIG. 14D. However, there are still no fringes because the beams are orthogonally polarized. FIG. 14C shows how the set of five polarizers 1475 positioned in front of the camera facilitates the pairs of beams interfering with each other at the detector array 1460. FIG. 14E shows the five example fringe patterns, shown expanded wider in x-direction for clarity. Note how they have different fringe positions relative to the boundaries of each image; the fringes are phase shifted for each of the five images. FIG. 14F shows the fringes of orders higher than +1 and lower than −1, which in some embodiments may be used instead of the +1 and −1 orders.

The polarizers in FIG. 14C show the five separate polarizers, each with the transmission axis at a different angle $\alpha$. It is well known in the field of phase shifting interferometry and polarimetry that if two orthogonally circularly polarized (LHC and RHC) beams are incident on a polarizer that is oriented at an angle $\alpha$, then the two beams will be projected to be polarized at the same angle $\alpha$, with the same irradiance, and with a phase shift between the two equal to $2*\alpha$. Example orientations of the transmission axis of the polarizer are shown in FIG. 14C of 0°, 45°, 90°, 135°, and 180°, leading to phase shifts of 0°, 90°, 180°, 270° and 360°. These are standard phase shift values that can be used with the Scwider-Hariharan phase shifting algorithm. Therefore, all five images that are captured on a single camera (e.g., camera 1665) and are mathematically combined to provide a simultaneous phase map of the substrate under test (e.g., the powder bed, a part printed in the powder bed, or both). The phase map is converted into height (topography) based on system design (FIG. 14A) and calibration results. The size of the measured region is the size of the illuminated region indicated in FIG. 14B.

FIGS. 13A and 13B show the complex paths taken by a rotary powder bed system under a metrology field of view, showing the difficulty of having to track every position on the powder bed in order to make a fringe scan measurement (as in prior art).

This allows real-time 3D metrology (topography) of a 3D printed part without reducing the speed of the printing process and without the need for complex software that tracks the part trajectory underneath the metrology instrument.

The disclosed approach captures all of the phase shifted fringe data simultaneously, such that the test part is frozen at an instant in time. The next measurement captures the same substrate after it has moved by some amount determined by the needs of the 3D printer itself.

One benefit of the illumination and observation metrology system is that the metrology system does not create a burden for the printing process. Printing can occur unaffected by the illumination of the system while the metrology system adds in situ measurement capabilities of the powder bed, part being printed, or both. A number of benefits facilitated by the illumination and observation metrology system include those benefits enumerated in the following list.

1. The fringe projection metrology system can capture data from a number of overlapping fringe patterns in a single camera frame.

2. Project two orthogonally polarized beams at the test surface.

3. Two polarizations are LHC and RHC.

4. The illumination and observation system images the test surface plane onto the camera.

5. At the pupil of the system, there is a beam dividing optic, such as a grating, to create copies (at least 4 total, 'N') of the beam and transmit the copies of the beam away from the pupil plane at different angles.

6. The Fourier transform lens converts the angle differences of the beams to position differences of the beam.

7. The set of N polarizers are set with the axes of the polarizers at a set of angles alpha, where each angle alpha is different by typically 45 degrees, such that the two circular polarization states of each beam are projected into the same linear state so that they interfere. And so that the phase difference between the RHC and LHC beams is different for each of the N polarizers.

8. A processing system (a computer system coupled to the camera) may combine the N images of the fringe patterns images by the camera so that the phase of the fringe pattern is computed.

9. The conversion from phase information into height information (topography) of the processing system allows for a determination of the topography of the powder bed, a part being printed in the powder bed, or both.

10. The foregoing described system and method may be operable on a stationary target, where system vibrations are a problem, and so vibrations are avoided.

11. The foregoing described system and method are also operable with a system where a part being printed is in continuous motion, allowing the full test surface of the part to be measured without reducing the speed of the parts.

12. In an embodiment, if the region of interest (ROI) on the test surface is sufficiently narrow, then the N copies of the bean can fit on the same detector array (i.e., sensor) simultaneously.

13. In an embodiment, a fringe projection metrology system includes: projection optics which project metrology radiation to an object and which include a projection optical axis; detection optics which receive a radiation from the object and which include a detection optical axis which is not a relationship of regular reflection to the projection optical axis and a detector; and a circuitry which receives a signal from the detector and which outputs an information regarding a height of the object.

14. In another embodiment, a fringe projection metrology system includes: projection optics which project a first metrology radiation and a second metrology radiation to an object, wherein a polarization state of the first metrology radiation and a polarization state of the second metrology radiation are different;

detection optics which receive a radiation from the object and which include a detector and a polarizer.

15. In an embodiment of system 14, a first polarization component of the first metrology radiation and a second polarization component of the second metrology radiation pass through the polarizer, and wherein the first and second polarization components have an equivalent polarization state.

3D Metrology of a 3D Printer Build Platform

The following embodiment performs metrology of 3D printed parts after they have been made. The system measures the 3D topography of every printed layer in a 3D (additive manufacturing) printer (without reducing print throughput) and builds up a 3D model of the fabricated part from each slice of metrology data that can be compared to the 3D model of the designed part, preventing the need for costly and time-consuming post-metrology methods such as x-ray CT.

3D printers work by building a part one layer at a time, allowing for shapes (including cavities) that could not be made any other way. Metrology of such a finished part is difficult because some of the part is not accessible by anything other than x-rays. Using x-ray computed tomography (CT) to measure every part is expensive and time-consuming and subject to errors, especially for high density metal parts.

Some solutions propose using fringe projection to make measurements of a stationary powder bed by sequentially phase shifting the fringes across the powder bed in time. However, this approach requires 4-7 images to be taken while the powder bed is stationary, which will slow down the 3D printing process considerably. Metal 3D printing routinely takes 8+ hours; adding another 4 hours for metrology is untenable.

Above (FIG. 10A) describes a viable method, where projected fringes are fixed in space but the sample scans underneath the fringes (fringe scan), allowing phase shifting of the fringes to happen as the part scans. There is no reduction in throughput to accommodate the metrology. However, the above depicted in FIG. 10A requires alignment of the subsequent images in software such that the same region on the powder bed (or substrate) is used for all of the phase values of the projected fringes. For a linear scan system, this is straightforward. For a rotary powder bed, depending on the rotation motion employed, the arc traversed by the powder bed locations and the square CCD grid can make it difficult to achieve proper alignment of the measurements taken in time.

Above FIGS. 14A-F depict a way to measure the topography using phase shifting fringe projection where all of the data is captured simultaneously, where there are no longer restrictions on the trajectory followed by the part during metrology or on cumbersome software to track the position of the part in space and time.

Accordingly, a method is disclosed of collecting metrology of every printed layer in real-time using the technique for example in the above embodiments and other embodiments as described herein, and processing the data in parallel to the 3D printing process. Software can be created to combine the measurement results of each layer to build up a 3D model. Measuring each printed layer in the time that access to interior surfaces, the interior of walls, and other areas are available, so that the measurement can be made as the part is being printed. Competing technologies examine the part after it is fully printed, and so they can only give information about the outside of the part. X-ray CT can measure the full part, but this is expensive, slow, and can suffer inaccuracies due to high Z (highly absorbing) materials changing the x-ray paths.

Figure 15:
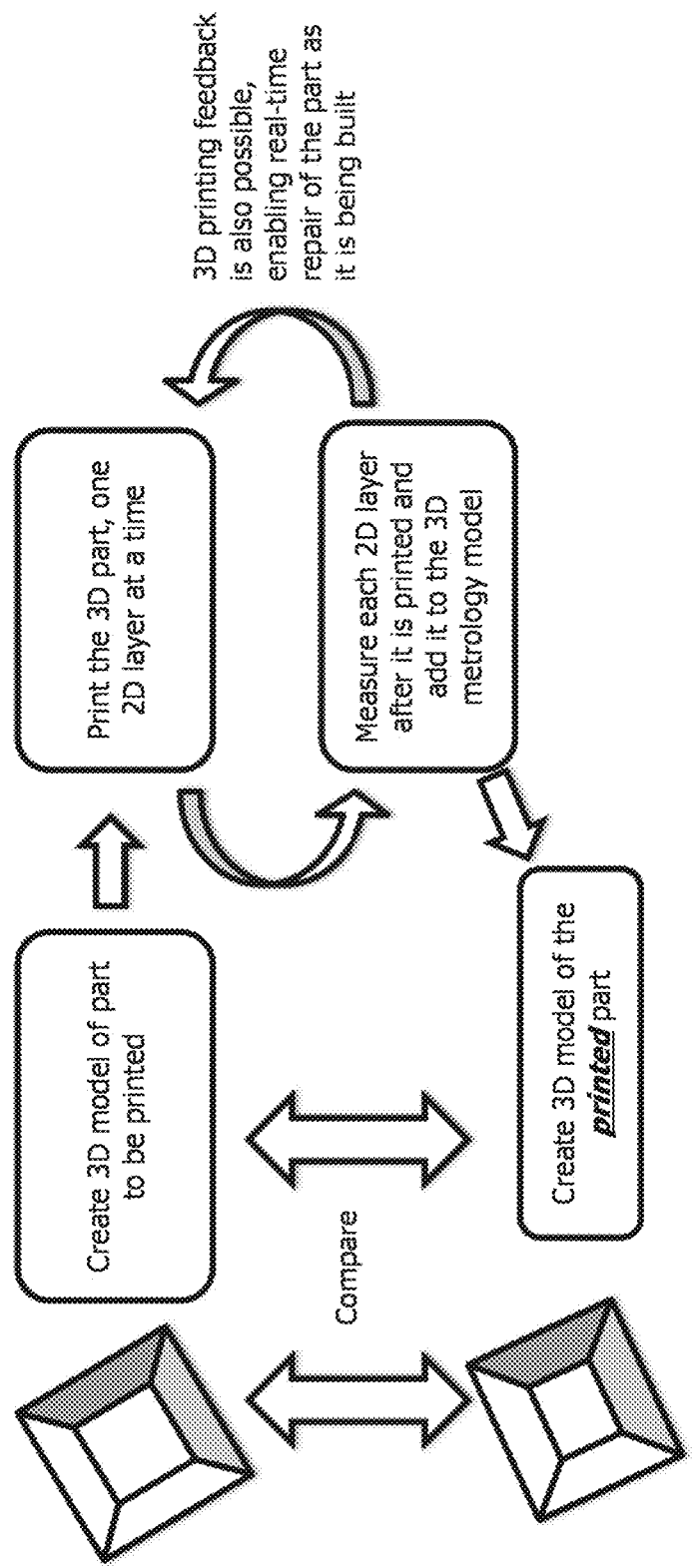
FIG. 15 shows a block diagram of an exemplary process as disclosed herein.

FIG. 15 shows a block diagram of the process. A 3D model of a part is created and fed into the 3D printing machine, and made into a set of layers to be printed, which are considered as 2D slices of the 3D part. Metrology (fringe projection, for example) is performed on each 2D layer before the next layer of powder is deposited and the next layer of the part is created, and this data can be used in two ways.

First, the data can be used to create a 3D model of the as-printed part, layer by layer, just as the actual part is fabricated layer by layer. The printing process takes a 3D model and makes it as a series of 2D print steps. The metrology process takes a series of 2D measurements and builds up a 3D model; a closed cycle can now be created. The 3D model of the as printed part is compared to the design, allowing manual or automated comparisons that can show the engineer if any changes need to be made before making another part, for example.

Metal 3D printing takes a long time to cool properly, and for the part and the extra powder to be separated. All of this has to happen before post-metrology can be performed, resulting in a 10-20 hour delay in getting and feedback. Real-time, in situ metrology eliminates this wasted time.

The second way the data can be used is to provide data from layer N that can be used to change layer N+1 in order to fix any places that have defects, for example. The metrology might identify a printing problem and the data processing system is fast enough to recognize it and make the necessary changes to the next layer such that the defect can be fixed or mitigated almost immediately. Post-metrology might be able to identify such issues, but not until the day after the part is made, which is clearly far too late to do anything about it during printing.

The disclosed allows real-time 3D metrology of a 3D printed part without reducing the speed of the printing process. This lets the user see 3D metrology results as soon as the part is done being printed, with details that are not achievable with metrology performed after printing, on the final part. Alternatively, the real-time metrology system can be used to make changes to the subsequent layer to fix issues caused by the previous (measured) layer.

1. Measure every layer in a 3D printing process using a measurement method described herein.

2. Use each measurement of layer L to provide feedback to layer L+1, so that repairs can be made.

3. Save all measurements so that an accurate 3D model of the printed part can be built in software during/after the build, for comparison between the part goal and the actual printed part.

4. A system using a model as in 3 that provides valuable feedback while the part cools for up to 12 hours, allowing a reduction in cycle time for process development of critical parts.

Multiple Wavelength, Simultaneous Fringe Projection for Real-Time, Single Layer Metrology for a 3D Printer In the following embodiment, the problem of making a rapid measurement of a moving (translating or rotating) 3D printing target without reducing throughput is solved using a multi-wavelength, simultaneous fringe projection metrology system, where all of the necessary measurements to measure the fringe phase are made simultaneously on a single camera, allowing measurements of moving targets.

Fringe projection has been demonstrated to work well on 3D printing powder bed systems, achieving micron level height resolution with a spatial resolution on the order of tens of microns, depending on the system design.

The simplest way to measure the fringe phase is to do phase shifting of the fringes, where they move across the surface under test (SUT) and multiple images are captured in time. A powder bed or recently melted metal surface can have a rapidly spatially varying reflectivity, which means spatial heterodyne methods would be difficult to use. Phase shifting ensures that the same reflectivity is used for each phase of the projected fringes, removing an important error source. The downside of this approach is that shifting the fringes takes time, and the powder bed cannot be moving during the measurement.

Figure 16A:
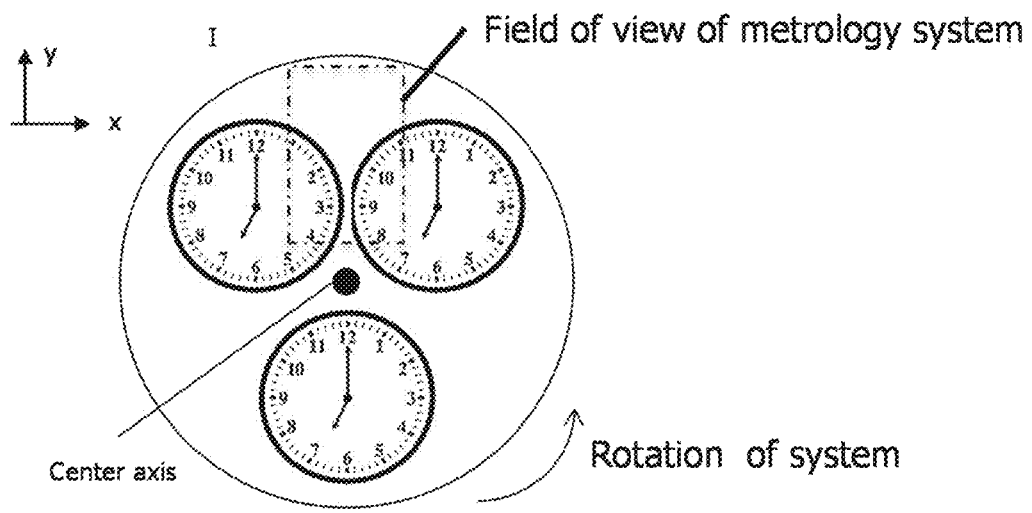
FIG. 16A shows a rotary powder bed three-dimensional (3D) additive manufacturing system, top view.

FIG. 16A shows a rotary powder bed 3D additive manufacturing system, top view. One concept would be to use "fringe scan," where the fringes are fixed and each point on the SUT travels across the field of view of the metrology system. With proper design, each point is measured with a sufficient variety of projected fringe phases such that the phase of the fringes can be measured. In FIG. 16A, each point on the powder bed travels in a unique arc through the field of view of a metrology system. Although it is conceivable that software could be written to compensate for the pixel dependent arc to utilize fringe scan, such software would be difficult and require a lot of computing power. Recall that the goal is to measure the 3D printer powder bed as it moves, fast enough that the information can be used during the printing process. If processing time takes too long, the goals will not be reached.

In the above embodiment of FIG. 10A, the method proposes using two projected beams with orthogonal polarization states at the 3D powder bed. Then, multiple copies of the combined beams are imaged onto a camera and made to interfere with a polarizer. By using a different angle of the polarizer for each image copy, the relative phase between the two projected fringes can be changed, allowing multiple phase values to be captured simultaneously.

The method proposed here is similar to FIG. 10A, in that multiple (4 or 5 or more) fringe patterns for the same location on the test sample are captured simultaneously on a single camera. The key difference is that the different fringe patterns are made with different wavelengths of light, not different polarizations.

Figure 16B:
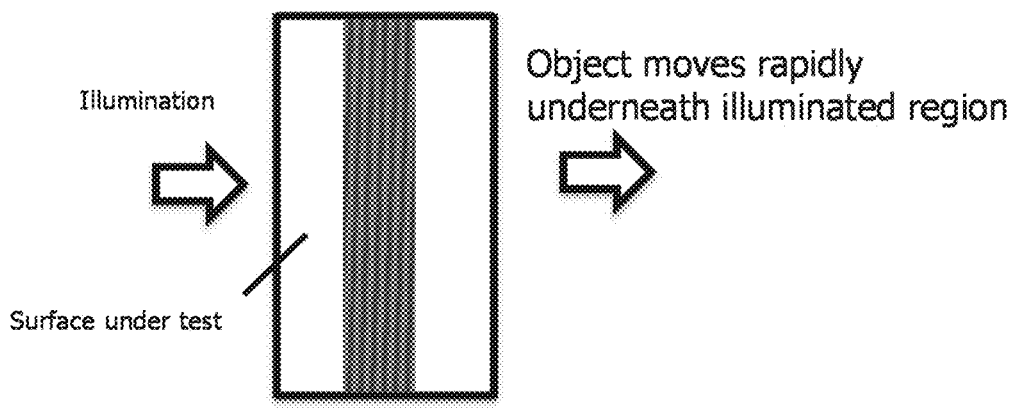
FIG. 16B shows a rectangular projected fringe pattern, where the object moves underneath the fringe pattern.

FIG. 16B shows a rectangular projected fringe pattern, where the object moves underneath the fringe pattern.

Figures 17A, 17B:
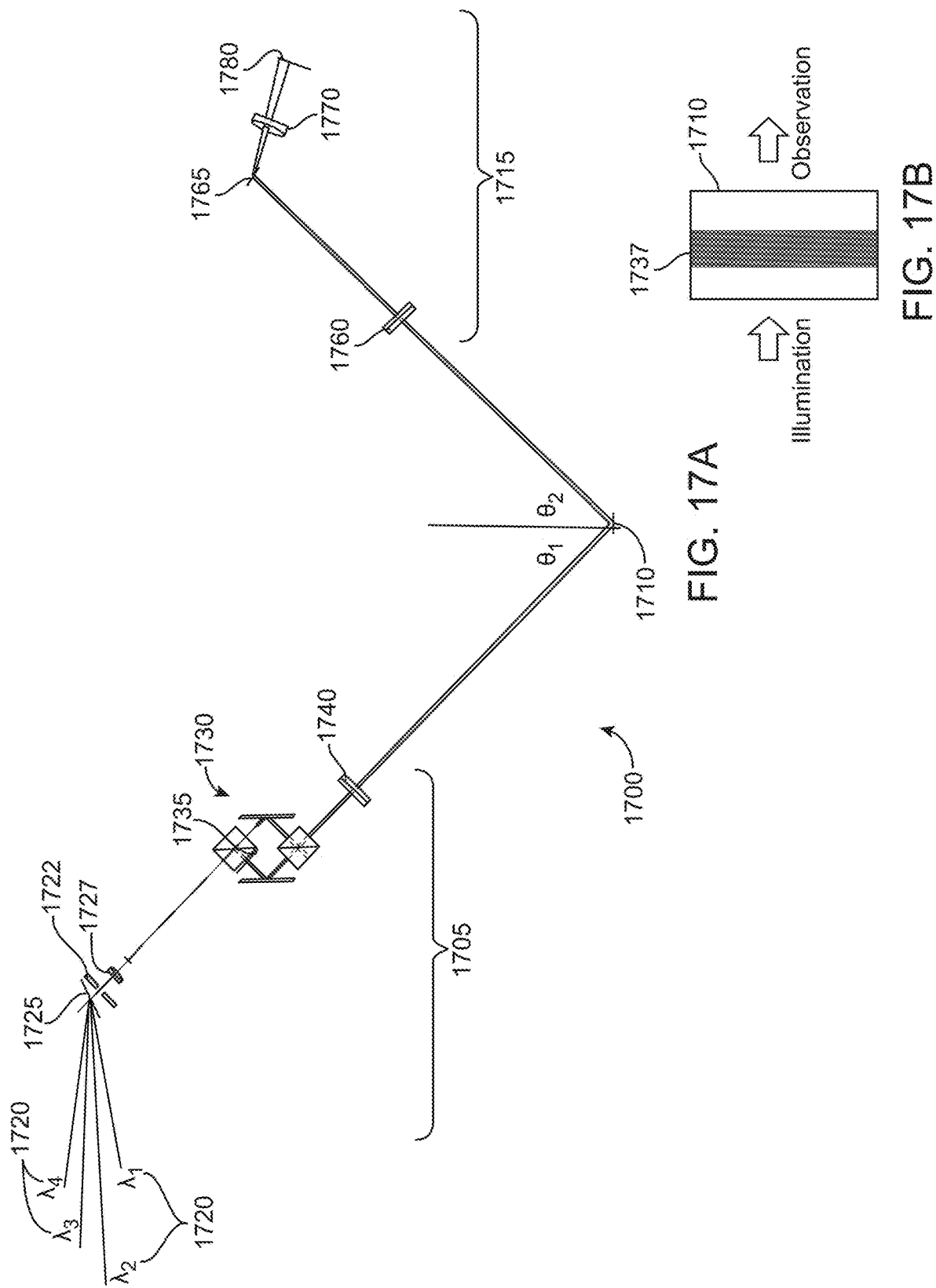
FIGS. 17A and 17B show the system concept, from light sources to the camera.

FIGS. 17A and 17B shows a three-dimensional measurement system 1700, in an embodiment. The system includes an illumination system 1705, a powder bed 1710, and a detection system 1715. The illumination system may include a number of light sources 1720, such as two, three, four, five or more light sources. The light source may laser diodes, LEDs, an SLD, or another light source. Each light source is configured to generate and emit a different wavelengths of light. The spacing between the nearest wavelengths may be about 10 nanometers and the wavelengths may range from about 638 nanometers to about 670 nanometers.

The illumination system includes a grating 1725. The grating receives the light from the light sources and diffracts light so that the multiple wavelengths are collinear. The grating is conjugate to the measurement plane of the detection system. In an embodiment, the grating incudes 1200 lines per millimeter.

The illumination system includes a variable width slit 1722. The variable width slit receives an order of diffracted light from the diffraction grating and transmits the received order of light. The variable width slit limits the object size of the diffraction grating in the detection system.

The imaging system includes a lens system 1727 (e.g., a single lens having F=19 millimeters in an embodiment) that expands the beams onto an interferometer 1730 of the illumination system. The lens system 1727 may include a number of lenses. The interferometer may be a Twyman-Green interferometer, a Mach-Zehnder interferometer, or another type of interferometer.

The interferometer may create phase-based interference in the beam for each of the wavelengths of light. In an embodiment, the interferometers include variable thickness glass plates 1735 in a first optical path of the interferometer. The glass plates may include two glass wedges where the wedges have opposite orientations. The interferometer may include another set of glass plates (e.g., two glass wedges) in a second optical path of the interferometer. The glass plates may introduce a phase difference in the two beams of light generated by the interferometer for each wavelength so that the two beams for each wavelength interfere. Thereby, the interferometer also causes the fringe pattern for each of the wavelengths to be tilted when projected onto the powder bed, a part being printed or both. The inter tilt allows for the detection system to detect to height changes of the powder bed, a part being printed in the powder bed, or both.

In an embodiment, the light is projected from the interferometer through a lens system 1740 (lens having F=250 millimeters) onto the powder bed at an angle θ1 that is greater than zero and preferably greater than about 30°. The lens system 1740 may include a number of lenses. The powder bed is at the measurement plane of the three-dimensional printing system. The light is projected onto a square shaped, rectangular shaped, oval shaped, or another shaped area 1737 on the powder bed. The light projected from the interferometer creates a fringe pattern for each wavelength on the powder bed 1710.

The slit is imaged onto the powder bed (e.g., a surface under test (SUT)) with magnification facilitated by lens system 1727. The image of the slit provides that the illuminated area 1737 on the powder bed has the shape of the slit, which is rectangular. Because the illuminated area is rectangular, the number of fringes per fringe pattern may be relatively low and limits the processing time of the fringes detected by the detection system.

The fringe patterns for the wavelengths simultaneously overlap at the powder bed. Light from the powder bed, a part being printed in the powder bed, or both are scattered, and light scattered through angle θ2 is collected by detection system 1715. In an embodiment, θ1 and θ2 can be different angles because the light imaged by the detection system is scattered light.

In an embodiment, the detection system includes a lens system 1760 (e.g., a single lens having F=250 millimeters), a pupal grating 1765, a lens system 1770 (e.g., a single lens having F=45 millimeters), and a camera 1780. Each of lens systems 1760 and 1770 may include a number of lenses. Lens system 1760 receives the reflected light from the powder bed and focuses the light onto the pupil grating. The pupil grating spatially separates the wavelengths so the fringe pattern 1737 for each wavelength is imaged on spatially separated areas of the detector array of the camera.

As the powder bed is raised or lowered, as a part is being printed, or both, the fringes or the fringe patterns imaged onto the detector array of the camera shift. The change in height can be determined from the amount that the fringes shift. In one embodiment, the detection sensitivity of how much the height shifts is related to el.

The following is a list of seven things that are accomplished by the illumination system and detection system so that height changes of the powder bed, part, or both can be determined by projecting and imaging the fringe patterns.

1. The aperture conjugate to the powder bed limits the region that is illuminated by the fringe patterns. This limitation limits or prevents the different wavelengths and the fringe patterns for the different wavelengths from overlapping on the detector array of the camera.

2. The fringes of the fringe patterns for the different wavelengths have the same pitch. The same fringe pitch is facilitated by limiting the wavelength spread and by illuminating a thin region along the pitch direction, thereby limiting or minimizing the number of fringes in the fringe patterns on the powder bed and detector array.

3. The different wavelengths have different phase fringes at the measurement plane. This is facilitated by the glass path difference in the two arms of the interferometer, which introduces dispersion and a fringe phase change.

4. The multiple wavelengths of light are collinear. This is facilitated by illuminating the grating at select angles with respect to each light source.

5. The different wavelengths of light are spatially separated on the detector array of the camera. The spatial separation is used to get the different signals and is accomplished with the grating in the pupil of the detection system. This means the sources are broadband sources and are discrete wavelengths 6. Minimal linear phase delay is provided so that the fringes do not lose fringe contrast. This is facilitated by using approximately monochromatic light sources, such as laser light sources.

7. Variable fringe pitch if facilitated by using a two mirror interferometer (or Twyman-Green or Mach-Zehnder).

The foregoing description of the three-dimensional printing system shown in FIGS. 17A and 17B describe and show the parts of the printing system that facilitate the foregoing described accomplishments of the system. FIGS. 18-29 illustrate one specific system and method to facilitate the described features of the system. FIGS. 18-29 are not limitations of the system as those of skill in the art will be aware of equivalent elements that may be used to achieve the same features of the system.

Figure 18B:
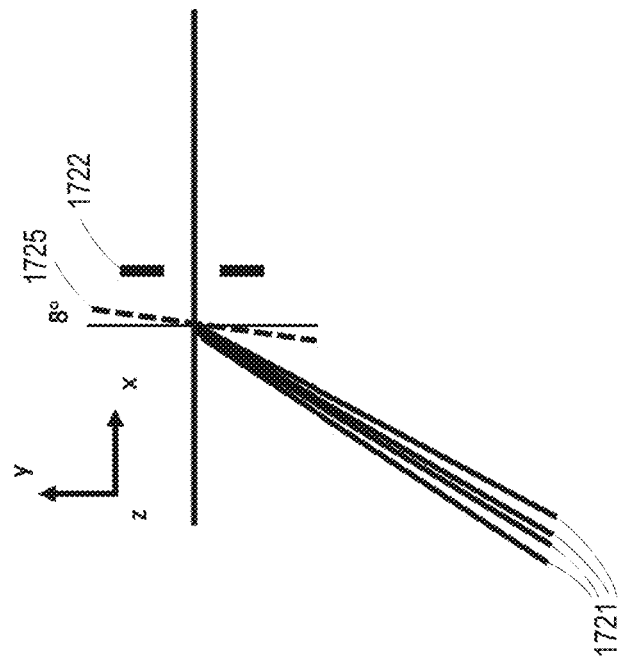
FIGS. 18A and 18B show the size of the collimated region on the diffraction grating for the sources and collimating optics.
Figure 18A:
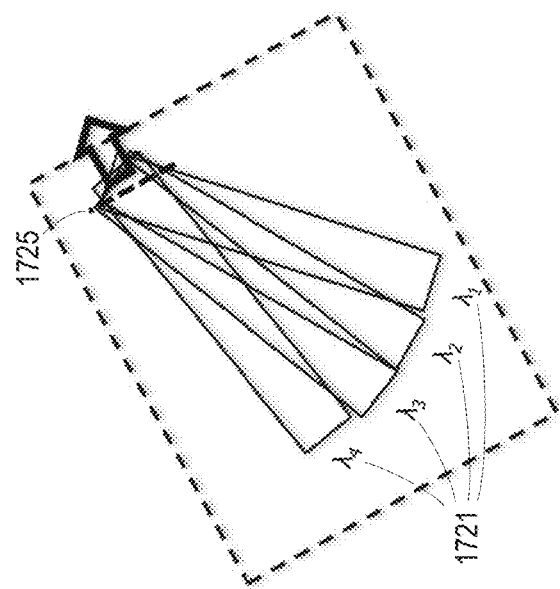

FIGS. 18A and 18B shows the light 1721 emitted by the light sources 1720, in an embodiment. In FIG. 18A the light 1721 is identified by the wavelengths $\lambda_1$, $\lambda_2$, $\lambda_3$, $\lambda_4$, and $\lambda_5$ and in FIG. 18B the light is identified as rays for the wavelengths. Each wavelength of light is collimated by one or more lenses (not shown). In an embodiment, the lens may be a single lens that has a focal length of F=11 millimeters and a numerical aperture of 0.26 so that each wavelength of light illuminates a spot on the diffraction grating. In an embodiment, the diffraction grating along the direction of the slit is 25 mm and will appear as 8.3 mm to the incoming light, which is larger than needed. The diffraction grating may be tilted with respect to the y-axis by about 6° to about 10° and may be tilted by 8° in a specific embodiment.

In an embodiment, the slit will limit the apparent object size of the grating in the y-direction, such that the regions of illumination of the powder bed can be fully separated on the camera on the receiving side.

Table 1 below shows the wavelengths of the light, the spot size that is illuminated on the grating along both the y-axis and the z-axis for each wavelength of light where the spot size is controlled by the illumination angle for each wavelength.

TABLE 1

| Wavelength of Light (nanometers) | Size of Illuminated Region on Diffraction Grating along the y-axis (millimeters) | Size on grating (projection), y (millimeters) | Size of Illuminated Region on the Diffraction Grating along the z-axis (millimeters) |
| --- | --- | --- | --- |
| 670 | 0.769 | 2.31 | 2.439 |
| 658 | 0.962 | 2.59 | 1.940 |
| 650 | 0.866 | 2.20 | 2.743 |
| 638 | 0.769 | 1.81 | 2.039 |

Figure 19:
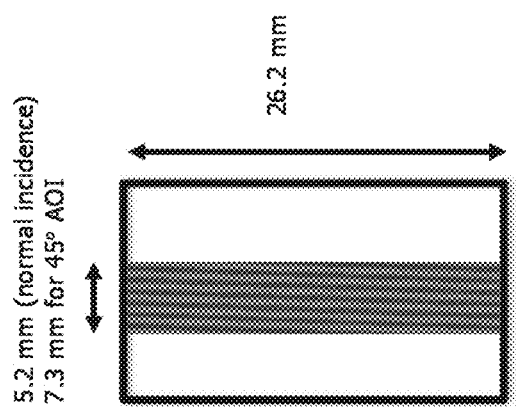
FIG. 19 shows the angle of incidence used to make the source radiation collinear after being diffracted by the diffraction grating.

FIG. 19 shows a number of parameters for the illumination region of the powder bed. For example, the width of the illuminated region may be 5.2 millimeters at normal incidence and may be 7.3 millimeters at a 45° angle of incidence. Additionally, the length of the illuminated region may be 26.2 millimeters.

So that the wavelengths of light may be collinear after being diffracted by the diffraction grating, the angle of incidence of the light on the diffraction grating is shown in Table 2 below.

TABLE 2

| Wavelength (nanometers) | Angle of Incidence (degrees) |
| --- | --- |
| 670 | 70.59 |
| 658 | 68.24 |
| 650 | 66.81 |
| 638 | 64.79 |

To further facilitate that the light is collinear after being diffracted by the diffraction grating, the laser diodes of the light source were driven by driven with LDD200p 1P from of Wavelength Electronics, Inc. of Bozeman, Montana To further facilitate that the light is collinear after being diffracted by the diffraction grating, the slit size may be about 0.4 millimeters in length by about 2 millimeters in width.

In an embodiment, the sending side magnification is about 13.1, so the illuminated region on the powder bed is about 5.2 millimeters by about 26.2 millimeters.

Figures 20A, 20B, 20C:
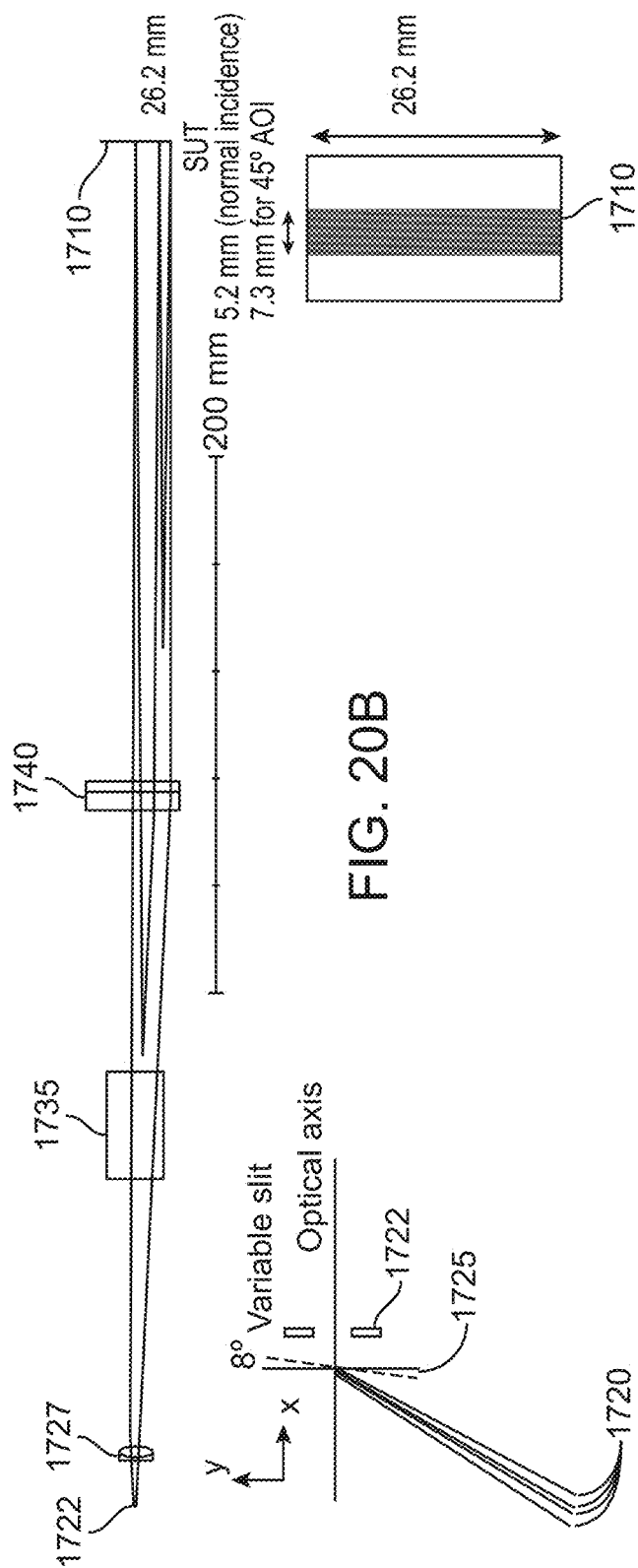
FIGS. 20A, 20B, and 20C show the sending side imaging system and the optical magnification used.

FIGS. 20A, 20B, and 20C portions of the illumination system. FIG. 20B show a scale for a portion of the length (200 millimeters) for the optical path from the variable slit 1722 (FIGS. 20A and 20B) to the powder bed 1710 (FIG. 20C). It is noted that the diffraction grating does not create fringes because as only one diffraction order (e.g., the +1 order) of the light 1720 is captured by the relatively low numerical aperture (0.1 in object space) of the illumination system. Thereby, the imaging system facilitates the rectangular illumination region being a well-defined rectangular illumination region on the powder bed.

Figure 21:
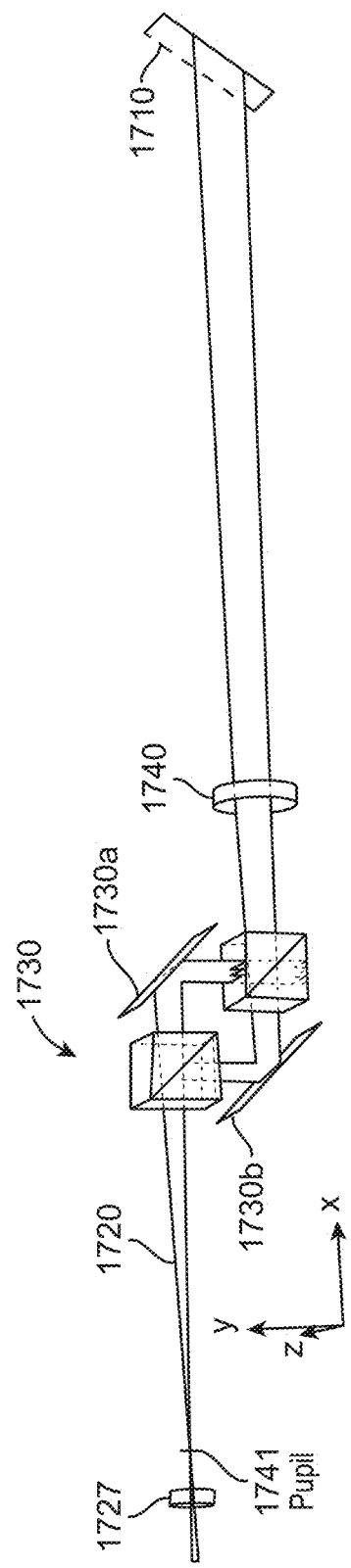
FIG. 21 shows a Mach-Zehnder interferometer for generating the fringes.

FIG. 21 shows the Mach-Zehnder interferometer 1730 that generates the fringes patterns that are projected onto the powder bed and onto the detector array of the camera. In an alternative embodiment, the interferometer is a Twyman-Green interferometer.

The interferometer is between lens systems 1727 and 1740. Therefore, the tilt between the two mirrors 1730a and 1730b of the interferometer may not set the pitch between the fringes of the fringe patterns at the powder bed. In an embodiment, the mirrors are relatively far from an imaging pupil 1741, because tilt in the pupil results in a shift in the fringe patterns at the powder bed, but does not tilt the fringe patterns. In an embodiment, a Fred simulation was used to find a location for the interferometer between the lenses.

Figure 22:
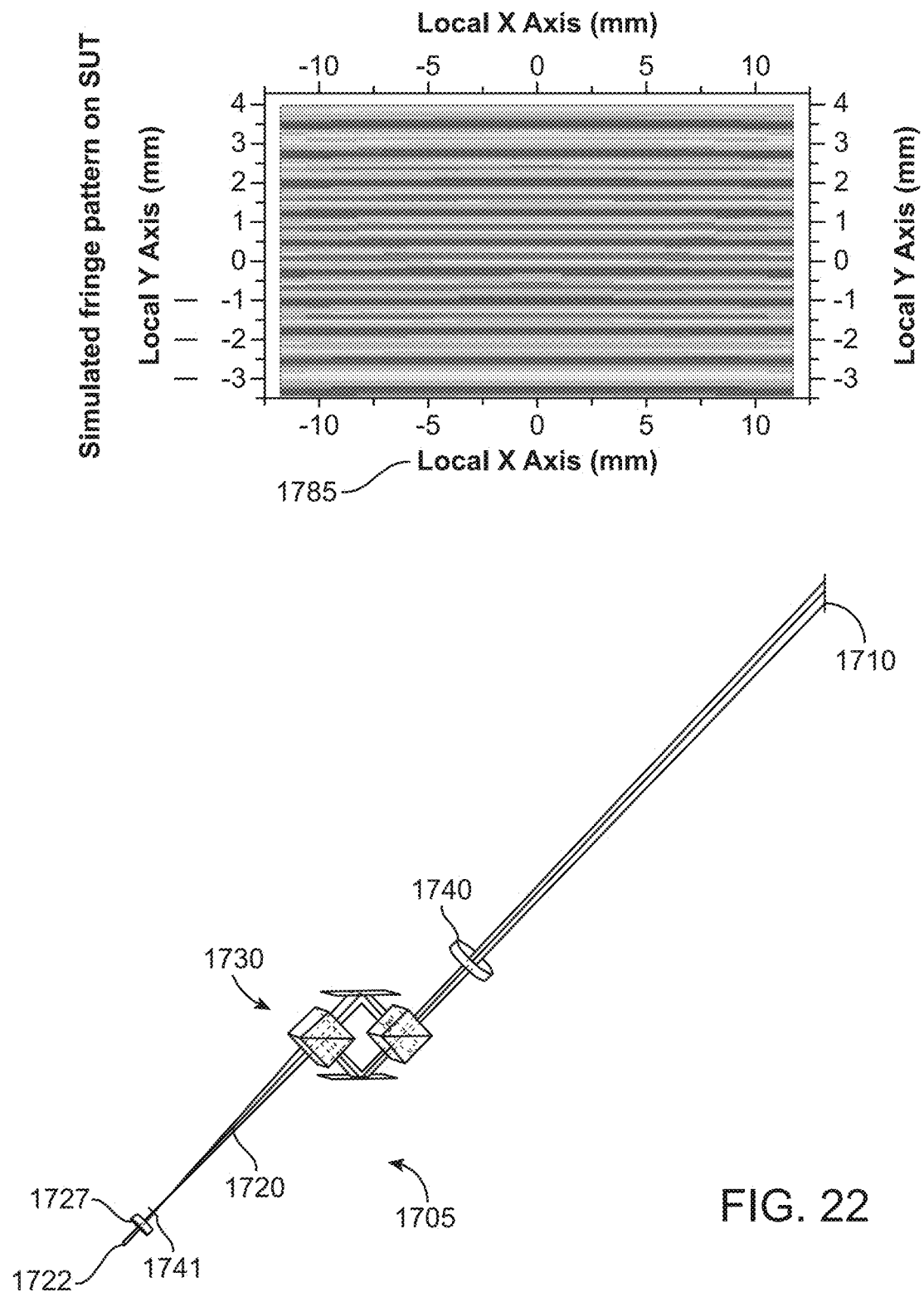
FIG. 22 has a simulation of the projected fringe pattern for a single wavelength and a mirror tilt of 0.05° and 45° angle of incidence.

FIG. 22 shows an example fringe pattern 1785 projected on powder bed 1710 that is illuminated by the illumination system 1705, in an embodiment. The fringe pattern is for one of the wavelengths of light 1720. The x-axis and y-axis of the fringe pattern are the local x-axis and y-axis of the fringe patterns on the detector array. The example fringe pattern is for a mirror tilt of 0.05° for one of the mirrors of the interferometer and for 45° angle of incidence of the fringe pattern on the powder bed. In an embodiment, for a fringe pitch of about 1.05 millimeters, the fringe pattern repeats when the height of the powder bed or a part being printed in the powder bed changes by 1.07 millimeters (i.e., Zperiod=1.07 millimeters).

In an embodiment, by varying the fringe pitch the fringe pattern or the angle of incidence of the fringe pattern on the powder bed, the $Z_{period}$ of the fringes can be changed according to equation 2, shown below.

$$Z_{Period} = \frac{T_{Wafer}\tan(90-\theta)}{2}$$

In equation 2, $T_{wafer}$ is the pitch of the fringes on the powder bed, in the plane containing the surface normal and the optical axis of the fringe projection optical system. Tilting one of the mirrors by 0.05° results in fringes with a pitch on the powder bed of 1.05 millimeters when the powder bed is at 45° with respect to the optical axis that the incoming light 1720. By changing the powder bed height by 0.25 millimeters, the fringe position changes 0.245 millimeters on the powder bed. The foregoing facilitates about 170 micrometers/radian of fringe phase, or 1.07 millimeters per z period. The foregoing provides a benefit in that the tradeoff between sensitivity and phase ambiguity is advantageous. Therefore, there is about 5-10 micrometers of height resolution for the described configuration. Changing the mirror tilt angle of one of the mirrors will change these values.

Figure 23:
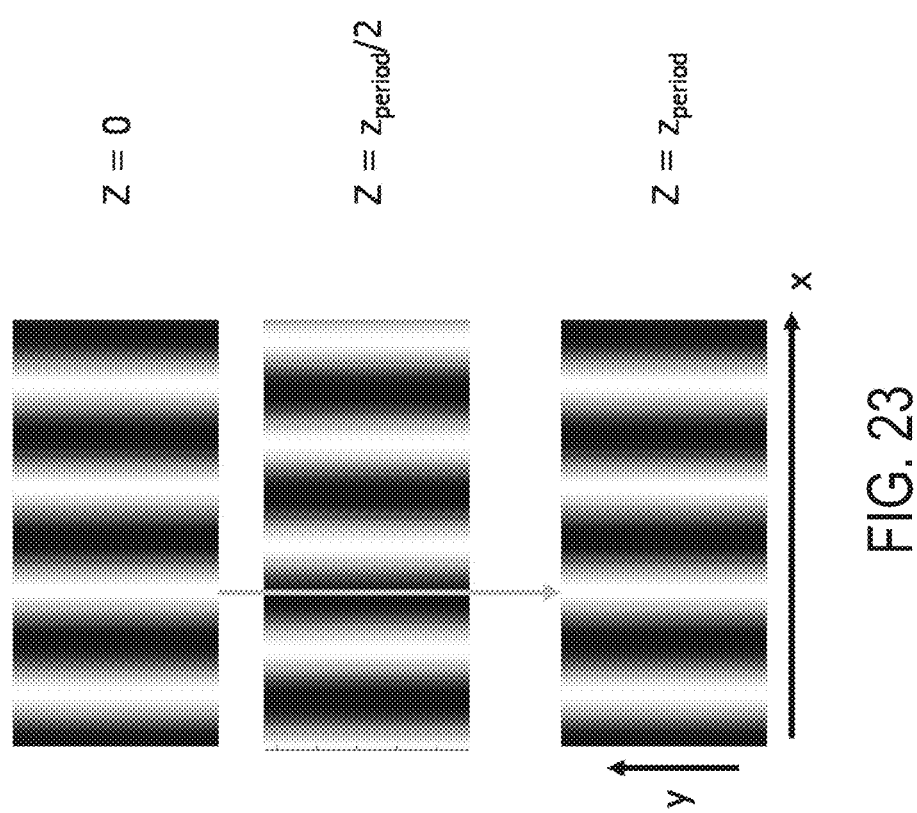
FIG. 23 is the fringe pattern for a smooth surface at various z heights.

FIG. 23 shows the shift in the fringes of one of the fringe patterns on the powder bed for one of the wavelengths of light for a relatively smooth surface of the powder bed (e.g., of a printing powder) at the z heights of the powder bed is changed. The x-axis and y-axis are the axes of the powder bed in the three-dimensional printing system, such as shown in FIG. 21.

Figure 24A:
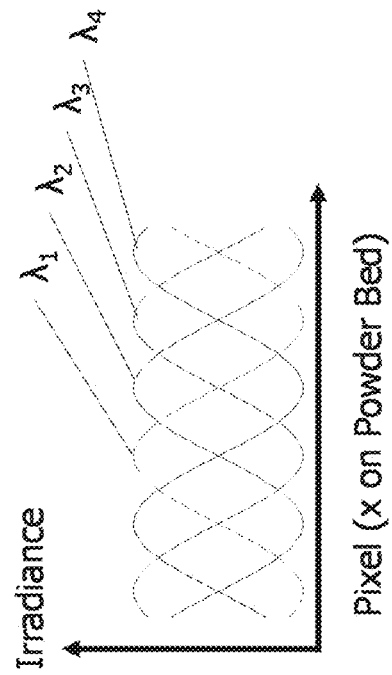
FIGS. 24A and 24B shows how each wavelength should have a different phase at each location on the SUT (Surface Under Test).
Figure 24B:
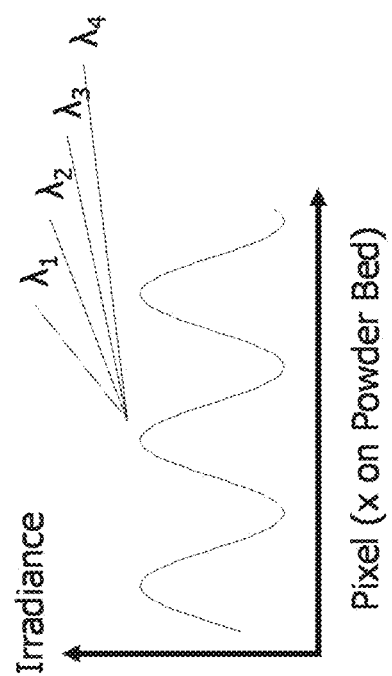

FIGS. 24A and 24B shows how each wavelength of light may have a different phase at each location on the powder bed. Benefits facilitated by the embodiments allow for capturing multiple (e.g., four or more) fringe patterns and the phase information of the fringe pattern from a location on the powder bed, part being printed, or both simultaneously. Further, because the fringe patterns for each wavelength experience the same optical condition in the illumination system, the powder bed, the detection system, or any combination of these systems, the fringe patterns will all have nominally the same phase difference as shown in the image in FIG. 24A. Thus, asynchronous processing of fringe events for multiple wavelengths can be avoided.

Figure 25:
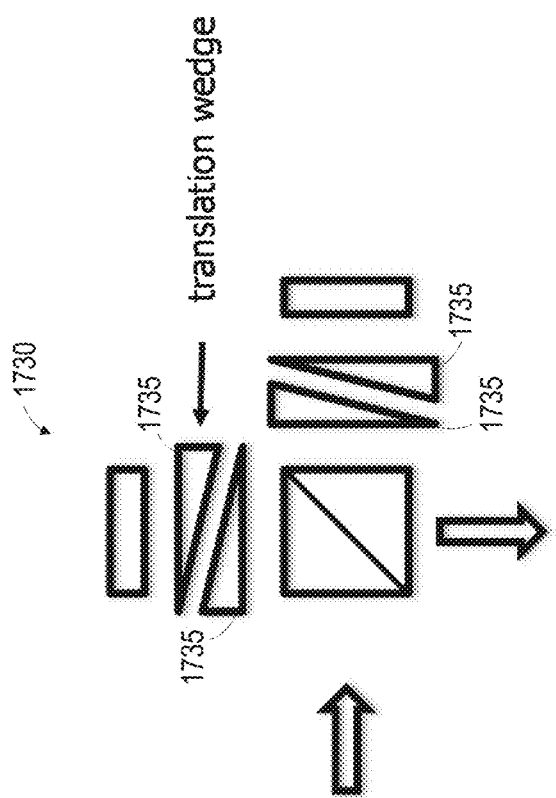
FIG. 25 shows the setup of FIG. 24 with a slightly different glass path in each arm (each optical path) of the interferometer to introduce dispersion between the various wavelengths sources.

FIG. 25 shows an embodiment of the interferometer with two sets of glass wedges, which allows for obtaining different phases for the different wavelengths at the powder bed to achieve the wavelength diagram as shown on the right side of FIG. 24.

This is accomplished using the setup in FIG. 25, with a slightly different glass path in each arm (each optical path) of the interferometer to introduce dispersion between the various wavelengths sources. The sets of glass wedges 1735 included in the two optical paths of the interferometer introduce a controlled amount of dispersive material in each of the arms. In an embodiment, fixed glass plates are located in the arms of the interferometer to obtain the different phases for the different wavelengths at the powder bed to achieve the wavelength diagram as shown on the right side of FIG. 24. In an embodiment that includes sets of wedges 1735, one pair of wedges is fixed while the other pair of wedges includes one wedge that is located on a translation stage that can vary the effective thickness of the glass in that arm of the fringe generating interferometer. Thus, the total glass path will be the same across the entire beam in each arm, and the fringe patterns at the powder bed can be imaged by the detection system to identify a position for the translating wedge. Because the wavelengths of light are each approximately monochromatic the single source dispersion does reduce fringe contrast. In one specific embodiment, each glass wedge is a 3° 53' wedge that has a diameter of 25 millimeters.

Figures 26A, 26B:
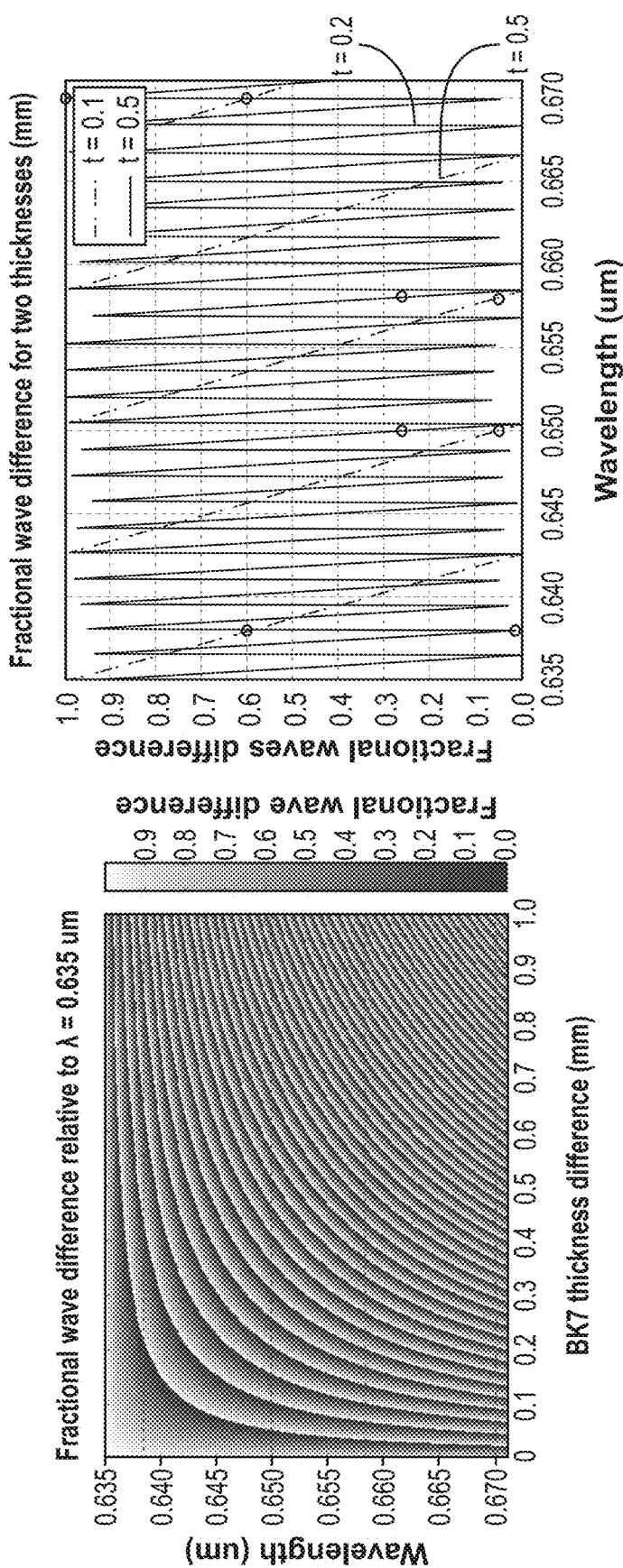
FIGS. 26A and 26B show graphical representations for the phase as a function of wavelength and glass path difference.

FIGS. 26A and 26B show a graphical representation for the phase of fringe patterns as a function of wavelength and glass path difference for wedges 1735. In an specific embodiment, the amount of phase diversity is about pi/2 radians between neighboring wavelengths, and for all of the fringe patterns to have a different phase compared to all other fringe patterns, in the case of 4 wavelengths and 4 fringe patterns. The phase difference is introduced by putting a dispersive material, such as BK7 glass, in each arm of the interferometer used to create the two beams that create the fringes. BK7 glass has dispersion, meaning a different refractive index for each wavelength. Therefore, by having a slightly different amount of glass in the two paths through the interferometer, a wavelength-dependent phase difference can be obtained for the various wavelengths. For FIG. 26A, the horizontal axis shows the thickness difference, in millimeters, for the glass in the two paths, or arms, of the interferometer used to create the fringes. The vertical axis is wavelength of the light, and the color represents the fractional wave differences, from 0 to 1.0. One wave is equivalent to 2pi radians of phase. Each horizontal line represents one of the 4 system wavelengths. This chart can be used to determine the BK7 glass thickness difference for creating the optimal phase difference between the various fringe patterns. FIG. 26B shows the same data, but for two different glass thickness differences t=0.1 millimeters and t=0.5 millimeters. The circles indicate the fractional waves of difference (vertical axis) for the set of wavelengths used in the current embodiment. For the set of wavelengths chosen, neither thickness (0.1 millimeter or 0.5 millimeter) results in the required phase diversity between the various fringe patterns, but the Figure illustrates how a useful thickness can be determined. FIG. 25 shows a hardware configuration that allows continuous variation of glass thickness difference.

Figure 27:
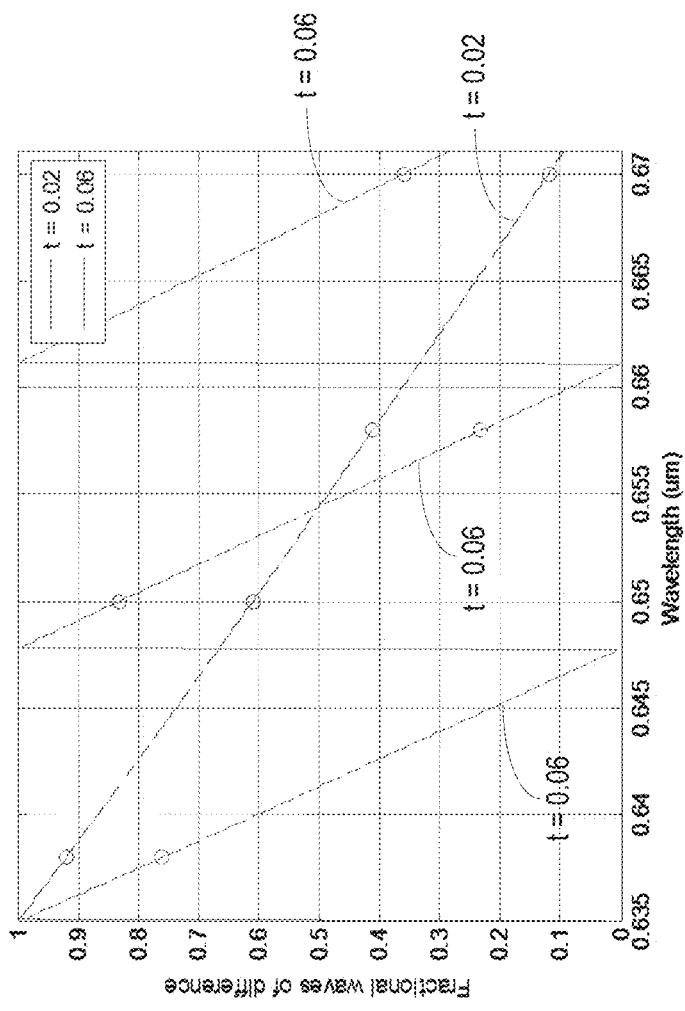
FIG. 27 shows an example of 20 micrometers and 60 micrometers thick glass path differences.

FIG. 27 shown an example graph of the phase differences for two thicknesses of glass pathways for wedges 1735 shown in FIG. 25. The phase difference are for a 20-micrometer thick glass (t=0.02) and a 60-micrometer thick glass (t=0.06) path differences. The circles represent the example wavelengths (e.g., four wavelengths). Relative to a Mach-Zehnder interferometer, the total physical glass path is half in Twyman-Green because the light traverses the glass wedges twice. For thin glass path differences (e.g., 20 micrometers and 60 micrometers), the defined phase diversity is relatively clear.

Using a mirror to introduce tilt fringes means the fringe pitch will be wavelength dependent. If the illuminated region on the powder bed is relatively small, then the number of fringes is small and the different fringe pitches are not too important. With too much phase variation, the fringes in FIG. 22 will eventually have the same phase value for some x locations, which is something required to be avoid avoided. Alternative methods, such as imaging a grating onto the wafer and blocking the zero order, will result in having the same fringe pitch for all wavelengths. In this case, the phase offset between wavelengths does not change spatially.

Figure 28:
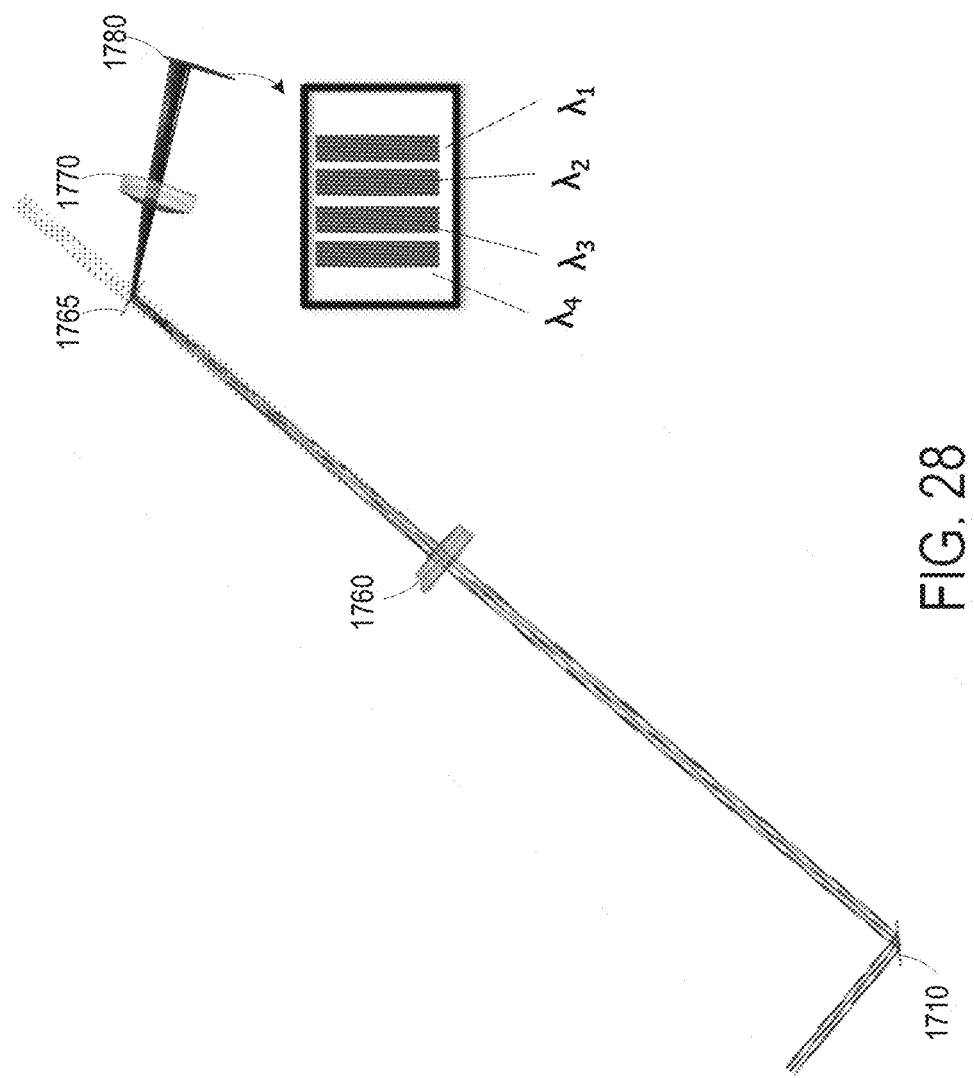
FIG. 28 shows the grating and pupil arrangement in the receiving side optics, along with the approximate spatial separation of each wavelength's image.

FIG. 28 shows the grating and pupil arrangement in the receiving detector optics and the approximate spatial separation of the image for each wavelength. The projected fringe pattern is captured by the receiving side optical system, which images the SUT onto the camera with a magnification of −0.226. The multiple wavelengths are separated at the detector. Thus, a grating (same as the sending side grating) is introduced at the pupil of the imaging system so that a shift, but no tilt, is introduced at the camera plane. The wavelengths are relatively close to each other in order to approximately minimize the relative phase offsets across the SUT and to have similar behavior at the powder bed. The tradeoff is that a fine pitch grating is used to separate the wavelength images (e.g., four wavelength images) at the camera. Table 3 below shows the angle difference and position difference.

TABLE 3

| Wavelength (nanometers) | Wavelength difference (nanometers) | Angle Difference at Pupil (degrees) | Position Difference at Camera (millimeters) |
| --- | --- | --- | --- |
| 670 | | | |
| 658 | 12 | 2.347 | 1.639 |
| 650 | 8 | 1.439 | 1.005 |
| 638 | 12 | 2.013 | 1.406 |

Figure 29:
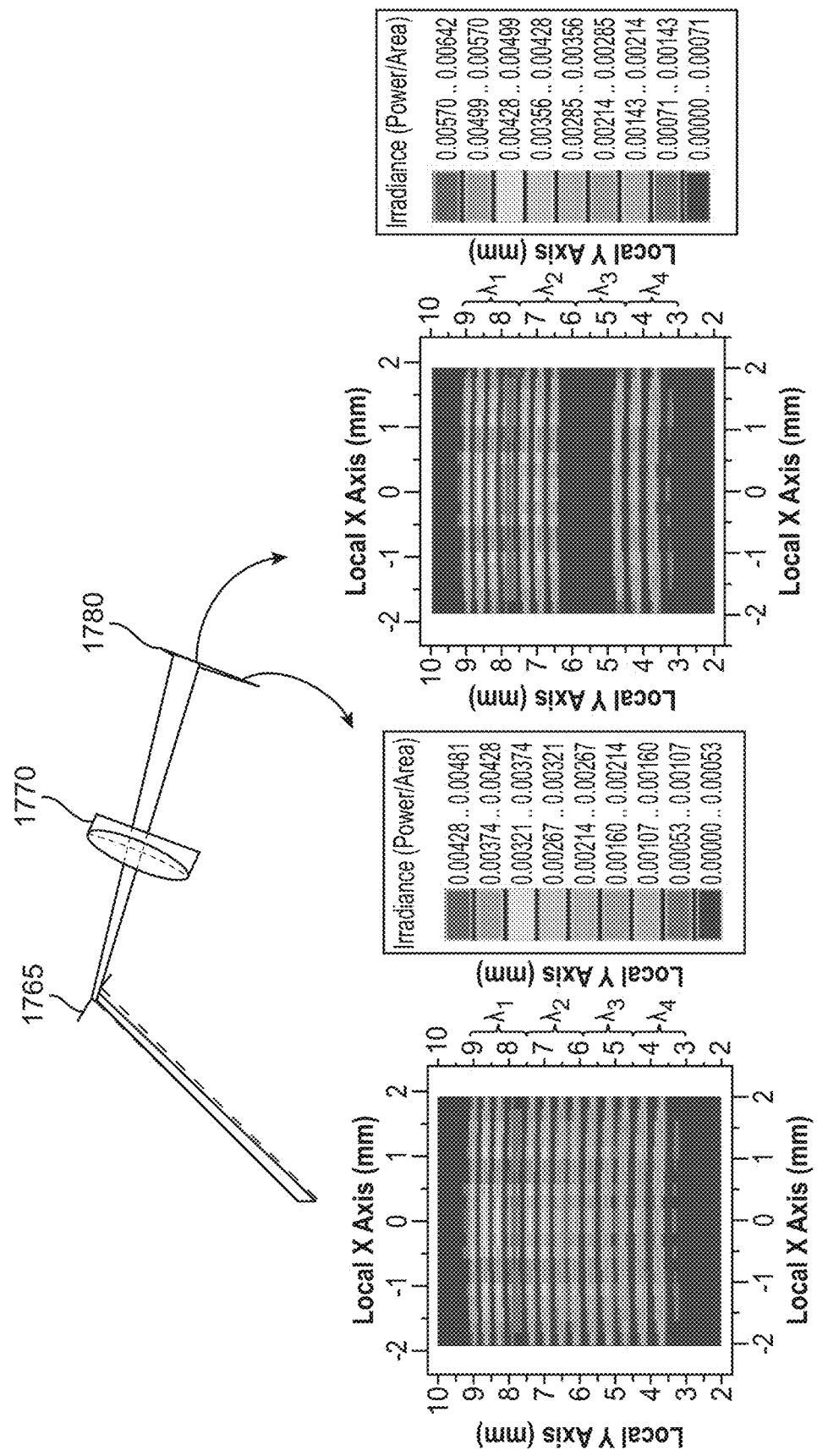
FIG. 29 has simulation results of the four spatially separated images from FIG. 28, with the optics as designed.

FIG. 29 shows fringe patterns for four spatially separated images that are imaged onto the detector array of the camera 1780, in an embodiment. The fringe patterns are fringe patterns that are formed on the detector array of the camera 1780. The formed fringe patterns are for the optical configuration of Table 3 and the optical configuration of FIG. 28. The horizontal axis and the fringe patterns in are perpendicular to the primary direction of the powder bed motion. The vertical axis is parallel to the motion direction. In the right image, one of the wavelengths is turned off to show the separation of the fringe patterns.

This description and the figures and their accompanying text describe the concept and implementation of a simultaneous fringe projection system that allows rapid topographical measurements of a 3D printer powder bed, or any other rapidly moving, nearly continuous surface to be tested. The system operates in parallel to the system it is measuring such that there is no loss in productivity or throughput.

The above explained simultaneous fringe projection methods provide a 3D map (height at a 2D grid of points), with over a million measurements, within the time of a single camera frame. Since no temporal phase shifting is needed, the system can capture a moving target. Although there are several important design considerations that should be met for the best performance, the components are inexpensive and readily available.

This system will work well with any powder bed 3D printing system, providing real-time metrology of the powder bed, the most recently printed layer or both without reducing throughput. In situ metrology will give the system a competitive advantage in the 3D printing market. The metrology also provides the opportunity to incorporate real-time repairs or compensation for any issues that are found using the metrology.

1. A fringe projection metrology system that captures all the necessary data in a single camera frame.

2. The system projects at least four fringe patterns onto the substrate, where each has a different wavelength.

3. An imaging system images the test surface plane onto the camera.

4. A projection system that ensures the multiple fringe patterns are out of phase with each other at every location on the test surface. (a variable thickness glass wedge, as disclosed, or another option)

5. The magnitude of the phase offsets should nominally be pi/2 radians; other values close to this are fine.

6. At or near the pupil of the imaging system of 3, there is a spectrally dispersive element, such as a grating or prism, to create an angle difference between the different wavelengths.

7. A Fourier transform lens is used to convert these angle differences into position differences on the camera, such that they are fully spatially separated.

8. A processing system to combine the N images such that the phase of the fringe pattern is computed.

9. A conversion from phase into height (topography) of the measurement system.

10. The above works on a stationary target, perhaps where system vibrations are a problem, and so vibrations are avoided.

11. It also works on a system where the test part is in continuous motion, allowing the full test surface to be measured without reducing the speed of its motion.

12. The above, where the region of interest (ROI) on the test surface is narrow enough that N copies can fit on the same sensor simultaneously.

Calibration

In some embodiments, the measurement device is calibrated. For example, a calibration standard is measured using the measurement device. In some embodiments, the calibration standard is flat. In an alternative embodiment, the calibration standard is not flat. The measurement from the measurement device measures a height profile. Since the calibration is flat, the measured height profile can be subtracted out of any given new image. This will calibrate the height measurement by subtracting out measurement system background.

In some embodiments, several standards are used for calibration. For example, a calibration standard includes structures of known heights. The measured calibration system uses the structures with known heights to calibrate height determinations of the system. The height calibration is used to scale measurements, calibrate measurements, or both made using the system.

3D Metrology System

Figure 30:
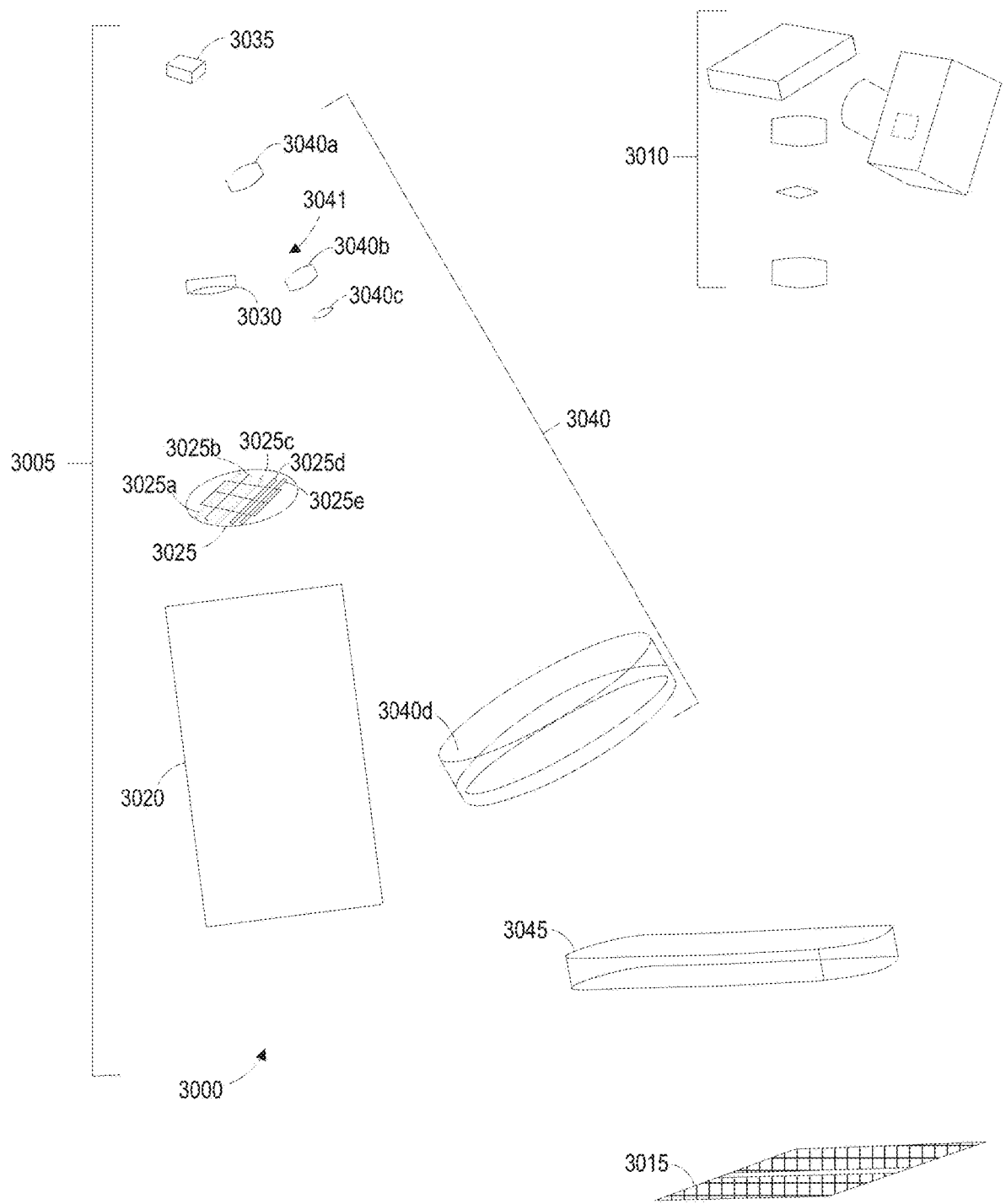
FIG. 30 depicts an embodiment of a 3D metrology system or 3D measurement system for determining a topography of a substrate or a surface under test.
Figure 31:
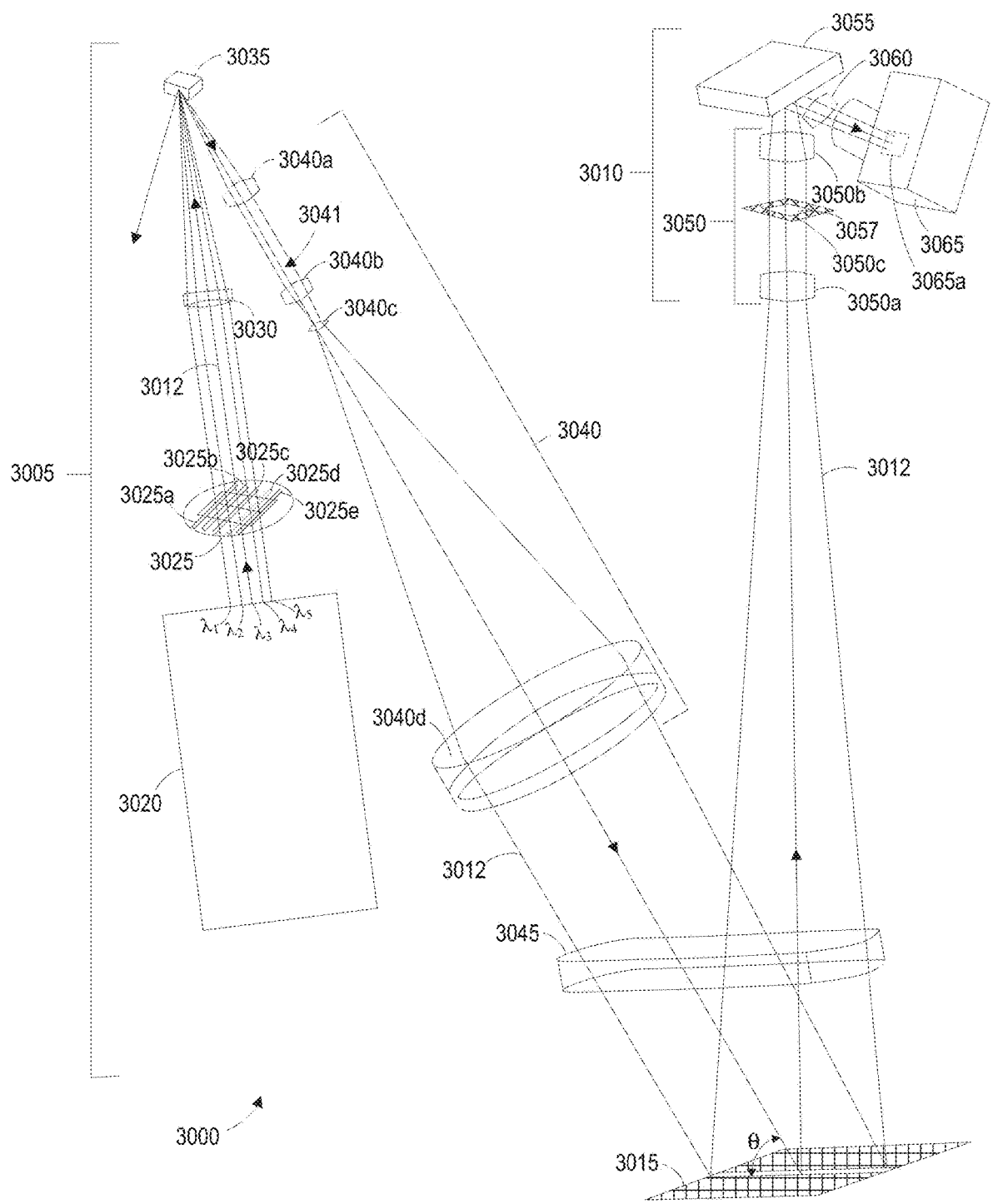
FIG. 31 depicts another embodiment of a 3D metrology system or 3D measurement system for determining a topography of a substrate or a surface under test.

FIGS. 30 and 31 depict an embodiment of a 3D metrology system or 3D measurement system for determining a topography of a substrate or a surface under test (SUT), 3015. In the example shown, the 3D metrology system comprises an illumination system 3005 and an imaging system 3010. The illumination system projects a set of spatially overlapping fringe patterns on to the substrate simultaneously. As an example, in some cases, there can be 3, 4, 5, or more spatially overlapping fringe patterns that are projected on to the substrate simultaneously. Each of the fringe patterns on the substrate is generated by a different discrete wavelength. In this case, a discrete wavelength refers to a source that is monochromatic or that has a narrow spectral bandwidth about the center wavelength of somewhere from 0.1 to 10 nm. Ideally, the bandwidth is less than 1 nm for each source.

Figure 10B:
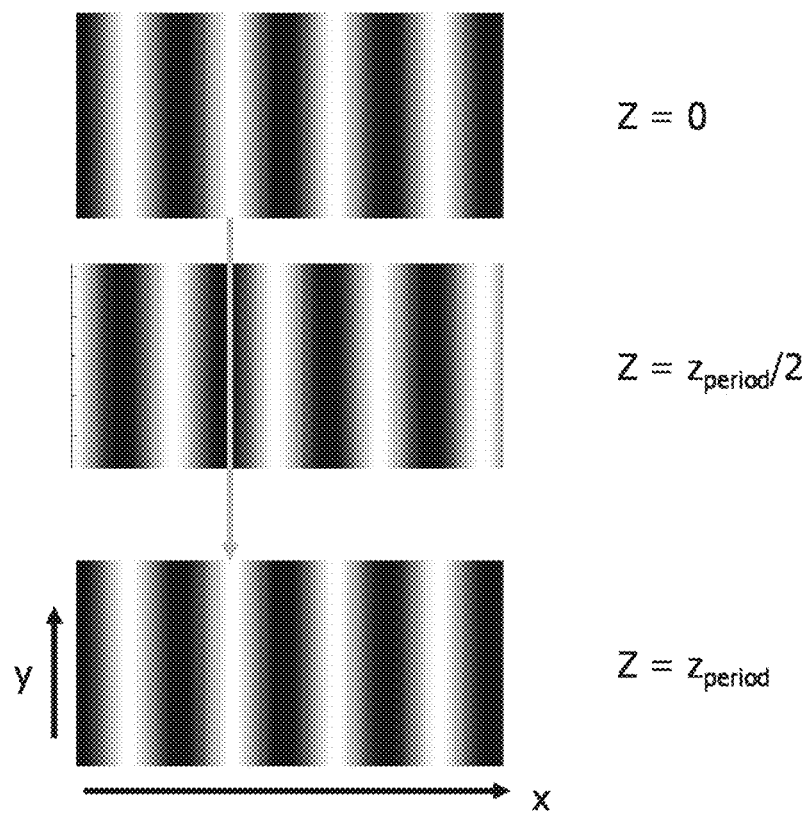

FIG. 10B shows an exemplary fringe pattern that is projected onto the substrate. In the case of Z=0, the fringes are shown to look like tilt fringes. It is well known in the art that the phase map of tilt fringes looks like a flat, but tilted plane. Therefore, if a perfectly flat substrate is measured, the fringes will look like FIG. 10B, and the 3D metrology system will know that there is a fixed tilted plane of phase that is always measured when a perfectly flat surface is tested. This fixed tilted plane of phase is called the baseline phase map, and it must be subtracted from every measurement. In FIG. 10B, if that perfectly flat surface moves down a distance $z_{period}/2$, then the fringes shift by a half of the fringe period. If we measure the phase map of the second image in FIG. 10B, we will see that everywhere it is different from the first phase map by pi radians. We can convert this phase difference into a topography change of the substrate by using the conversion factor, $z_{period}$. For example, if $z_{period}=1$ mm, then a shift of pi radians results in a topography change of [pi radians*1 mm/period*1 period/(2pi radians)=0.5 mm]. In order to determine the topography, the baseline phase map must be subtracted from each measurement.

FIG. 10B depicts a simple example where the height change is the same everywhere. In practice, the height change can be different at every location in the region of interest, or in the phase map. Therefore, multiple (e.g., 3, 4, 5 or more) phases of fringe pattern need to be measured at each location on the substrate by the 3D metrology system. The embodiment described here allows all of the composite multi-fringe projection fringe patterns to be projected onto the substrate overlapping and at the same time. It also shows how to measure all of that information simultaneously, in a single image frame.

Each fringe pattern in the set of spatially overlapping fringe patterns has a different fringe phase. In particular, a known phase difference exists between each of the fringe patterns in the set of spatially overlapping fringe patterns. In some cases, the known phase differences are a fraction of pi and the fraction is configured to span a total phase difference of about 2pi. For example, in some cases, the known phase differences are about pi/2.

Preferably, the total range of fringe phases is greater than pi radians, and more preferably, 2 pi radians or more, depending on the number of fringe patterns. This range of fringe phases is called phase diversity, and it is understood in the art that sufficient phase diversity is required to use the captured data to determine the phase of the fringe pattern.

The imaging system collects reflected or scattered light from the set of spatially overlapping fringe patterns that are simultaneously incident on the substrate. The imaging system separates each fringe pattern so that it can be measured on a spatially different region of a detector, such as, for example, a camera or a sensor. In this manner, the full set of fringe patterns are captured at the same time and on the same camera, in a single image frame or single digital image frame. The information from the multiple fringe patterns can be combined to determine the phase map of the substrate.

In some embodiments, information from multiple fringe patterns is combined using phase-shifting interferometry algorithms (such as the Schwider-Hariharan 5-step algorithm) or Least Squares Phase Shifting Interferometry (LSPSI) algorithms, and using imaging data collected by the imaging system. The phase, which is a value that is modulo 2pi, needs to be converted into height, in microns. In some cases, the conversion of phase into height is done using above Equation 1. The result of applying an algorithm as disclosed herein can be used as a spatial map of the phase of the fringe patterns. Once the phase of one fringe pattern is determined, the phase of all of the projected fringe patterns can be determined since all of the sets of spatially overlapping fringe patterns on the substrate have a known phase difference relative to each other.

In some embodiments, one of these maps of fringe phase is converted from phase into topography. The conversion factor, in units of microns/radian, for example, can be spatially dependent (i.e., different for every location on the substrate), depending on the overall system design. Ideally, the coefficient should be nearly constant across the full measurement region, region of interest or field of view of the 3D metrology system.

The illumination system is configured to generate light 3012 and direct the light 3012 toward a powder bed 3015 and a part being printed in the powder bed. Detection system 3010 is configured to detect the transmitted light subsequent to reflection or scatter from the powder bed and a part being printed. Light, as referred to in this patent, may include one or wavelengths in one or more wavelength ranges, such as infrared, visible light, ultraviolet light, or other wavelength ranges.

In some embodiments, a 3D metrology system for determining a topography of a substrate includes a fringe projection system that projects a set of spatially overlapping fringe patterns on a substrate simultaneously. Each one of the fringe patterns in the set of spatially overlapping fringe patterns is generated by a different wavelength than each of the other fringe patterns in the set. This provides a composite multi-fringe projection projected on the substrate, wherein each fringe pattern in the set of spatially overlapping fringe patterns has a different fringe phase such that the set provides sufficient phase diversity to enable the determination of a topography of the substrate. The 3D metrology system also includes an imaging system that collects at least one of reflected and scattered light from the composite multi-fringe projection projected on the substrate to provide imaging data. Finally, the 3D metrology system includes a processing system configured to determine a phase map of the substrate from the imaging data and determine the topography of the substrate based on the phase map. The phase map is proportional to the topography of the substrate.

In some embodiments, the topography of the substrate changes. In these cases, as the topography of the substrate changes, the fringes in the composite multi-fringe projection projected on the changing topography of the substrate shift in response to the changing topography of the substrate. Determining the topography of the substrate based on the phase map includes determining a phase shift of the fringes at each location on the substrate based on observing the at least one of reflected and scattered light in response to the fringes shifting on the changing topography of the substrate and determining a height of the substrate at each location on the substrate based on the phase shift of the fringes.

In some embodiments, a goal of the 3D metrology system is to measure a topography of the substrate. As an example, in the case of a 3D printing process, new layers of a 3D part are being added, one by one and the substrate is the changing surface of the powder bed where the part is being built. As the layers are added to build the part, the topography of the powder bed changes, and this can be measured by the 3D metrology system without interrupting the 3D printing process.

In some cases, the topography of the substrate at a particular moment of interest is determined from imaging data provided by the imaging system at the particular moment of interest. The imaging data can be a single image frame.

In some applications, the substrate changes topography due to being subjected to a process, and the 3D metrology system is configured to monitor the changing topography of the substrate by providing a determination of the topography of the substrate at any given moment during the process.

In some cases, the 3D metrology system is calibrated so that the relationship between fringe phase and topography is known. The fringe phase is determined by the imaging data provided by the imaging system. In particular, using the disclosed techniques, a complete topography measurement can be completed from a single image frame that is captured at a particular moment of interest. For example, a moment of interest can be when the substrate is passing under the field of view, or region of interest, of the 3D measurement system. A moment of interest can also be when it is expected that the topography of the substrate has changed, and it is desirable to measure that change. That change happens because the substrate is subjected a process, such as in the case of a powder bed 3D printer, where more powder is added to the substrate, or energy is deposited to the substrate to melt the metal powder and build a 3D part, or after the system has cooled somewhat, or any of several other processes that could reasonably be expected to change the topography of the substrate. The disclosed techniques can be applied to various types and configurations of a powder bed in a 3D printing system. Such 3D printing systems include for example, systems that move the powder bed in a linear motion, or systems that move the powder bed in a rotary trajectory. The disclosed techniques can also be applied in 3D printing systems wherein the powder bed is not moved at all, for example, in systems having a fixed powder bed system.

For example, in some printing 3D printing applications, the substrate comprises a powder bed, the process comprises a 3D printing process configured to build a part out of powder, and the 3D metrology system is configured to monitor the changing topography of the part as it is being built during the 3D printing process. The powder bed can be part of at least one of a linear powder bed system and a rotary powder bed system and monitoring the changing topography of the part can be performed in-situ and in real time.

As shown in FIGS. 30 and 31, a fringe projection system 3005 includes a plurality of sources 3020 (e.g., a source generator) configured to provide illumination beams of different wavelengths, each source comprising a discrete wavelength; a custom phase grating 3025, located in the object plane of the illumination system, which is conjugate to the substrate; an illumination pupil grating 3035; and fringe projector optics 3040 configured to magnify the fringe patterns to cover a desired region on the substrate. Also shown in this example is a first lens system 3030 and a chamber window 3045. Additionally, fringe projector optics 3040 comprises lenses 3040*a*-3040*d*.

In some embodiments, source generator 3020 is configured to generate and emit light 3012 having a number of wavelengths, such as two, three, four, five, six, seven, eight, nine, ten, or more wavelengths. In an embodiment, the illumination system is configured to generate and emit light having five different wavelengths.

In particular, in some embodiments, a preferable configuration is one wherein the composite multi-fringe projection is generated by five different discrete wavelengths. In this case, the phase difference between each fringe pattern at the substrate is about pi/2, so that the difference between the first and last of the 5 wavelengths is 2pi. The phase differences do not need to be exactly pi/2 at every discrete location that is measured, but this is the goal of the system in this particular example. The algorithms used for data processing can account for variations from pi/2. The algorithms can perform even better if the phase differences between the multi-fringe projection fringe patterns is known, for example, through a calibration process. For instance, a calibration process can be performed by looking at a known, flat surface and calculating the actual phases of the multi-fringe projection patterns. The calculated actual phases of the multi-fringe projection patterns are then used in the algorithms, such as LSPSI, in a way that is understood by those in the art.

Figure 32:
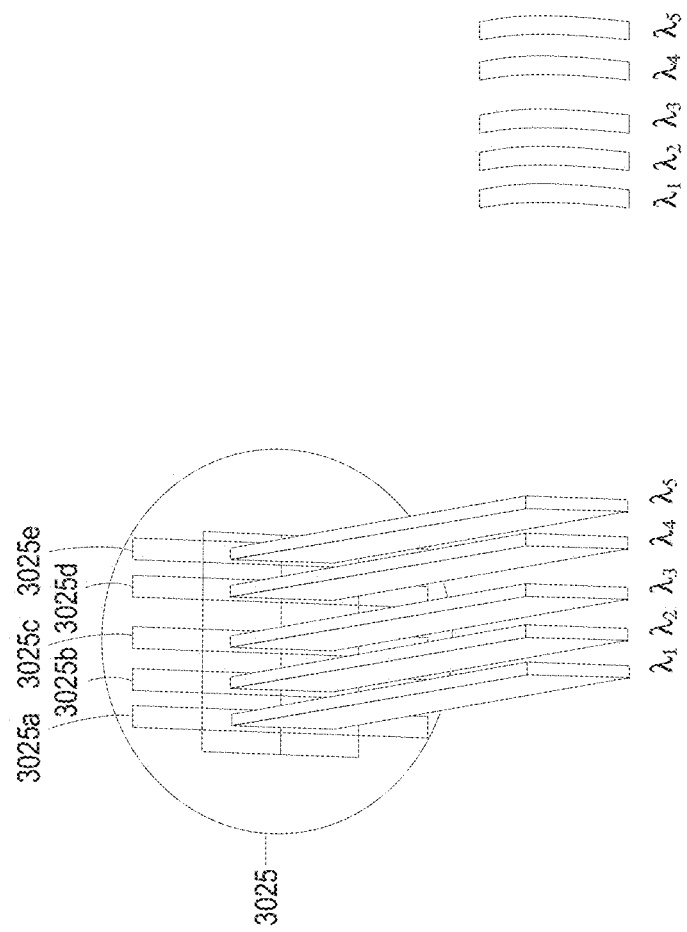
FIG. 32 shows the wavelengths labeled $\lambda_1$, $\lambda_2$, $\lambda_3$, $\lambda_4$, and $\lambda_5$.

In particular, FIG. 32 shows a plurality (five) of light sources configured to provide illumination beams of different wavelengths, labeled $\lambda_1$, $\lambda_2$, $\lambda_3$, $\lambda_4$, and $\lambda_5$. In the example shown, the illumination beams are generated by a source generator, 3020 in FIG. 31. Here, the composite multi-fringe projection is generated by the five different wavelengths. In this case, each illumination beam has roughly uniform illumination over a rectangular shaped region it illuminates on 3025, the custom phase grating, as opposed to Gaussian illumination.

In some embodiments, the source generator may include a number of lasers, such as diode lasers, that generate the emitted light. The wavelengths may be in the range of about 600 nanometers to about 850 nanometers. In one embodiment, the wavelengths are 642 nanometers, 685 nanometers, 730 nanometers, 785 nanometers, and 825 nanometers.

In some embodiments, each source in the plurality of sources illuminates the custom phase grating at one of the discrete wavelengths and at a proper position. As an example, wavelengths of light generated by the source generator are directed toward the custom phase grating, which is a first object plane of the illumination system.

The custom phase grating comprises different phase grating patterns to project multiple orders at an illumination pupil grating for each illumination beam. In particular, each order leaves the custom phase grating at different angles relative to a first axis, the first axis being parallel to the direction of the optical axis of the system at the custom phase grating. Additionally, the custom phase grating is configured to provide a spatial separation such that each phase grating pattern in the object plane is for a given discrete wavelength, and such that a phase of each fringe pattern in the set of spatially overlapping fringe patterns is offset from a phase of each of the other fringe patterns in the set of spatially overlapping fringe patterns by a desired amount at the substrate.

Figure 34:
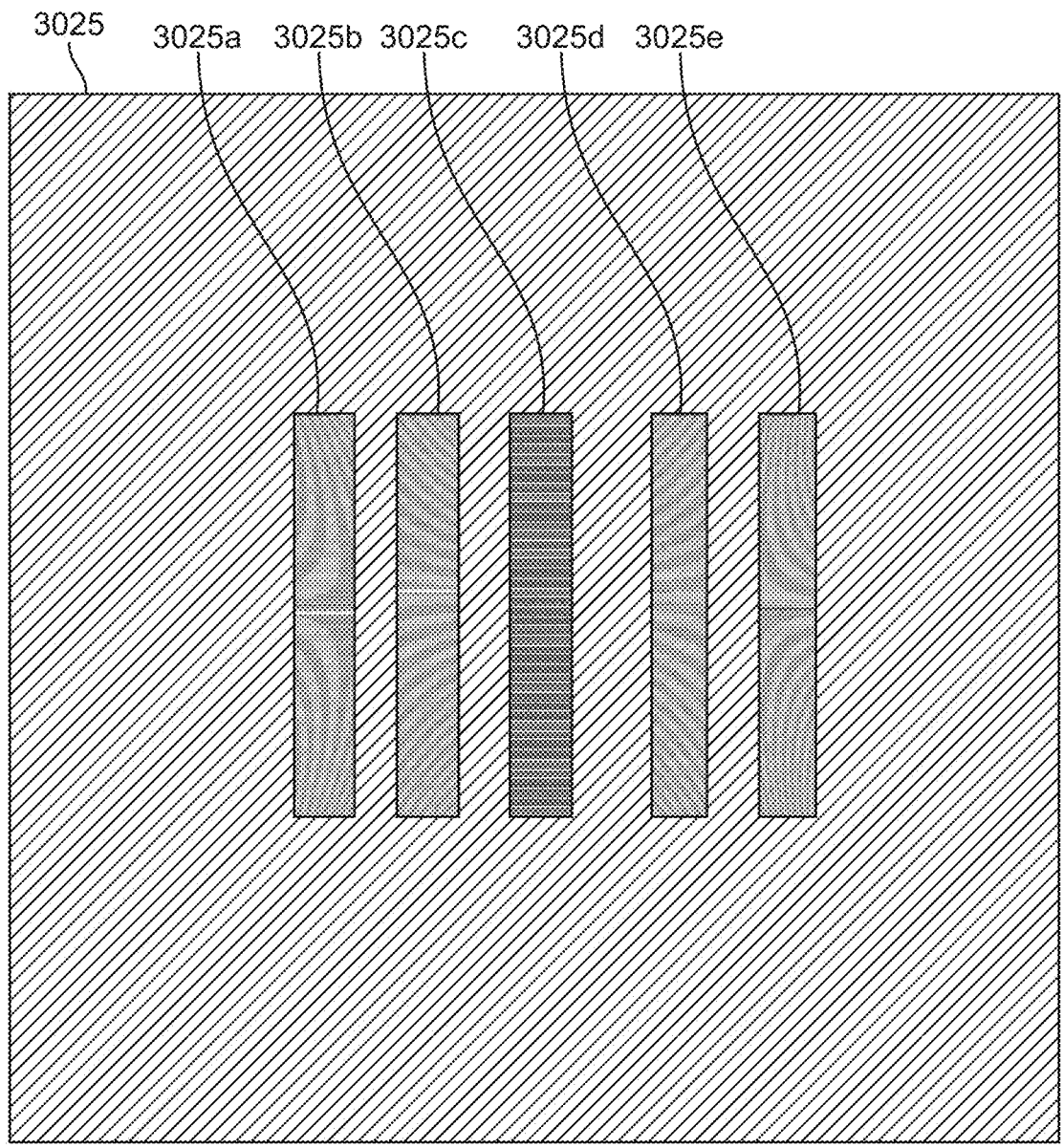
FIG. 34 shows the phase plate, in an embodiment.

FIG. 34 shows a close up an exemplary custom phase grating 3025, where there are a corresponding number of different phase grating patterns, one per illumination beam (3025*a*, 3025*b*, 3025*c*, 3025*d*, 3025*e*), that are located at different positions on the custom phase grating. All five illumination beams are travelling parallel to a first axis, which is the optical axis that goes through the center of the custom phase grating and is normal to the custom phase grating surface. When one illumination beam is incident on its corresponding different phase grating pattern at a proper position, multiple diffraction orders are generated. In this example, a proper position means the illumination beam is incident on the one of the different phase grating patterns that was designed for that particular illumination beam discrete wavelength, and the illumination beam is not incident on any of the other different phase grating patterns. Each of the multiple diffraction orders propagates away from the custom phase grating at an angle relative to the first axis, such that each diffraction order propagates at a different angle. A set of multiple diffraction orders is generated by each different phase grating pattern that makes up the custom phase grating.

The phase grating patterns may include a number of different phase grating patterns. The spacing between adjacent phase grating patterns may be the same or different. Alternatively, the spacing between some of the adjacent custom phase grating patterns may be the same whereas others of the spacing between adjacent phase grating patterns are different.

The wavelengths of light transmitted from the source generator to the custom phase grating are spatially separated at the custom phase grating. For example, the first wavelength $\lambda_1$ is transmitted from the source generator may be spatially separated from $\lambda_2$, $\lambda_3$, $\lambda_4$, and $\lambda_5$, so that $\lambda_1$ illuminates phase grating 3025a and does not illuminate the other phase gratings. The second wavelength $\lambda_2$ transmitted from the source generator may be spatially separated from $\lambda_1$, $\lambda_3$, $\lambda_4$, and $\lambda_5$, so that $\lambda_2$ illuminates phase grating 3025b and does not illuminate the other phase gratings. The third wavelength $\lambda_3$ transmitted from the source generator may be spatially separated from $\lambda_1$, $\lambda_2$, $\lambda_4$, and $\lambda_5$, so that $\lambda_3$ illuminates phase grating 3025c and does not illuminate the other phase gratings. The fourth wavelength $\lambda_4$ transmitted from the source generator may be spatially separated from $\lambda_1$, $\lambda_2$, $\lambda_3$, and $\lambda_5$, so that $\lambda_2$ illuminates phase grating 3025d and does not illuminate the other phase gratings. And, the fifth wavelength $\lambda_5$ transmitted from the source generator may be spatially separated from $\lambda_1$, $\lambda_2$, $\lambda_3$, and $\lambda_4$, so that $\lambda_5$ illuminates phase grating 3025e and does not illuminate the other phase gratings.

Referring again to FIG. 32, this figure shows the light entering the phase grating patterns 3205a-3025e where the wavelengths of the light remain spatially separated. Each phase grating pattern is configured to output multiple orders of light (such as . . . , −3, −2, −1, 0, +1, +2, . . . ) for the particular wavelength of light that the phase grating pattern receives. The wavefronts for each of the wavelengths of light have approximately rectangular shapes or arc shapes.

The light transmitted from the custom phase grating is transmitted through lens system 3030, which transfers the light at the illumination pupil grating 3035. In an embodiment, the illumination pupil grating is a reflective holographic grating.

In some embodiments, two of the multiple diffraction orders are allowed to propagate all the way to the substrate, or surface under test, to create a projected fringe pattern for the discrete wavelength of that illumination beam. The projected fringe pattern is the interference between two diffraction orders from the custom phase grating. In this manner, the disclosed techniques can be used to generate or to provide a composite multi-fringe projection on the substrate, with one set of projected fringes for each illumination beam and each discrete wavelength. In the example described below with respect to the following figures, there are five overlapping fringe patterns on the substrate.

In particular, as described above, FIGS. 30 and 31 depict an example of an entire 3D metrology system, without and with rays drawn, respectively. In this case, the 3D metrology system includes an illumination system 3005, and an imaging system 3010. The custom phase grating 3025, is in the object plane of the illumination system. The custom phase grating is imaged to an intermediate image plane 3041, and then imaged to the substrate 3015. Therefore, the custom phase grating, the intermediate image, and the substrate are all conjugate to each other, as object and image planes.

In the example shown, the multiple diffraction orders produced by the custom phase grating propagate through lens 3030 to the illumination pupil grating, 3035. In this case, the illumination pupil grating is located at or near a pupil of the optical system that images the object plane to the substrate. Therefore, the different angles of the multiple diffraction orders map to different positions on the illumination pupil grating along a second axis that is perpendicular to a first axis.

The illumination pupil grating serves multiple functions. First, it includes a mask that is configured to allow only two of the multiple diffraction orders to continue through the optical system to the fringe projector optics 3040, and to the substrate. In this manner, the illumination pupil grating allows the two orders per discrete wavelength to continue and to generate a fringe pattern associated with the discrete wavelength.

Figure 35:
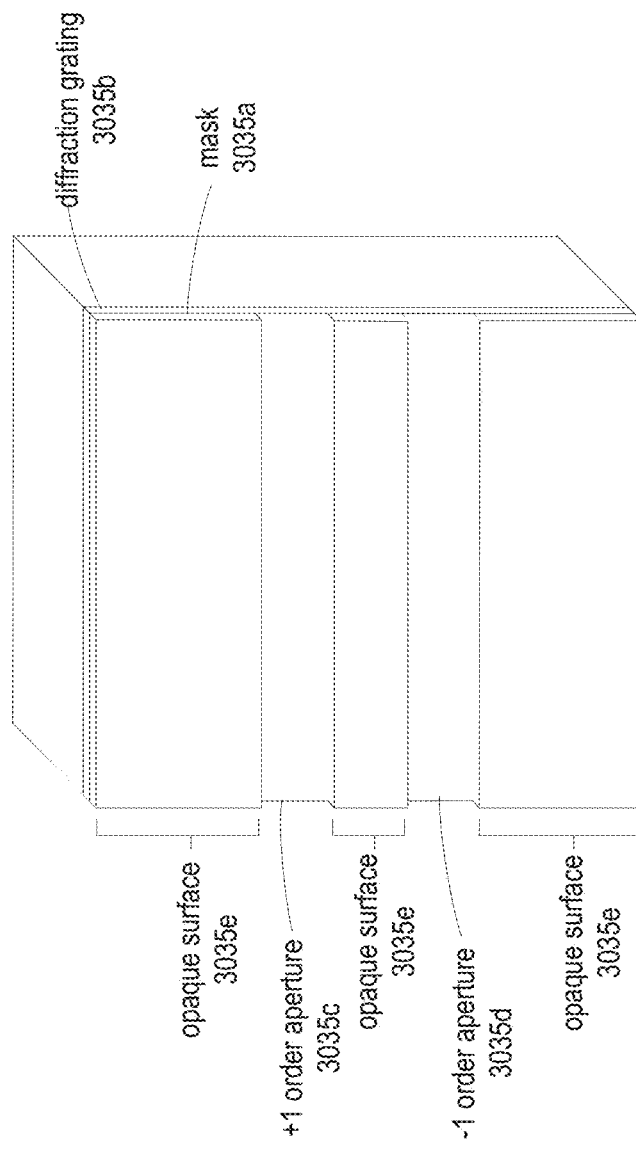
FIG. 35 shows an oblique view of illumination pupil grating, in an embodiment.

A nominal configuration of this mask is shown in FIG. 35, where the surface is opaque except for two regions 3035c and 3035d, which allow the +1 and −1 orders of the multiple diffraction orders to continue through the optical system. It could be configured to allow the 0 and +1, the −1 and −2 orders, or any other combination of two orders. Note that 3035c and 3035d are separated along the second axis, as is the positions of the light from the +1 and −1 orders, which are shown for clarity in FIG. 36.

A second purpose of the illumination pupil grating is to combine the light from the two diffraction orders each of the plurality of illumination beams incident on the custom phase grating, so that all of the wavelengths leave the illumination pupil grating propagating in the same direction. In the case of five illumination beams and five different phase grating patterns on the custom phase grating, two diffraction orders are passed by the mask per illumination beam, resulting in a total of ten diffraction orders that leave the illumination pupil grating. Each pair of diffraction orders corresponding to a same discrete wavelength creates a fringe pattern on the substrate.

As can be seen in FIG. 31, the light from the multiple sources is all incident on the illumination pupil grating at a different angle about the second axis. The illumination pupil grating has grating lines that run parallel to the second axis. The light from each incident wavelength will diffract from the illumination pupil grating into various (e.g., −1, 0, +1, etc.) diffraction orders, according to the pitch of the illumination pupil grating, the orientation of the grating, and the angle of incidence of each of the multiple diffraction orders, which are all related by a grating equation that is well known to those in the art. In this case, the illumination system is configured such that the multiple wavelengths arrive at the illumination pupil grating at different angles with respect to the first axis, but diffract so that they all leave the illumination pupil grating substantially at the same exit angle from the illumination pupil grating, where the exit angle is defined relative to the first axis. After the light diffracts from the illumination pupil grating and passes through the mask, there are only two of the multiple diffraction orders for each discrete wavelength from the custom phase grating, the interference of each pair of diffraction orders creating projected fringes on the substrate, and they are all traveling to the fringe projector optics. All ten diffraction orders were diffracted by the illumination pupil grating into the same of the various diffraction orders, typically either the +1 or the −1 order.

Figure 33:
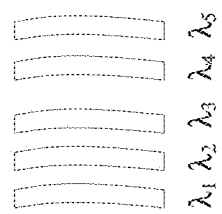
FIG. 33 shows the phase gratings numerically identified.

It is understood in the art that combining discrete wavelengths using an illumination pupil grating in this orientation means the image of the illuminated region on the custom phase grating at the intermediate image 3041 will result in a shape that has smile, or curvature, that is different from the rectangular region that was illuminated. This smile is shown in FIG. 33, with each source spatially separated for clarity. At the intermediate image plane, all of the smile shaped images of the rectangular regions are spatially overlapping.

Returning to FIGS. 30 and 31, the fringe projector optics 3040 transfer the light from the illumination pupil grating to the intermediate image 3041 through lens 3040a, and then through lenses 3040b, 3040c and 3040d to the substrate 3015.

Figure 37:
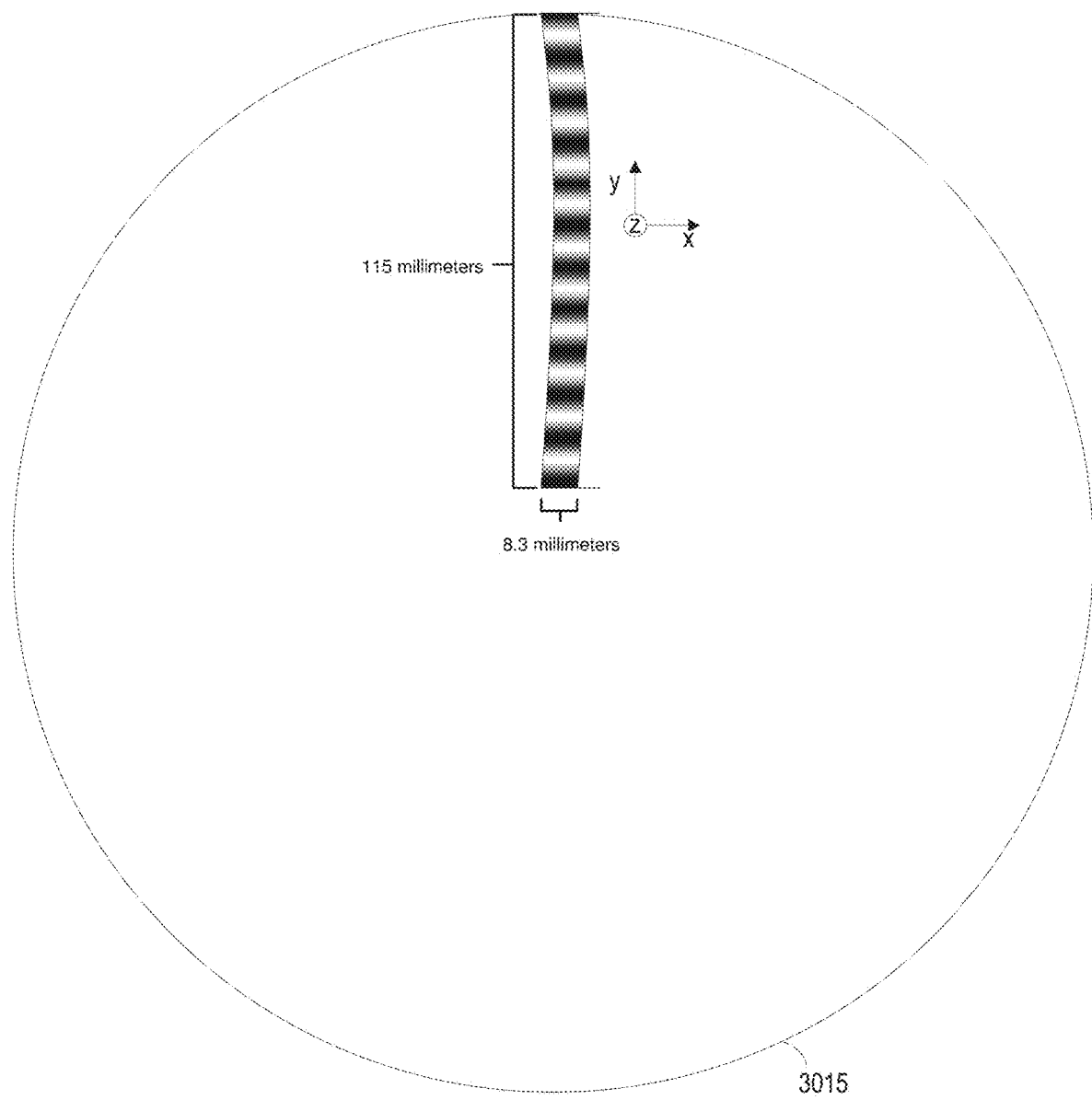
FIG. 37 shows the size and shape of one of the wavefronts and the fringe pattern for the wavefront on the powder bed for one of the wavelengths of light.

FIG. 37 shows schematically what the fringe pattern for one of the discrete wavelengths looks like on the substrate 3015, after it has gone through the entire illumination system 3005. The fringe projector optics 3040 magnify the fringe patterns to cover a desired region, or region of interest, on the substrate.

The illuminated region on the substrate is simultaneously illuminated with a composite multi-fringe projection comprising spatially overlapping fringe patterns from each of the discrete wavelengths, wherein each fringe pattern in the set is overlapping, and each set has a different fringe phase. The different fringe phase is controlled by the different phase grating patterns on the custom phase grating, such that the difference between nearest different phase grating patterns results in fringe patterns that are different in steps of about pi/2 radians of phase at the substrate. In other words, each of the different phase grating patterns creates a unique projected fringe pattern for each wavelength that is formed by the interference of the two of the multiple diffraction orders transmitted by the mask on the illumination pupil grating.

Recall the conversion from phase into topography or height is determined by $Z_{period}$, where $Z_{period}$ is given in Equation 1 and depends on $T_{substrate}$ and the angle of incidence, theta. Since it is desirable that the conversion factor, in units of microns/radian, is the same across the entire region of interest on the substrate, it is best if theta is the same everywhere. Therefore, lens 3040d of FIGS. 30 and 31 is arranged to make the light incident on the substrate at about the same angle everywhere. In addition, in some embodiments, the fringe projector optics and the illumination system are configured such that the mean or average angle of incidence for the two diffraction orders for each discrete wavelength is the same as the mean or average angle of incidence for all of the other pairs of diffraction orders for all of the other discrete wavelengths.

FIG. 35 shows an oblique view of illumination pupil grating 3035, in an embodiment. In the example shown, illumination pupil grating 3035 includes a mask 3035a at or near a surface of a diffraction grating 3035b. The mask includes a first transmission region 3035c, a second transmission region 3035d, and opaque regions 3035e. The first and second transmission regions may be apertures or transparent material, such as glass. The first and second transmission regions are approximately rectangular. The first and second transmission regions allow transmission of the −1 order and the +1 order of each of the wavelength transmitted from the custom phase grating and first lens system. The opaque regions block all other orders (e.g., 0 order or other higher orders) from being transmitted to the diffraction grating. Thus, the −1 and +1 orders are diffracted and reflected by the diffraction grating. In some embodiments, the diffraction grating is a transmission grating.

Figure 36:
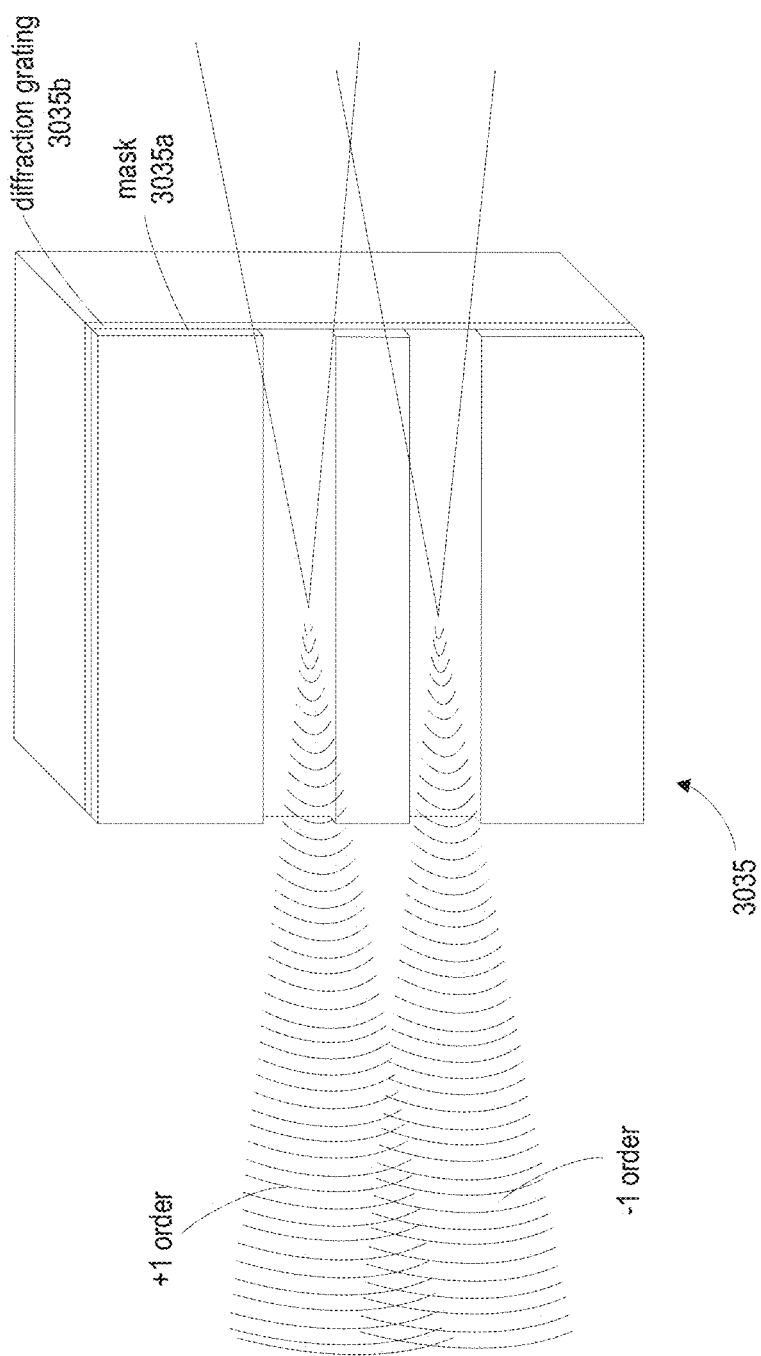
FIG. 36 shows the −1 order and +1 order of one of the wavelengths of light being transmitted through the mask and onto the diffraction grating.

FIG. 36 shows the −1 order and +1 order of one of the wavelengths of light being transmitted through mask 3035a to the diffraction grating 3035b where the light is diffracted and reflected towards the second lens system 3040. The second lens system creates an intermediate image 3041 between lenses 3040a and 3040b and lenses 3040b, 3040c, and 3040d operate together to expand the overlapping beams onto the powder bed.

FIG. 37 shows the size and shape of one of the wavefronts and the fringe pattern for the wavefront on the powder bed for one of the wavelengths of light, also referred to as one of the beams, which is comprised of two diffraction orders. The wavefronts for each of the wavelengths overlap at powder bed 3015 and may have similar sizes and shapes. For example, the wavefronts and fringe patterns may have a rectangular shape on the powder bed or may have an arc shape as shown in FIG. 37. The fringe pattern is shown for example purposes and may not be drawn to scale. For example, the spatial period of the fringes may be smaller along the y-axis than shown in FIG. 37.

As described herein, in some embodiments, the fringe projection system creates the set of multiple fringe patterns with different phases on the substrate. The imaging system must collect the light that is reflected or scattered by the substrate and measure each fringe pattern spatially separated on a detector to provide imaging data used to determine a phase map by a processing system (e.g., a processor). In particular, the imaging data is processed to determine a phase map which is then used to determine a topography of the substrate.

In some embodiments, the imaging system includes: a first lens, wherein at least one of scattered and reflected light is directed from the substrate toward the first lens to create an intermediate image; an aperture located at the intermediate image and acting as a field stop to limit the field of view on the substrate is disposed after the first lens; a second lens that relays the light from the intermediate image to an imaging system diffraction grating in or near the pupil of the imaging system configured to separate the different wavelengths in angle near the pupil of the imaging system so that each wavelength can be measured at the same time; and a third lens, configured to receive diffracted light from the imaging system diffraction grating and direct the light on to the detector such that the different wavelengths are spatially separated.

In some embodiments, at least one of the reflected and scattered light from the substrate is imaged onto a detector by a receiving side optical system and wherein the imaging system diffraction grating is located at or near the imaging system pupil in order to separate the fringe patterns for each wavelength spatially on the detector.

Referring to FIGS. 30 and 31, the imaging system is shown as 3010. A first lens 3050a collects the reflected or scattered light from the substrate and creates an intermediate image 3057 that is conjugate to the substrate and also to the detector, 3065a. All of the fringe patterns from all of the wavelengths are overlapping at the intermediate image plane. There is an optional aperture plate 3050c that can be used as a field stop to limit the field of view on the substrate. In the case that the substrate is hot and emitting blackbody radiation light, the aperture plate field stop can also be useful for removing some of this unwanted background radiation light.

A second lens 3050b collects light from the intermediate image and relays it to the imaging system diffraction grating, also referred to as the second diffraction grating, which is located near a pupil plane of the imaging system. The imaging system diffraction grating diffracts the different wavelengths into different angles, according to the grating equation. These different angles near a pupil will map to different positions at an image plane, such as where the detector is located.

A third lens 3060 is configured to receive diffracted light from the imaging system diffraction grating and direct the light on to the detector such that the different projected fringe patterns from the different wavelengths are spatially separated.

In addition, in some embodiments, the imaging system diffraction grating is configured to correct the smile that occurs on the substrate plane and that was caused by the illumination pupil grating. It will be understood by those in the art that configured, in this case, means choosing the correct grating pitch, angle of incidence and angle of diffraction from the imaging system diffraction grating needed to correct the smile and to properly spatially separate the fringe patterns from the different wavelengths on the detector.

Figure 38:
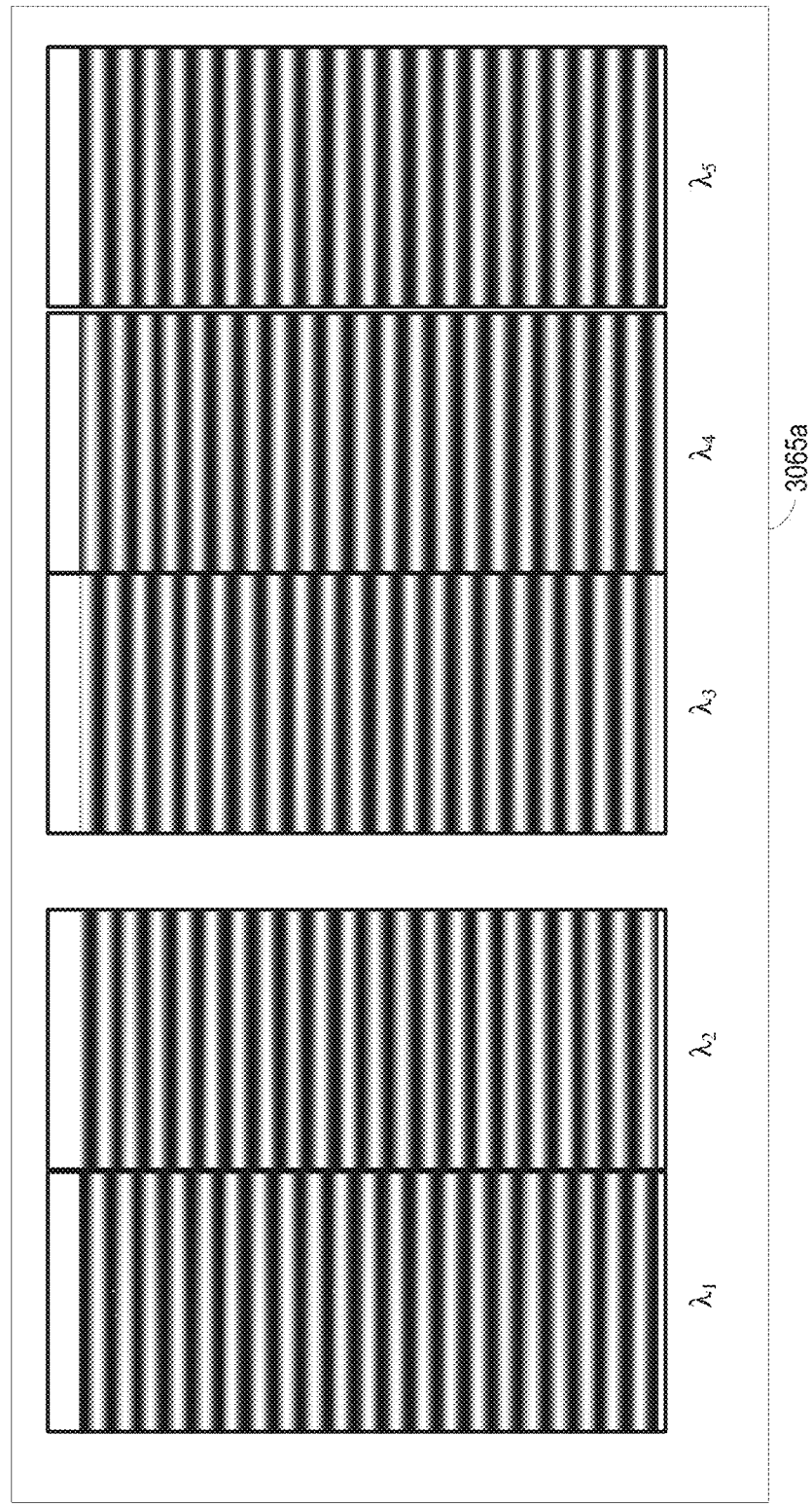
FIG. 38 shows five example fringe patterns for five wavelengths of light $\lambda_1$, $\lambda_2$, $\lambda_3$, $\lambda_4$, and $\lambda_5$ that may be detected by the detector array after reflection from the powder bed.

FIG. 38 shows a schematic of an example of five fringe patterns for five wavelengths of light $\lambda_1, \lambda_2, \lambda_3, \lambda_4,$ and $\lambda_5$ that are measured on the camera sensor 3065a. As described earlier, there is a phase difference in the fringe pattern between neighboring wavelengths of approximately pi/2 radians. This means $\lambda_1$ and $\lambda_5$ have nominally the same fringe phase, as is shown in FIG. 38.

The five fringe patterns shown in FIG. 8 may be detected by a detector array after reflection or scatter from the powder bed. Thus, while the fringe patterns are overlapping on the powder bed and on a part being printed, the fringe patterns are spatially separated when detected by the detector array. If the black lines that are shown for reference around the fringe patterns on the detector array in FIG. 37 where shown on the powder bed, the black lines would overlap.

The fringes in the successive fringe patterns from left to right for Xi, $\lambda_2, \lambda_3, \lambda_4,$ and $\lambda_5$ are phase shifted. In an embodiment, the fringes in the successive fringe patterns from left to right shift by $\pi/2$ as shown in FIG. 38. That is, the fringes in the fringe pattern for $\lambda_2$ are shifted by $\pi/2$ relative to the fringes in the fringe pattern for $\lambda_1$. The fringes in the fringe pattern for $\lambda_3$ are shifted by $\pi/2$ relative to the fringes in the fringe pattern for $\lambda_2$. The fringes in the fringe pattern for $\lambda_4$ are shifted by $\pi/2$ relative to the fringes in the fringe pattern for $\lambda_3$. And, the fringes in the fringe pattern for $\lambda_5$ are shifted by $\pi/2$ relative to the fringes in the fringe pattern for $\lambda_4$. Thus, the fringes in the fringe patterns for $\lambda_1$ and $\lambda_5$ are nominally in phase.

The diffraction grating 3055 adjusts the shape of the fringe patterns. For example, if the fringe patterns are arc shaped on the powder bed as shown in FIG. 33, the diffraction grating will adjust the shape of the fringe patterns on the powder bed from arc shaped to rectangular on the detector array as shown in FIG. 37.

In an embodiment, the magnification of the fringes projected onto the powder bed is reduced in magnification onto the detector array. The magnification may be from about 0.1 to about 0.2 and in a specific embodiment is 0.1312 total mag. The width of each fringe pattern on the detector array is about 1.0 millimeters to about 2.0 millimeters, and in a specific embodiment is about 1.5 millimeters.

In an embodiment, the fringe patterns imaged onto the detector array are relatively bright, so that the detector array can operate at a highest refresh rate that the detector array is specified for. In another embodiment, the five fringe patterns detected by the detector array facilitate the collection of data to approximately simultaneously calculate the powder bed height from a single camera frame (five fringe patterns captured in a single frame), while the powder bed moves relative to the field of view of the measurement system (e.g., rotates).

Figure 39:
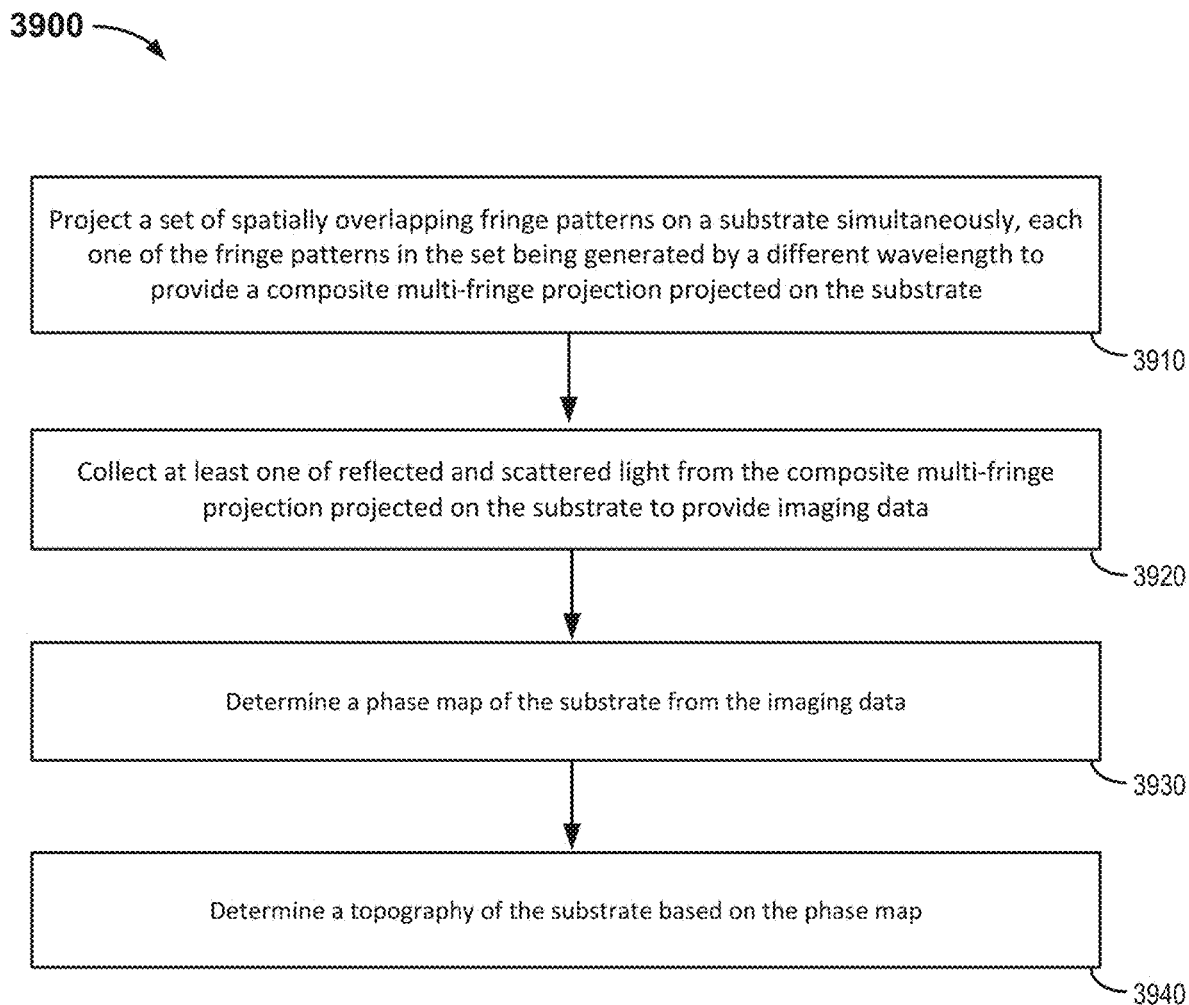
FIG. 39 is a flow chart for an embodiment of a method for determining a topography of a substrate by projecting a set of spatially overlapping fringe patterns on a substrate simultaneously.

FIG. 39 is a flow chart for an embodiment of a method 3900 for determining a topography of a substrate by projecting a set of spatially overlapping fringe patterns on a substrate simultaneously. The flow chart represents an example embodiment, and steps may be added to the flow chart, removed from the flow chart, or combined in the flow chart without deviating from the invention.

As shown in FIG. 39, method 3900 for determining a topography of a substrate includes projecting a set of spatially overlapping fringe patterns on a substrate simultaneously at 3910. In this case, each one of the fringe patterns in the set of spatially overlapping fringe patterns is generated by a different wavelength than each of the other fringe patterns in the set to provide a composite multi-fringe projection projected on the substrate. Additionally, each fringe pattern in the set of spatially overlapping fringe patterns has a different fringe phase such that the set provides sufficient phase diversity to enable the determination of a topography of the substrate.

At 3920, the method includes collecting at least one of reflected and scattered light from the composite multi-fringe projection projected on the substrate to provide imaging data.

At 3930, the method includes determining a phase map of the substrate from the imaging data.

At 3940, the method includes determining the topography of the substrate based on the phase map. In some instances, the phase map is proportional to the topography of the substrate.

In some embodiments, for example, as described with respect to FIG. 38, a composite multi-fringe projection is generated by five different wavelengths. A known phase difference exists between each of the fringe patterns in the set of spatially overlapping fringe patterns. In some examples, the known phase differences are a fraction of pi and wherein the fraction is configured to span a total phase difference of about 2pi. For instance, in some cases, the known phase differences are about pi/2.

In some embodiments, the topography of the substrate changes. In these cases, as the topography of the substrate changes, the fringes in the composite multi-fringe projection projected on the changing topography of the substrate shift in response to the changing topography of the substrate. Determining the topography of the substrate based on the phase map in these cases includes: determining a phase shift of the fringes at each location on the substrate based on observing the at least one of reflected and scattered light in response to the fringes shifting on the changing topography of the substrate; and determining a height of the substrate at each location on the substrate based on the phase shift of the fringes.

In some embodiments, the topography of the substrate at a particular moment of interest is determined from imaging data provided by the imaging system at the particular moment of interest. In these cases, the imaging data can comprise a single image frame. In some examples, the substrate changes topography due to being subjected to a process, and the 3D metrology system is configured to monitor the changing topography of the substrate by providing a determination of the topography of the substrate at any given moment during the process.

In some applications, for example, in the case of printing 3D parts, the substrate comprises a powder bed, the process comprises a 3D printing process configured to build a part out of powder, and the 3D metrology system is configured to monitor the changing topography of the part as it is being built during the 3D printing process. The powder bed can part of at least one of a linear powder bed system and a rotary powder bed system and monitoring the changing topography of the part is performed in-situ and in real time.

Generally, the fringe patterns illuminate different portions of the powder bed or a part in the powder bed so that the height and height changes of different portions of the powder bed and part can be determined by the system. The height and height changes can be measured by the system as a layer of the part are printed and the height of the top of the part changes (e.g., different in heights of top layers of first and second printed layers described immediately above). That is, the fringes in the fringe pattern projected on the powder bed and part will change as the height of the part changes.

For example, the sensitivity of the fringe projection works by converting the measured irradiance values, with a known (or calculated) phase shift between subsequent measurements of the same location on the powder bed or substrate, into the phase of the fringe. This is done using phase-shifting interferometry algorithms or Least Squares Phase Shifting Interferometry (LSPSI) algorithms. The phase, which is a value that is modulo 2pi, needs to be converted into height, in microns. This is done using Equation 1, where Twafer is the pitch of the fringes on the substrate in the plane made by the optical axis of the projection system and the normal to the substrate. θ is the average angle of incidence of the two projected plane waves relative to the substrate normal. Zperiod is the distance the substrate has to move in z for the fringe pattern to shift one full period. So, conversion from phase into height Z is done by taking $\varphi*(Zperiod/2\pi)$. The shift in fringe pattern from which height Z can be determined is shown in graphically in FIG. 10B.

The system described above uses an illumination pupil grating which is but one technique for creating multiple overlapping fringe patterns on a substrate with different wavelengths and fringe phases that are different in a known and controlled way. Other techniques include, for example, putting the different phase grating patterns on five different grating substrates, to generate multiple diffraction orders from each phase. As an example, different phase grating patterns can be put at five different locations on five separate pieces of glass to generate multiple diffraction orders from each phase.

The single custom phase grating is replaced by a plurality of phase gratings, each illuminated by the corresponding discrete wavelength and each located at an object plane of the illumination system. Each of the corresponding custom phase gratings has a local first axis that is parallel to the direction of the optical axis of each of the corresponding custom phase grating. Spectral beamsplitters (that transmit light above a certain wavelength and reflect light below a certain wavelength, or vice versa) are used to combine and change all of the light travelling approximately along the local first axes and make all of the light travel at the same angle relative to the common first axis that is directed towards the mask that is used to select two of the multiple orders. In this case, as in the case for an illumination pupil grating, a reflecting or transmitting mask can be used to block all but the two orders that are desired. The multiple diffraction orders are located at different positions at the mask along the second axis.

Alternatively, in some embodiments, a prism can be used in place of the illumination pupil grating or the spectral beamsplitters. In the case where a prism combines the multiple overlapping fringe patterns on a substrate with different wavelengths and fringe phases that are different in a known and controlled way, the dispersion of glass in the prism can be used as a way to make all of the discrete wavelengths travel towards the substrate at the same angle with respect to the first axis. In this case, as in the case for an illumination pupil grating and spectral beamsplitters, a mask can be used to remove the unwanted orders generated by the custom pupil grating or custom pupil gratings. The mask can either be reflective or transmitting. Although several examples of generating overlapping fringe patterns of different wavelengths on the substrate are described herein, the disclosed techniques are not limited to any particular way of generating overlapping fringe patterns of different wavelengths on the substrate and can be used with other ways of doing so as known by those of skill in the art, or that may be developed in the future.

Concurrent Electron-Beam 3D Printing and Metrology with Computational Imaging

In some embodiments, a 3D metrology system for determining a topography of a substrate includes: an illumination system that illuminates a substrate with electron beam illumination patterns, the illumination system comprising a focusing element to focus the electron beam illumination patterns onto the substrate, wherein the substrate comprises a metal powder bed; a detection system configured to detect an intensity of x-rays generated by the illumination of the substrate with the electron beam illumination patterns and to provide x-ray intensity measurements; and a processing system configured to estimate a spatial distribution of metal density in an illuminated region of the substrate, the illuminated region comprising the electron beam illumination patterns. The estimate is based on the electron beam illumination patterns and the x-ray intensity measurements. The detection system can include a detector, including for example, a photo sensitive detector or a single element detector.

In some cases, the estimate provides information to assess a layer of a printed metal part as the part is being built on the metal powder bed in a 3D printing system.

In some embodiments, the illumination system includes: an LED array configured to generate desired illumination patterns; an imaging relay that transfers the desired illumination patterns to a photocathode, the photocathode being configured to convert the desired illumination patterns from photons to electrons. In some examples, the illumination system further comprises a control system configured to provide instructions to the LED array to generate the desired illumination patterns. In some cases, the illumination system includes a light source that illuminates a spatial light modulator, the spatial light modulator being configured to generate desired illumination patterns and an imaging relay that transfers the desired illumination patterns to a photocathode, the photocathode being configured to convert the desired illumination patterns from photons to electrons.

In some embodiments, the illumination system further comprises a control system configured to provide instructions to the spatial light modulator to generate the desired illumination patterns.

In some cases, the electron beam illumination patterns are generated and the x-ray intensity measurements are provided by focusing and scanning a single narrow electron beam on the substrate to trace an illumination trajectory. In these cases, the detection system detects the intensity of x-rays generated by the illumination of the substrate along the trajectory traced by the single narrow electron beam.

In some embodiments, the trajectory traced by the single narrow electron beam provides the electron beam illumination patterns on the substrate and the spatial distribution of metal density in an illuminated region of the substrate is estimated based on the electron beam illumination patterns and an integrated intensity measurement based on the x-ray intensity measurements generated by the trajectory traced by the single narrow electron beam. In some cases, the illumination system further comprises a steering mechanism for steering a position of the single narrow electron beam to trace an illumination trajectory.

In some embodiments, the electron beam illumination patterns are generated with sequential sets of orthogonal patterns or orthogonal basis patterns. As an example, the orthogonal patterns or orthogonal basis patterns can include at least one of Fourier spatial frequencies and Hadamard patterns.

In some embodiments, a 3D metrology system for determining a topography of a substrate includes an illumination system that illuminates a substrate by scanning a single narrow electron beam across a region of interest of a substrate. The illumination system can include a focusing element to focus the single narrow electron beam onto the substrate, wherein the substrate comprises a metal powder bed. Additionally, the 3D metrology system includes an imaging system configured to measure an intensity of x-rays generated by the illumination of the substrate to generate an image. Each pixel of the image corresponds to a measured intensity of x-rays generated at a corresponding position of the single narrow electron beam on the substrate. The 3D metrology system also includes a processing system configured to estimate a spatial distribution of metal density in the region of interest of the substrate based on the measured intensity of x-rays.

These embodiments are described below with respect to FIG. 40 and FIGS. 41A-41B.

Figure 40:
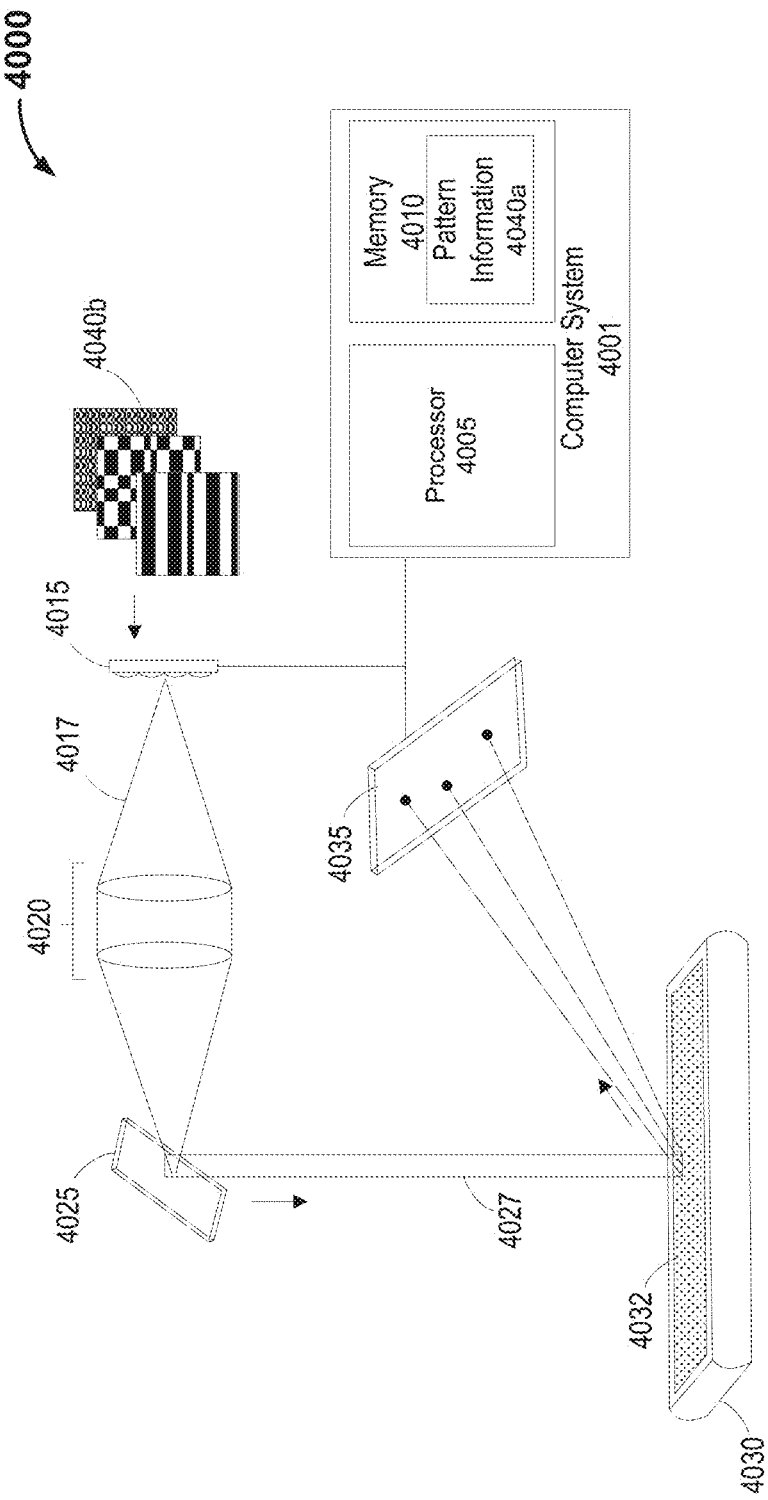
FIG. 40 depicts an embodiment of a 3D metrology system to determine a topology of a substrate using x-ray imaging techniques.

FIG. 40 depicts an embodiment of a 3D metrology system 4000 to determine a topology of a substrate using x-ray imaging techniques. In the example shown in FIG. 40, 3D metrology system 4000 is being applied to determine a topology of a surface of a powder bed or a part being built on the powder bed (e.g., shown at 4032) in a 3D printer system. In this case, 3D metrology system 400 includes a computer system 4001 having a processor 4005 and a memory 4010 coupled to the processor, a light array 4015, a lens system 4020, a photocathode 4025, a powder bed 4030, and an x-ray detector 4035 (e.g., a single-element detector or a detector array) coupled to the computer system 4001.

The light array 4015 may be a spatial light modulator (SLM) and appropriate illumination, an LED array (e.g., a micro LED array), a laser diode array, or another type of array. The light array 4015 may be connected to the computer system 4001, which can be configured to control the light array 4015. For example, the computer system 4001 may control the light array to emit light 4017 in multiple two-dimensional patterns, such as a set of sequentially changing patterns. The set of sequentially changing patterns of emitted light may be a set of sequentially changing orthogonal basis patterns, such as Fourier spatial frequencies or Hadamard patterns.

In some embodiments, the memory stores information 4040a for the patterns. Example images of the pattern, in an embodiment, are labeled 4040b in FIG. 40.

In some cases, the light emitted from the light array 4015 is imaged by lens system 4020 onto the photocathode 4025. The emitted light may cause the photocathode to emit a patterned particle beam 4027 (e.g., an electron beam) that has the pattern of the light emitted from the light source.

The electron beam incident on a printing powder 4032 in powder bed 4030 may generate x-rays. In an embodiment, a second particle generator (not shown) that generates a second particle (e.g., a second electron beam) may be adapted for printing a three-dimensional part in the powder bed.

In some embodiments, X-rays generated in the powder bed from particle beam 4027 are generated with sequential sets of projected electron beams containing the orthogonal basis patterns using pattern information 4040a, and the detector will measure the net x-ray intensity level as it changes with the incident patterns. Each layer of the printed region in the powder bed may be monitored during the printing process by the detector detecting x-rays generated in the powder bed from the patterned electron beam. The detector data may permit the detection of irregularities of a printed part occurring during the print. Thus, the identified irregularities may be corrected in situ or rejected without continuing the printing process. In situ information can reduce the use of metrology that is performed on a printed part after the printing has completed and the printed part has been removed from the powder bed.

In an embodiment, the intensity of the light source may be set to a level where the patterned electron beam has an intensity that is less than an intensity of the electron beam that is used for printing and additionally does not impart enough heat to melt the powder and change the printed pattern. That is, information collected by the detector may be transmitted to a computer system controlling the printing process of the three-dimensional printing system to correct printing of the printed layers while the layers are being printed in the powder bed. One problem that is solved by the three-dimension printing system for in situ and immediate assessment of the quality of a three-dimensional metal-printed object that is printed using the particle beam that is directed at a powder bed, is solved by measuring the intensity of generated x-rays by the x-ray detector where the x-rays are generated from the sequences of patterned electron-beam illuminations of the powder bed surface and processing the measured intensities with knowledge of the patterned electron-beam illuminations to determine the spatial distribution of metal density in the print region. Imaging the distribution of the x-rays may be accomplished via compressive sensing with the x-ray detector using the patterns of the electron-beam illumination that are generated by the light array in the pattern-forming element of the electron-beam printer.

As the illuminated portions of the loose powder in the powder bed heat up and change from individual metal particles to a continuous pattern, the effective density of the region increases as the air gaps between the particles of the loose powder are eliminated. The number of x-rays generated from the electron-beam illumination is partially dependent on the effective density of the material, so the intensity of the x-rays emitted from the printed regions will be greater than that of the x-rays emitted from the loose powder.

Figure 41A:
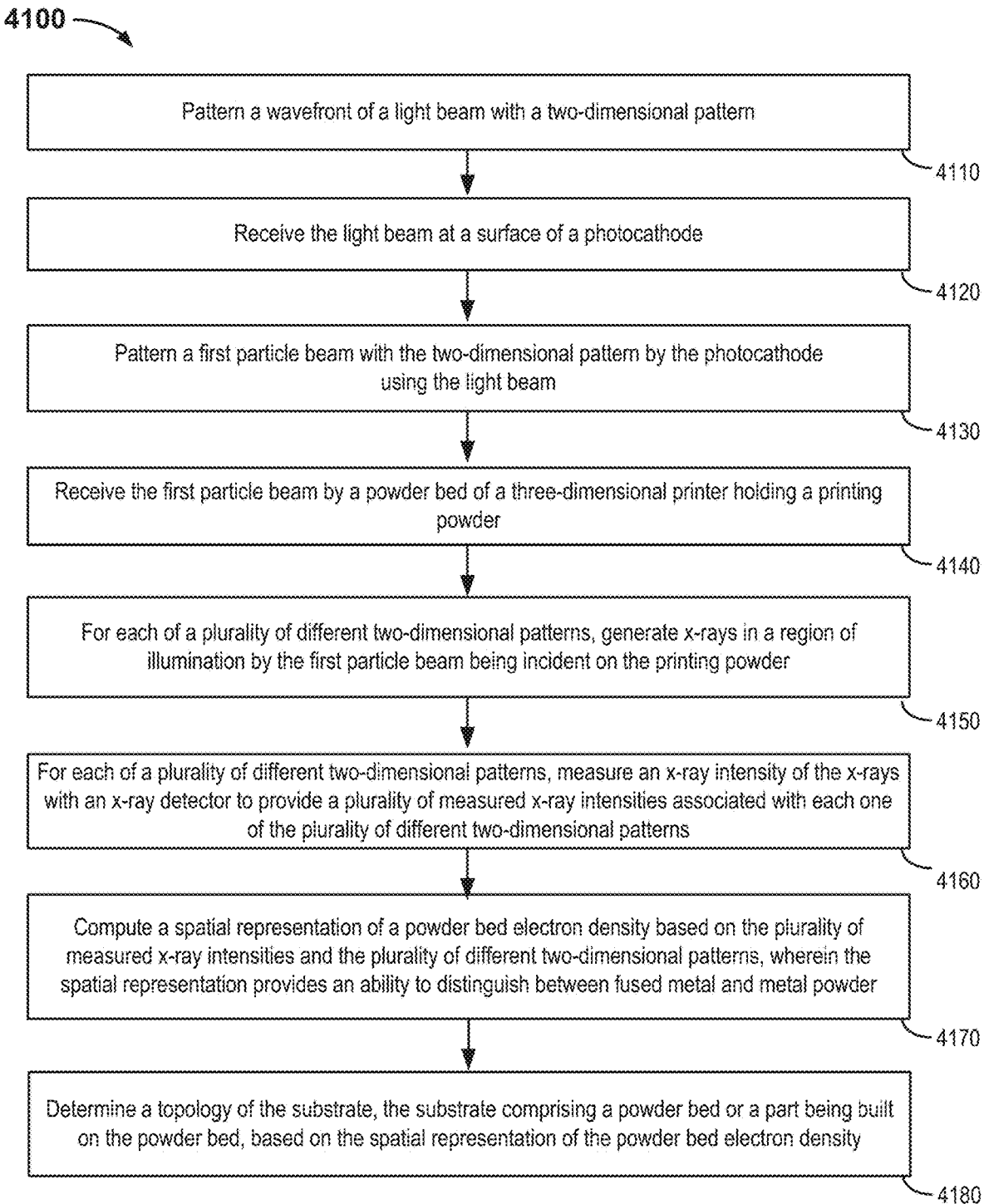
FIG. 41A is a flow chart for an embodiment of a method 4100 for determining a topography of a substrate using x-ray imaging as disclosed herein.

FIG. 41A is a flow chart for an embodiment of a method 4100 for determining a topography of a substrate using x-ray imaging as disclosed herein. The flow chart represents an example embodiment, and steps may be added to the flow chart, removed from the flow chart, or combined in the flow chart without deviating from the invention.

At 4110, the method includes patterning a wavefront of a light beam with a two-dimensional pattern.

At 4120, the method includes receiving the light beam at a surface of a photocathode.

At 4130, the method includes patterning a first particle beam with the two-dimensional pattern by the photocathode using the light beam.

At 4140, the method includes receiving the first particle beam by a powder bed of a three-dimensional printer holding a printing powder.

At 4150, the method includes, for each of a plurality of different two-dimensional patterns, generating x-rays in a region of illumination by the first particle beam being incident on the printing powder.

At 4160, the method includes, for each of a plurality of different two-dimensional patterns, measuring an x-ray intensity of the x-rays with an x-ray detector to provide a plurality of measured x-ray intensities associated with each one of the plurality of different two-dimensional patterns.

At 4170, the method includes computing a spatial representation of a powder bed electron density based on the plurality of measured x-ray intensities and the plurality of different two-dimensional patterns, wherein the spatial representation provides an ability to distinguish between fused metal and metal powder.

Finally, at 4180, the method includes, determining a topology of the substrate, the substrate comprising a powder bed or a part being built on the powder bed, based on the spatial representation of the powder bed electron density.

FIG. 41B is a flow chart for another exemplary method 4101 for determining a topography of a substrate using x-ray imaging as disclosed herein. The flow chart represents an example embodiment, and steps may be added to the flow chart, removed from the flow chart, or combined in the flow chart without deviating from the invention.

At 4111, the method includes illuminating a substrate with electron beam illumination patterns, wherein the substrate comprises a metal powder bed. For example, an illumination system in a 3D metrology system as described herein can be configured to illuminate a substrate with electron beam patterns. In some cases, the illumination system includes a focusing element to focus the electron beam illumination patterns onto the substrate.

At 4121, the method includes detecting an intensity of x-rays generated by the illumination of the substrate with the electron beam illumination patterns and providing x-ray intensity measurements. For example, a detection system in a 3D metrology system as described herein can be configured to detect an intensity of x-rays generated by the illumination of the substrate with the electron beam illumination patterns and to provide x-ray intensity measurements.

At 4131, the method includes estimating a spatial distribution of metal density in an illuminated region of the substrate, the illuminated region comprising the electron beam illumination patterns, wherein the estimate is based on the electron beam illumination patterns and the x-ray intensity measurements. For example, a processing system in a 3D metrology system as described herein can be configured to estimate a spatial distribution of metal density in an illuminated region of the substrate, the illuminated region comprising the electron beam illumination patterns, wherein the estimate is based on the electron beam illumination patterns and the x-ray intensity measurements.

Concurrent Electron-Beam 3D Printing and Metrology with X-Ray Imaging

In some embodiments, a 3D metrology system for determining a topography of a metal powder bed substrate includes an electron beam applied to a region of interest on the metal powder bed substrate that generates x-rays and an image-forming element that allows at least a subset of the generated x-rays to form an image on a detector. The image-forming element and the detector are configured to detect an x-ray distribution across the region of interest on the metal powder bed substrate. The x-ray distribution is generated by the application of the electron beam to the region of interest. The detector provides a measurement of the x-ray distribution across the region of interest. Additionally, the 3D metrology system also includes a processing system configured to determine a spatial distribution of the region of interest based on the measurement of the x-ray distribution.

In some cases, the processing system is further configured to determine an electron beam profile based on the measurement of the x-ray distribution. In some instances, the image-forming element includes an imaging aperture. For example, the imaging aperture can include a pinhole aperture, a set of pinhole apertures, or a coded aperture.

In some embodiments, the detector includes a position-sensitive detector, and the image-forming element is disposed in a position between the detector and the metal powder bed substrate. In some cases, the 3D metrology system also includes a steering mechanism for steering a position of the electron beam to probe the substrate and to generate x-rays in the region of interest.

These embodiments are described below with respect to FIG. 41C and FIG. 42.

Figure 41C:
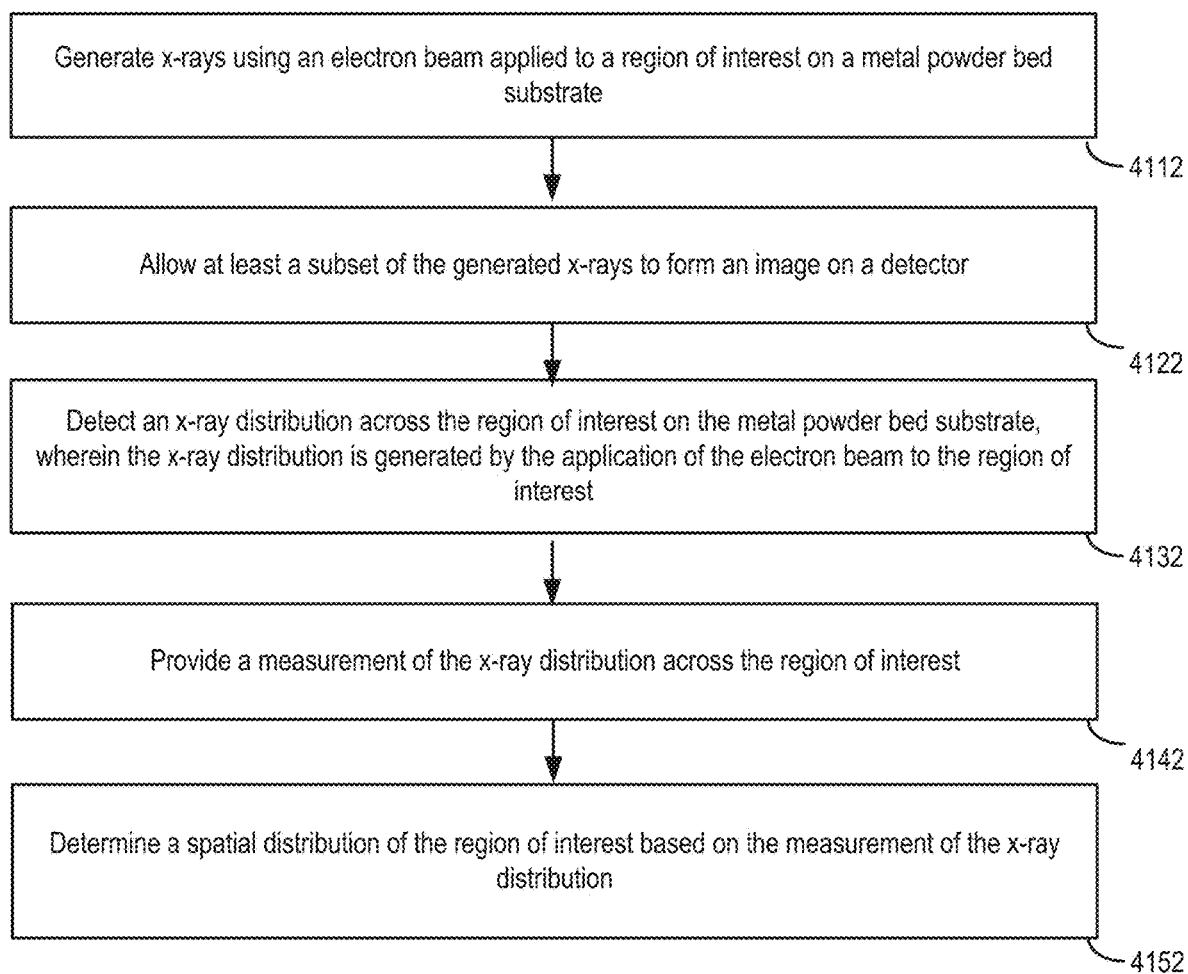
FIG. 41C is a flow chart for an exemplary method 4102 for determining a topography of a substrate using x-ray imaging and an image-forming element as disclosed herein.

FIG. 41C is a flow chart for an exemplary method 4102 for determining a topography of a substrate using x-ray imaging and an image-forming element as disclosed herein. The flow chart represents an example embodiment, and steps may be added to the flow chart, removed from the flow chart, or combined in the flow chart without deviating from the invention.

At 4112, the method includes generating x-rays using an electron beam applied to a region of interest on a metal powder bed substrate.

At 4122, the method includes allowing at least a subset of the generated x-rays to form an image on a detector. In some cases, in an embodiment of a 3D metrology system as described herein, an image-forming element is used to allow at least a subset of the generated x-rays to form an image on a detector. In some instances, the image-forming element includes an imaging aperture. For example, the imaging aperture can include a pinhole aperture, a set of pinhole apertures, or a coded aperture.

At 4132, the method includes detecting an x-ray distribution across the region of interest on the metal powder bed substrate, wherein the x-ray distribution is generated by the application of the electron beam to the region of interest. For example, the image-forming element and the detector in a 3D metrology system as described herein can be configured to detect an x-ray distribution across the region of interest on the metal powder bed substrate.

At 4142, the method includes providing a measurement of the x-ray distribution across the region of interest. For example, a detector in a 3D metrology system as described herein can be configured to provide a measurement of the x-ray across the region of interest.

At 4152, the method includes determining a spatial distribution of the region of interest based on the measurement of the x-ray distribution. For example, a processing system in a 3D metrology system as described herein can be configured to determine a spatial distribution of the region of interest based on the measurement of the x-ray distribution.

In some cases, the processing system is further configured to determine an electron beam profile based on the measurement of the x-ray distribution.

Figure 42:
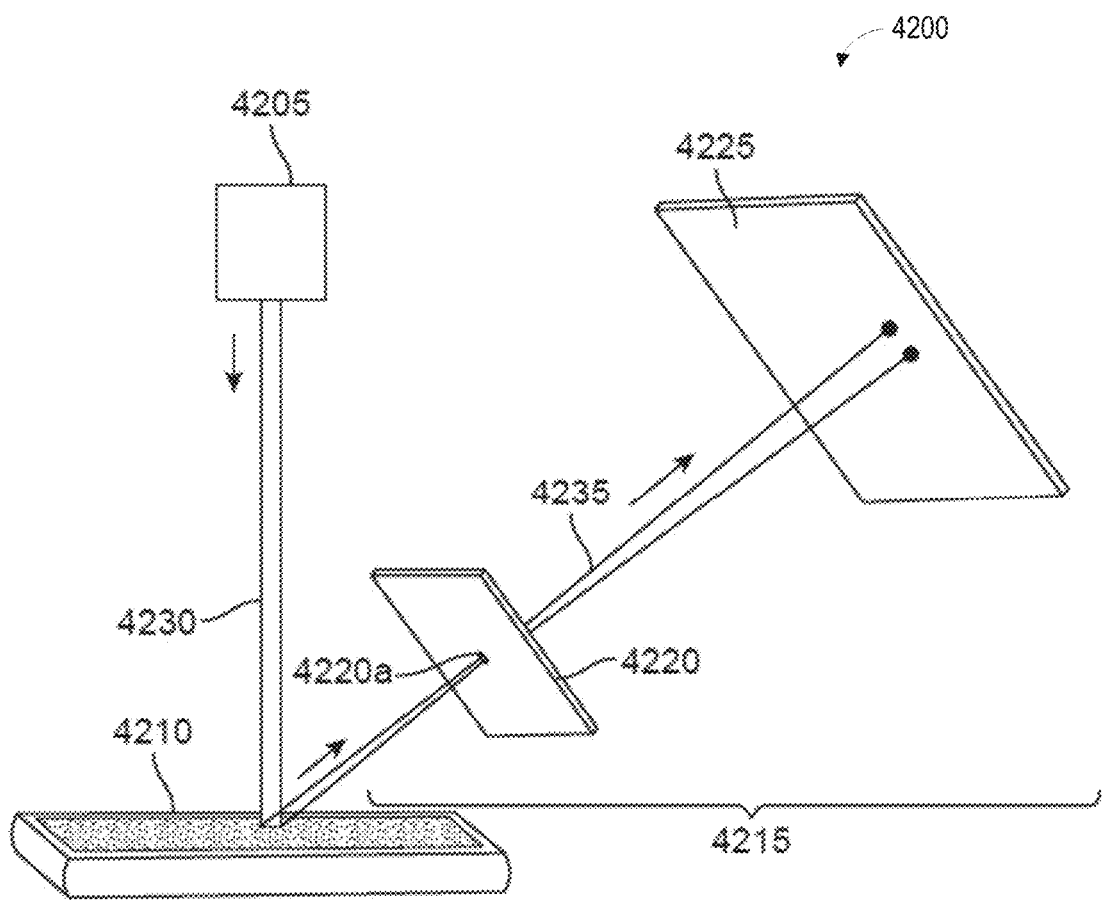
FIG. 42 depicts an embodiment of a 3D metrology system to determine a topology of a substrate using x-ray imaging and an image-forming element as disclosed herein.

FIG. 42 depicts an embodiment of a 3D metrology system 4200 to determine a topology of a substrate using x-ray imaging and an image-forming element as disclosed herein. As shown in FIG. 42, 3D metrology system 4200 is applied to measure a topology of substrate, which in this case is a powder bed or a part being built (e.g., shown at 4210) in a 3D printing system. The 3D metrology system 4200 includes a particle-beam source 4205 and a detection system 4215 that in the example shown, includes an aperture plate 4220 and an x-ray detector array 4225. The system may include other elements that are not shown, such as one or more computer systems that control the various portions of the system, collect data for the system, or provide other features.

Particle-beam source 4205 is adapted to generate a particle beam 4230, such as an electron beam, and direct the particle beam at the powder bed surface (e.g., shown at 4210) of a 3D printing system. X-rays 4235 are generated from the interaction of the particle beam with the loose powder in the powder bed, a printed part that is printed by the particle beam, or both.

As the illuminated portions of the powder bed heat up and change from individual metal particles to a continuous pattern, the effective density of that region increases as the air gaps between particles are reduced and eliminated in the printed regions of a printed part. The number of x-rays generated from the illuminating particle beam is partially dependent on the effective density of the powder material and the printed part, such that the intensity of the x-rays emitted from the printed regions will be greater than that of the x-rays emitted from the loose powder.

A portion of the x-rays passes through one or more apertures 4220a formed in aperture plate 4220 and are detected by x-ray detector 4225. X-rays not passing through the aperture are blocked from reaching the x-ray detector by the aperture plate. The aperture plate may be at least partially positioned between the powder bed and the x-ray detector. The one or more apertures of the aperture plate form one or more images of the interaction of the particle beam with the x-rays emitted from the powder, the printed part, or both.

In an embodiment, the particle beam is incident on the powder bed at a first angle with respect to a top surface the powder bed (e.g., shown at 4210) and the x-rays are transmitted from the powder bed at a second angle with respect to the top surface of the powder bed and the first and second angles are different angles. The aperture may be at the second angle with respect to the powder bed. Other apertures (e.g., second, third, or more apertures) in the aperture plate may be at other angles with respect to the top surface of the powder bed.

In an embodiment, the detector includes a number of detector elements arranged in an array. The array of detector elements can capture an image of image information transmitted in the x-rays. Generally, the image information collected by the detector is a distribution of x-ray emission locations across the field of view of the detector. When the area being illuminated by a particle beam (e.g., an electron beam) is uniform (such as a solid piece of metal), the distribution of x-rays at the detector array is indicative of the shape of the particle beam. When the area being illuminated by the particle beam is varying (such as a printed part, powder variations, or both), the image information collected by the detector array can indicate the relative density of the various regions, which in turn indicates the areas that have been melted and the unmelted areas that remain powder. In an embodiment, the computer system connected to the detector array analyses the image information collected by the detector array to determine information about the printed part, powder variation, or both.

In a specific embodiment, the image may be an image of the particle beam, such as a distribution (e.g., Gaussian distribution) of the particle beam on the powder, printed part, or both. The image may be an image of the spatial distribution of metal density in the print region, such as an image of the spatial distribution of powder, the printed part, or both.

The resolution accuracy of the image that is collected by the detector is limited by the size of the aperture, the magnification of the imaging configuration, the position resolution of the detector, and the non-negligible scatter of the electrons and x-rays in the metal of the powder bed. The imaging time of the detector may be set based on the size of the aperture and the distance from the aperture to the powder bed. The imaging time may additionally be set based on the rate at which x-rays are generated and collected by the detector where the rate of x-ray generation is a function of the powder bed material and the intensity of the electron beam. Because the location of the aperture in the aperture plate is known and the detector is an image-forming detector due to the detector including a number of detector elements, the image information from the x-rays can be backprojected (e.g., via a computer system connected to the detector) to determine their original (x,y) position at the surface of the powder bed from which the x-rays emanate.

3D Metrology System Using a Compton Camera Imager

In some embodiments, a 3D metrology system for determining a topography of a metal powder bed substrate includes an electron beam applied to a region of interest on the metal powder bed substrate that generates x-rays and a Compton camera imager comprising at least two position-sensitive and energy-sensitive detectors configured in a Compton camera configuration, such that a first detector is disposed between a second detector and the metal powder bed substrate. In these embodiments, each detector in the Compton camera configuration provides an output comprising information related to an x-ray interaction on the detector including a two-dimensional position, a deposited energy, and a time of interaction.

In some cases, the 3D metrology system also includes a processing system configured to: provide an image corresponding to an estimate of a distribution of an origin of the x-rays interacting with the at least two position-sensitive and energy-sensitive detectors in the Compton camera imager. In these cases, the estimate is based on the output of each of the at least two position-sensitive and energy-sensitive detectors. In some instances, the estimate provides information to assess a layer of a printed metal part as the part is being built on the metal powder bed in a 3D printing system.

In some examples, the processing system is further configured to determine an electron beam profile based on the measurement of the x-ray distribution. In some cases, the 3D metrology system further comprises a steering mechanism for steering a position of the electron beam to probe the substrate and to generate x-rays in the region of interest.

These embodiments are described below with respect to FIGS. 43 and 44.

Figure 43:
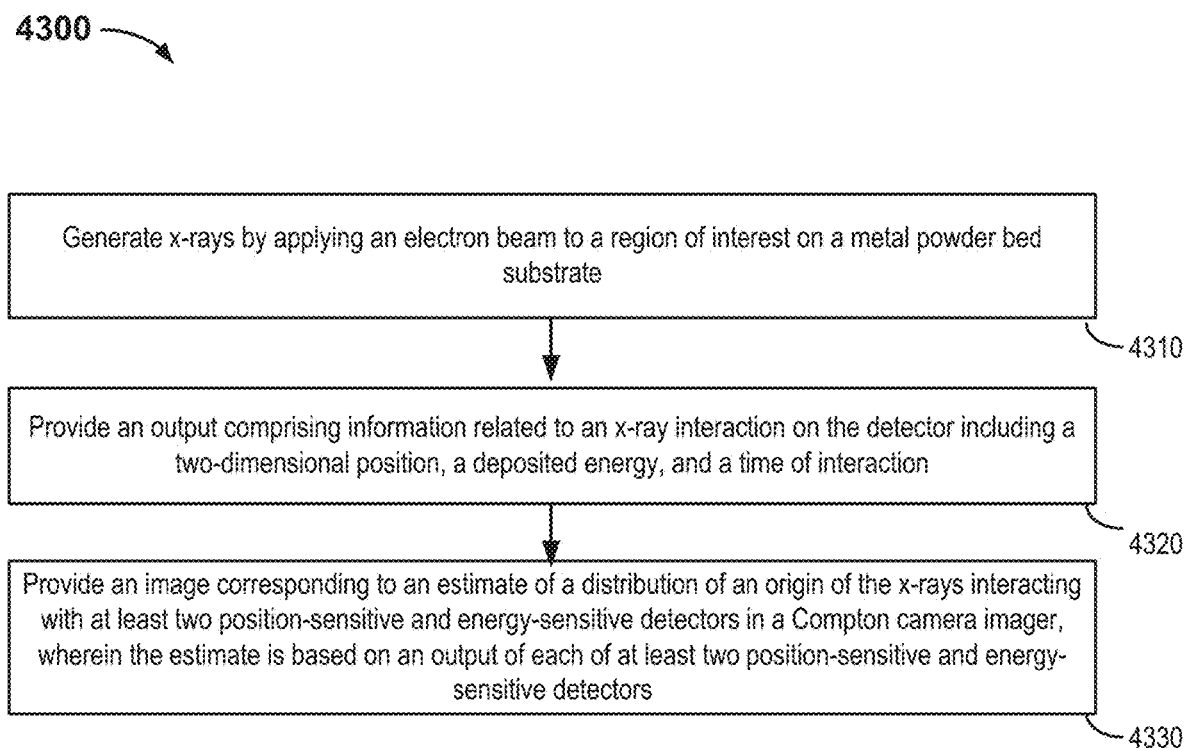
FIG. 43 is a flow chart for an exemplary method for determining a topography of a substrate using x-ray imaging and a Compton camera imager as disclosed herein.

FIG. 43 is a flow chart for an exemplary method for determining a topography of a substrate using x-ray imaging and a Compton camera imager as disclosed herein. The flow chart represents an example embodiment, and steps may be added to the flow chart, removed from the flow chart, or combined in the flow chart without deviating from the invention.

At 4310, the method includes generating x-rays by applying an electron beam to a region of interest on a metal powder bed substrate.

At 4120, providing an output comprising information related to an x-ray interaction on the detector including a two-dimensional position, a deposited energy, and a time of interaction.

At 4130, providing an image corresponding to an estimate of a distribution of an origin of the x-rays interacting with the at least two position-sensitive and energy-sensitive detectors in a Compton camera imager, wherein the estimate is based on an output of each of at least two position-sensitive and energy-sensitive detectors.

Figure 44:
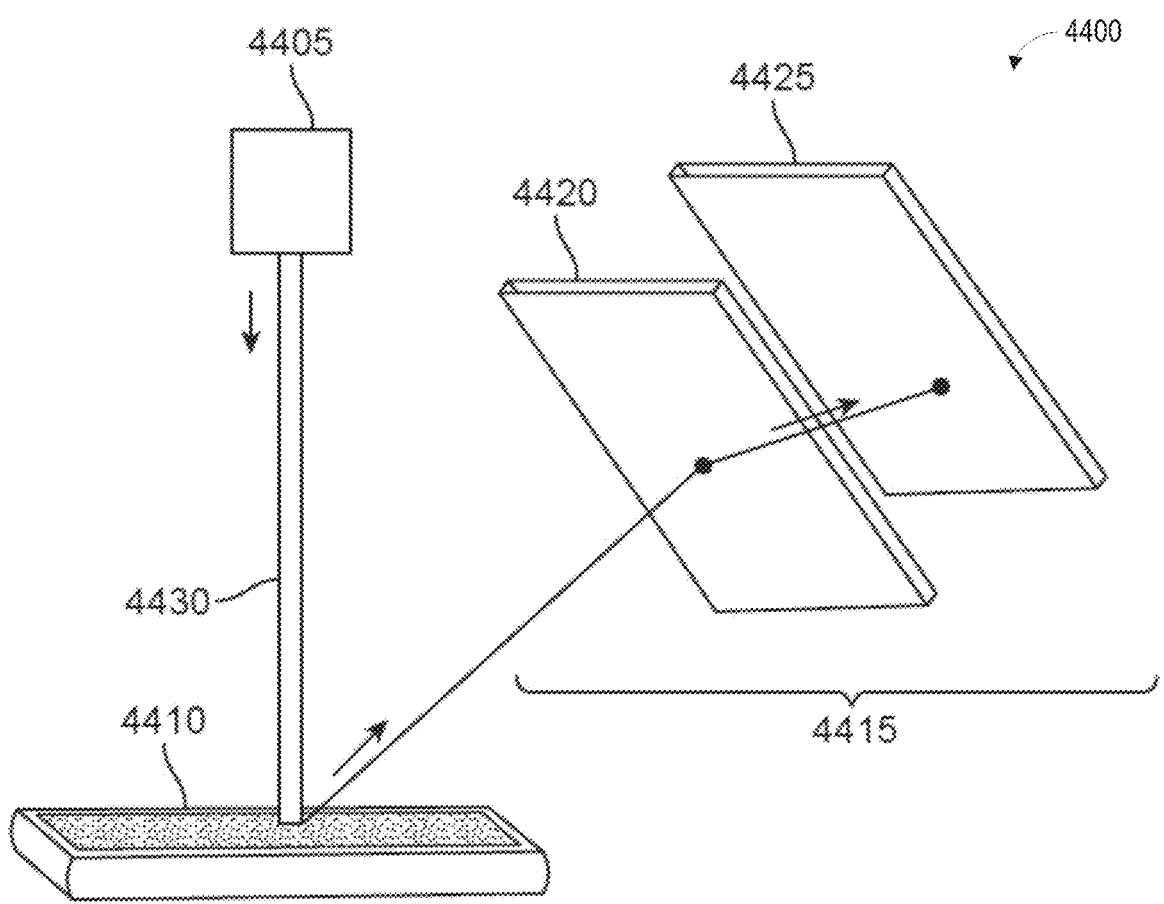
FIG. 44 depicts an embodiment of a 3D metrology system to determine a topology of a substrate using a Compton camera imager as disclosed herein.

FIG. 44 depicts an embodiment of a 3D metrology system 4400 to determine a topology of a substrate using a Compton camera imager as disclosed herein. 3D metrology system 4400 includes a particle-beam source 4405 and a detection system 4415 that includes at least a first x-ray detector 4420 and a second x-ray detector 4425. In the example shown, the first and second x-ray detectors are configured to form a Compton camera imager wherein the first x-ray detector is position or located between a substrate (e.g., powder bed surface shown at 4410), which is the source of the generated x-rays being detected, and the second x-ray detector. The Compton camera imager may be located on the same side of the substrate (e.g., shown at 4410) as the particle-beam source 4405 and a particle beam 4430 that is generated by the particle-beam source 4405. The system may include other elements that are not shown, such as one or more computer systems that control the various portions of the system (such as the particle beam source), collect data for the system (e.g., from the Compton camera imager), or that provides other features.

In the example shown, the particle beam 4430 generated by the particle-beam source 4405 is directed at the substrate (e.g., powder bed surface of the printing system shown at 4410). In this case, the first detector 4420 includes a number of detector elements arranged in a first array. The second detector 4425 includes a number of detector elements arranged in a second array.

In some embodiments, the first detector and/or subsequent detectors are configured with readout electronics located laterally from the imaging surface of the detector to permit scattered x-rays to exit from the rear surface of the detector without interference.

In some embodiments, the detectors are configured to report in a list-mode data format the position, time, and deposited energy of an x-ray interaction with the detector.

The first detector 4420 detects at least a subset of x-rays that are generated at the substrate (e.g., shown at 4410) which in this case, is the surface of a powder bed. Some x-rays will experience Compton scattering with electrons within the first detector and deposit a fraction of their energy in the first detector. An x-ray that Compton scatters in the first detector may continue through the back of the first detector and deposit the remainder of its energy in the second detector. The two interaction positions and deposited energies define the surface of a cone of fixed vertex angle along which the x-ray must have traveled before interacting with the first detector. Backprojection of the conical surfaces corresponding to each detected pair of interactions to intersect with the surface of the powder bed produces an estimate of the spatial distribution of x ray generation near the surface of the powder bed, which may be interpreted as a map of the particle beam path of the printed layer or the spatial distribution of metal density in the print region, such as an image of the spatial distribution of powder, the printed part, or both.

In an embodiment, raw data that is acquired by the Compton camera imager 4415 may be subject to processing to identify coincident interaction pairs before a direction of the x-rays is determined. An aperture plate containing one or more apertures may be employed with the Compton camera configuration (e.g., as shown in FIG. 44), but the lack of an aperture plate greatly increases the number of x-rays that can be collected per unit time.

The resolution accuracy of the Compton camera imager is constrained by the positions of the two detectors and by the energy resolutions of the two detectors, which determines the accuracy with which the initial x-ray direction can be calculated, as well as by the non-negligible scatter of the electrons and x-rays in the metal of the powder bed.

The Compton camera detectors may have a relatively fast readout and timing characteristics such that the coincident pairs of interactions in both sets of detectors can be identified. In an embodiment, the timing resolution of the detectors is faster than the mean arrival rate of the x-rays. The timing resolution of the detectors may be faster than the mean arrival rate of the x-rays, to reduce the possibility of multiple interactions occurring at the same time, so that an energy deposition in one detector are cannot be matched to its corresponding coincident energy deposition in a second detector. In an embodiment, the timing resolution also constrains the spatial resolution, because providing a wider window to find coincident events means that "false coincidences" are more likely to occur. One benefit of the presently described embodiment, is the ability to read out the information from the Compton camera imager at the same time scale as the data that is being generated.

The 3D metrology system 4400 and Compton camera imager (e.g. shown at 4415) provide a number of benefits, such as the in situ assessment of the quality of the printed object (e.g., a three-dimensional metal object) that is printed using the particle beam. The assessment is facilitated via analysis of the distribution of the x-rays on the detector that are generated from the particle-beam as the beam illuminates the powder bed surface. The assessment can be performed by a computer system that receives the x-ray distribution information and can thereby determine the spatial distribution of metal density in the print region.

Additionally, each layer of a printed region of a printed part can be monitored during the printing process so that irregularities that occur during printing can be identified, corrected in situ, one of these steps, or both of these steps. For example, a printing error that is detected in a layer of a printed part may be corrected in a subsequent printing steps thereby eliminating or reducing additional metrology that might be performed on the printed part after printing is completed and has been removed from the powder bed. One benefit that is facilitated by the embodiment, is that if a part is known to have an irregularity, the part would be known to be defective at the point of manufacturing when the irregularity if detected. Thus, the defective part can be discarded and resources would not be expended determining if the part is defective during an additional inspection step. Additionally, if a part is corrected during the print process, the part can be identified as a part that may justify further inspection after printing.

The following sets out particular combinations of features are considered relevant to particular embodiments of the present disclosure.

1. A processing machine for building a part, the processing machine comprising: a support device including a support surface; a drive device which moves the support device, so a specific position on the support surface is moved along a moving direction; a powder supply device which supplies a powder to the moving support device to form a powder layer; an irradiation device which irradiates at least a portion of the powder layer with an energy beam to form at least a portion of the part from the powder layer during a first period of time; and a measurement device which measures at least portion of the part during a second period of time where at least part of the first period in which the irradiation device irradiates the powder layer with the energy beam and at least part of the second period in which the measurement device measures do not overlap.

2. The processing machine of 1, wherein the measurement device measures at least a portion of the powder layer during the second period of time.

3. The processing machine of 1 or 2, wherein the irradiation device sweeps the energy beam along a sweep direction, which crosses a moving direction of the support surface.

4. The processing machine of any one of 1 to 3, wherein a moving direction of the support device includes a rotation direction about a rotation axis.

5. The processing machine of 4, wherein the rotation axis passes through the support surface.

6. The processing machine of 4 or 5, wherein the irradiation device sweeps the energy beam along a direction crossing the rotation direction.

7. The processing machine of any one of 4 to 6, wherein the irradiation device is arranged at a position away from the rotation axis along an irradiation device direction that crosses the rotation direction.

8. The processing machine of any one of 4 to 6, wherein the measurement device is arranged at a position away from the rotation axis along a measurement device direction that crosses the rotation direction.

9. The processing machine of 8, wherein the irradiation device is arranged at a position which is away from the rotation axis along an irradiation device direction that crosses the rotation direction and which is spaced apart from the measurement device along the rotation direction.

10. The processing machine of any one of 1 to 9, further comprising a pre-heat device which pre-heats a powder in a pre-heat zone that is positioned away from an irradiation zone where the energy beam by the irradiation device is directed at the powder along the moving direction.

11. The processing machine of 10, wherein the pre-heat device is arranged between the powder supply device and the irradiation device along the moving direction.

12. The processing machine of 10 or 11, wherein at least part of the first period and at least part of a third period in which the pre-heat device pre-heats the powder are overlapped.

13. The processing machine of any one of 10 to 12, wherein at least part of the second period and at least part of a third period in which the pre-heat device pre-heats the powder are overlapped.

14. The processing machine of any one of 1 to 13, wherein the irradiation device including a plurality of irradiation systems, which irradiate the powder layer with the energy beam.

15. The processing machine of 14, wherein the plurality of irradiation systems are arranged along a direction crossing the moving direction.

16. The processing machine of any one of 1 to 15, which cools a powder in a cooling zone away from an irradiation zone irradiated with the energy beam by the irradiation device along the moving direction.

17. The processing machine of 16, wherein the cooling zone where the powder cools is arranged between the irradiation device and the powder supply device along the moving direction.

18. The processing machine of any one of 1 to 17, wherein the support surface includes a plurality of support regions.

19. The processing machine of 18, wherein the plurality of support regions are arranged along a moving direction.

20. The processing machine of any one of 1 to 19, wherein the support surface faces to a first direction, and the drive device drives the support device so as to move the specific position on the support surface along a second direction crossing at least the first direction.

21. The processing machine of 20, wherein the powder supply device forms a layer of a powder along a surface crossing to the first direction.

22. The processing machine of any one of 1 to 21, wherein at least part of the first period and at least part of a fourth period in which the powder supply device forms the powder layer are overlapped.

23. The processing machine of 22, wherein at least part of the fourth period and at least part of a third period in which the pre-heat device pre-heats the powder are overlapped.

24. The processing machine of 22 or 23, wherein at least part of the second period and at least part of a fourth period in which the powder supply device forms the powder layer are overlapped.

25. The processing machine of any one of 1 to 24, wherein the irradiation device irradiates the layer with a charged particle beam.

26. The processing machine of any one of 1 to 25, wherein the irradiation device irradiates the layer with a laser beam.

27. A processing machine comprising: a support device including a support surface; a drive device which drives the support device so as to move a specific position on the support surface along a moving direction; a powder supply device which supplies a powder to the support device which moves, and forms a powder layer; and an irradiation device which irradiates the layer with an energy beam to form a built part from the powder layer, wherein the irradiation device changes an irradiation position where the energy beam is irradiated to the powder layer along a direction crossing the moving direction.

28. The processing machine of 27, wherein the drive device drives the support device so as to rotate about a rotation axis, and the irradiation device changes the irradiation position along a direction crossing the rotation axis.

29. The processing machine of 27 or 28 wherein at least a portion of the time where powder is supplied and at least a portion of the time where the irradiation beam is irradiated are overlapping.

30. The processing machine of any one of 27 to 29, wherein at least part of a first period in which the energy beam is irradiating the powder layer and at least part of a second period in which the powder supply device is supplying powder are overlapped.

31. The processing machine of any one of 27 to 30, further comprising a pre-heat device which pre-heats a powder in a pre-heat zone that is positioned away from an irradiation zone where the energy beam by the irradiation device is directed at the powder along the moving direction.

32. The processing machine of 31, wherein the pre-heat device is arranged between the powder supply device and the irradiation device along the moving direction.

33. The processing machine of any one of 30 to 32, wherein at least part of a first period in which the energy beam is irradiating the powder layer and at least part of a third period in which the pre-heat device pre-heats the powder are overlapped.

34. The processing machine of any one of 30 to 33, wherein at least part of a second period in which the powder supply device is supplying powder and at least part of a third period in which the pre-heat device pre-heats the powder are overlapped.

35. The processing machine of any one of 27 to 34, wherein the irradiation device including a plurality of irradiation systems, which irradiate the powder layer with the energy beam.

36. The processing machine of 35, wherein the plurality of irradiation systems are arranged along a direction crossing the moving direction.

37. The processing machine of any one of 27 to 36, which cools a powder in a cooling zone away from an irradiation zone irradiated with the energy beam by the irradiation device along the moving direction.

38. The processing machine of 37, wherein the cooling zone where the powder cools is arranged between the irradiation device and the powder supply device along the moving direction.

39. A processing machine comprising: a support device including a support surface; a drive device which drives the support device so as to move a specific position on the support surface along a moving direction; a powder supply device which supplies a powder to the support device which moves, and forms a powder layer; and an irradiation device including a plurality of irradiation systems which irradiate the layer with an energy beam to form a built part from the powder layer, wherein the irradiation systems arranged along a direction crossing the moving direction.

40. The processing machine of 39, wherein the drive device drives the support device so as to rotate about a rotation axis, and the irradiation systems arranged along a direction crossing the rotation axis.

41. An additive manufacturing system for making a three-dimensional object from powder, the additive manufacturing system comprising: a powder bed; a powder depositor that deposits the powder onto the powder bed; and a first mover that rotates at least one of the powder bed and the powder depositor about a rotation axis while the powder depositor deposits the powder onto the powder bed.

42. The additive manufacturing system of 41 further comprising a second mover that moves at least one of the powder bed and the depositor along the rotation axis while the powder depositor deposits the powder onto the powder bed.

43. The additive manufacturing system of 41 further comprising a second mover that moves the powder bed transversely to the rotation axis while the powder depositor deposits the powder onto the powder bed to maintain a substantially constant height between the powder bed and the powder depositor.

44. The additive manufacturing system of 41 wherein the first mover rotates the powder bed about the rotation axis relative to the powder depositor while the powder depositor deposits the powder onto the powder bed.

45. The additive manufacturing system of 41 further comprising an irradiation device that generates an irradiation beam that is directed at the powder on the powder bed to fuse at least a portion of the powder together to form at least a portion of the three-dimensional object, wherein the first mover rotates the powder bed relative to the irradiation device.

46. The additive manufacturing system of 41 wherein the irradiation device includes an irradiation source that is scanned radially relative to the powder bed.

47. The additive manufacturing system of 41 wherein the powder depositor is moved linearly across the rotating powder bed.

48. The additive manufacturing system of 41 further comprising a pre-heat device that preheats the powder, and wherein the first mover rotates the powder bed relative to the pre-heat device.

49. The additive manufacturing system of 41 wherein the first mover rotates the powder bed at a substantially constant velocity while the powder depositor deposits the powder onto the powder bed.

50. The additive manufacturing system of 41 further comprimising an irradiation energy source that generates an irradiation beam having shape at the powder bed, wherein the powder bed includes a curved support surface that is curved to correspond to the shape of the irradiation beam at the powder bed.

51. An additive manufacturing system for making a three-dimensional object from material, the additive manufacturing system comprising: a material bed; a material depositor that deposits molten material onto the material bed to form the object; and a mover that rotates at least one of the material bed and the material depositor about a rotation axis while the material depositor deposits the molten material onto the material bed.

52. The additive manufacturing system of 51 wherein the depositor is a wire feed and energy beam.

53. The additive manufacturing system of 52 wherein the energy beam IS a charged particle beam 54. The additive manufacturing system of 52 wherein the charged particle beam is an electron beam 55. The additive manufacturing system of any of 51-54 where a second mover moves at least one of the material bed and the material depositor in a first direction parallel to the rotation axis.

56. The additive manufacturing system of 55 wherein a third mover moves at least one of the material bed and the material depositor in a second direction perpendicular to both the first direction and the rotation axis.

57. A processing machine for building a part, the processing machine comprising: a support device including a support surface; a drive device which moves the support device so a specific position on the support surface is moved along a moving direction; a powder supply device which supplies a powder to the moving support device to form a powder layer during a powder supply time; and an irradiation device which irradiates at least a portion of the powder layer with an energy beam to form at least a portion of the part from the powder layer during an irradiation time; and wherein at least part of the powder supply time and the irradiation time are overlapped.

58. The processing machine of 57, wherein the irradiation device sweeps the energy beam along a sweep direction, which crosses a moving direction of the support surface.

59. The processing machine of any one of 57 and 58, wherein a moving direction of the support device includes a rotation direction about a rotation axis.

60. The processing machine of 59, wherein the rotation axis passes through the support surface.

61. The processing machine of 59 or 60, wherein the irradiation device sweeps the energy beam along a direction crossing the rotation direction.

62. The processing machine of any one of 59 to 61, wherein the irradiation device is arranged at a position away from the rotation axis along an irradiation device direction that crosses the rotation direction.

63. The processing machine of any one of 59 to 61, wherein the measurement device is arranged at a position away from the rotation axis along a measurement device direction that crosses the rotation direction.

64. The processing machine of 63, wherein the irradiation device is arranged at a position which is away from the rotation axis along an irradiation device direction that crosses the rotation direction and which is spaced apart from the measurement device along the rotation direction.

65. The processing machine of any one of 57 to 64, further comprising a pre-heat device which pre-heats a powder in a pre-heat zone that is positioned away from an irradiation zone where the energy beam by the irradiation device is directed at the powder along the moving direction.

66. A processing machine comprising: a support device including a non-flat support surface; a powder supply device which supplies a powder to the support device and which forms a curved powder layer; and an irradiation device that irradiates the layer with an energy beam to form a built part from the powder layer.

67. The processing machine of 66, wherein the non-flat support surface having a curvature.

68. The processing machine of 67, wherein the irradiation device sweeps the energy beam along a swept direction, and wherein the curved support surface includes a curvature in a plane where the energy beam passes through.

What is also disclosed is:

1. A processing machine for building a build part, the processing machine comprising: a support device; a powder supply device which supplies a powder to the support device to form a powder layer; an irradiation device which irradiates at least a portion of the powder layer with an energy beam to form at least a portion of the build part from the powder layer; and a measurement device which measures at least a portion of the build part and/or at least a portion of the powder layer; wherein a positional relationship between at least two of the at least part of the support device, the irradiation device, and the energy beam is changeable.

2. The processing machine of 1, wherein the at least the energy beam and the powder layer are relatively moved along a moving direction to form at least a portion of the build part.

3. The processing machine of 1, wherein at least a part of the support device and/or the irradiation device are movable for the relative movement.

4. The processing machine of 2 or 3, wherein the measurement device irradiates at least a portion of the powder layer and/or at least a portion of the build part with one or more measurement beams.

5. The processing machine of 4, wherein the measurement device moves the one or more measurement beams along a direction closing a moving direction.

6. The processing machine of 4, wherein a measurement area of the measurement device has a longitudinal direction which crosses to the moving direction.

7. The processing machine of 1, wherein the measurement device irradiates the powder layer and/or the build part with a measurement beam.

8. The processing machine of 7, wherein the measurement device moves the measurement beam along a width direction.

9. The processing machine of 7, wherein the measurement device irradiates a measurement area on the powder layer and/or the build part, and wherein the measurement area have a longitudinal direction.

10. The processing machine of 1, wherein the measurement device measures topography of the powder layer and/or the build part.

11. The processing machine of 10, wherein at least part of the support device, the irradiation device, or the energy beam moves along a moving direction, and wherein the measurement device measures the topography along a direction crossing to the moving direction.

12. The processing machine of 1, wherein the measurement device measures irregularity of the powder layer and/or the build part 13. The processing machine of 1, further comprising: a drive device which moves at least one of the support device and irradiation device so that a specific position on a support surface of the support device is moved along a moving direction.

14. The processing machine of 13, wherein the drive device moves the support device.

15. The processing machine of 13, wherein the drive device moves the irradiation device.

16. The processing machine of 15, wherein the drive device moves the powder supply device.

17. The processing machine of 1, wherein the measurement device measures the built part in the powder layer.

18. A processing machine for building a build part, the processing machine comprising: a support device; a powder supply device which supplies a powder to the support device to form a powder layer; an irradiation device which irradiates at least a portion of the powder layer with an energy beam to form at least a portion of the build part from the powder layer; a measurement device that measures at least portion of the build part and/or the powder layer and which irradiates the powder layer with a radiation pattern whose light intensity changes along a change direction.

19. The processing machine of 18, wherein a positional relationship between at least two of the at least part of the support device, the irradiation device, and the energy beam is changeable along a changeable direction.

20. The processing machine of 19, wherein the measurement device irradiates a measurement area on the powder layer and/or the build part, and wherein the measurement area has a longitudinal direction.

21. The processing machine of 20, wherein the longitudinal direction of the measurement area crosses to the changeable direction.

22. The processing machine of 21, wherein the change direction of the radiation pattern crosses to the changeable direction.

23. The processing machine of 18, wherein the measurement device projects on the at least one of the powder layer and a build part with a fringe pattern.

24. The processing machine of 23, wherein a positional relationship between at least two of the at least part of the support device, the irradiation device, and the energy beam is changeable along a changeable direction, and wherein a longitudinal direction of the fringe crosses to the changeable direction.

25. A fringe projection metrology system comprising: projection optics which project metrology radiation to an object and which include a projection optical axis; detection optics which receive a radiation from the object and which include a detection optical axis which does not have a relationship of regular reflection to the projection optical axis and a detector; and a circuitry which receives a signal from the detector and which outputs an information regarding a height of the object.

26. A fringe projection metrology system comprising: projection optics which project a first metrology radiation and a second metrology radiation to an object, wherein a polarization state of the first metrology radiation and a polarization state of the second metrology radiation are different; and detection optics which receive a radiation from the object and which includes a detector and a polarizer.

27. A system of 26, wherein a first polarization component of the first metrology radiation and a second polarization component of the second metrology radiation pass through the polarizer, and wherein the first and second polarization components have an equivalent polarization state.

The following examples pertain to further embodiments.

Example 1 is a system comprising: a light source to generate light; a first lens system to receive the light from the light source and collimate the light; an interferometer comprising a first beam splitter, second beam splitter, a first mirror, and a second mirror, wherein the first beam splitter is to receive the collimated light from the first lens system, the first mirror is on a first side of the beam splitter to reflect a first portion of the collimated light received from the first beam splitter, the second mirror is on a second side of the first beam splitter to receive a second portion of the collimated light received by the first beam splitter, the second beam splitter is to receive the first portion of collimated light reflected by the first mirror, the second portion of collimated light reflected by the second mirror, and overlap the first and second portions of the collimated light, and wherein one of the first or second mirrors is arranged at an angle with respect to an optical axis of the received first or second portion of collimated light respectively, such that the first and second portions of collimated light are out of phase and interfere; a powder bed to hold a printing powder to be illuminated by the overlapping first and second portions of collimated light, such that a fringe pattern is created on a surface of the printing powder and the fringe pattern is to shift when the powder bed is raised or lowered; a camera; a second lens system located between the powder ben and the camera to receive the overlapping first and second portions of collimated light reflected from the printing powder and focus the fringe pattern on a detector array of the camera.

Example 2 is a system of example 1, wherein the camera is to detect a fringe shift of the fringe pattern when the powder bed is raised or lowered.

Example 3 is a system of example 1, wherein the powder bed is configured to rotate and the overlapping first and second portions of collimated light are to continuously illuminate the printing powder while the powder bed rotates.

Example 4 is a system of example 1, wherein a first portion of the powder bed rotates independently of a second portion of the powder bed such that the first portion of the powder bed maintains an unchanging orientation with respect to the fringe patterns when the second portion of the powder bed is rotated.

Example 5 is a system of example 4, wherein a third portion of the powder bed rotates independently of the second portion of the powder bed such that the third portion of the powder bed maintains an unchanging orientation with respect to the fringe patterns when the second portion of the powder bed is rotated.

Example 6 is a system of example 1, wherein the interferometer is a Mach-Zehnder interferometer.

The following examples pertain to further embodiments.

Example 7 is a system comprising: a light source to generate light; a first lens system to receive the light from the light source and spread the light; an interferometer comprising a first polarizing beam splitter, second polarizing beam splitter, a first mirror, and a second mirror, wherein the first beam splitter is positioned to receive the light from the first lens system, the first mirror is located on a first side of the beam splitter to reflect a first portion of the light received from the first beam splitter, the second mirror is located on a second side of the first beam splitter to receive a second portion of the light received by the first beam splitter, the second beam splitter is positioned to receive the first portion of light reflected by the first mirror and positioned to receive the second portion of light reflected by the second mirror, and overlap the first and second portions of light; a wave plate positioned to receive the overlapping first and second portions of light, change the phase of the first portion of light to right circularly polarized light, and change the phase of the second portion of light to left circularly polarized light; a powder bed to hold a printing powder and positioned to receive the first portion of light that is right circularly polarized and receive the second portion of light that is left circularly polarized and reflect the first portion of light that is right circularly polarized and reflect the second portion of light to left circularly polarized light; a second lens system to receive and collimate the reflected first portion of light that is right circularly polarized and second portion of light that is left circularly polarized; a diffraction grating to receive and diffract into a plurality of diffraction orders the collimated first portion of light that is right circularly polarized and the collimated second portion of light that is left circularly polarized; a third lens system to receive and collimate the plurality of diffraction orders; a plurality of polarizers, wherein a number of the polarizers is that same as a number of the diffracted orders collimated by the third lens system and each linear polarizer is positioned to receive one diffraction order collimated by the third lens system, wherein the polarizers are oriented at a plurality of different angles, such that each of the polarizers linearly polarize the order light received that is right and left circularly polarized so that each order of light includes phases of the light that interfere; and a camera having a detector array that images each order of light as a fringe pattern.

Example 8 is a system of example 7, wherein when the powder bed is raised or lowered fringes in each fringe pattern shift.

Example 9 is a system of example 7, wherein the diffraction grating generates rectangular wavefronts, such that each of the fringe patterns imaged by the detector array is rectangular.

Example 10 is a system of example 9, wherein the fringe patterns imaged by the detector array are spatially separated on the detector array.

Example 11 is a system of example 10, wherein the fringe patterns imaged by the detector array do not overlap on the detector array.

Example 12 is a system of example 7, wherein the fringe patterns are not created on the powder bed.

Example 13 is a system of example 7, wherein the fringe patterns are not real images in the collimated first portion of light that is right circularly polarized and the collimated second portion of light that is left circularly polarized by the second lens system.

Example 14 is a system of example 7, wherein the diffraction grating is an imaging pupil.

Example 15 is a system of example 7, wherein the plurality of orders of diffracted light collimated by the third lens system includes five orders of diffracted light.

Example 16 is a system of example 15, wherein the orders of diffracted light collimated by the third lens system include the orders −2, −1, 0, +1, and +2.

Example 17 is a system of example 7, wherein the light source comprises a laser and the light is laser light generated by the laser.

Example 18 is a system of example 17, wherein the light source comprises an optical fiber that is optically coupled between the laser and first lens system.

Example 19 is a system of example 18, wherein the first lens system is a cylindrical lens to expand the laser light received from the laser onto the interferometer.

Example 20 is a system of example 7, wherein the wave plate is a quarter-wave plate.

Example 21 is a system of example 7, wherein the interferometer is a Mach-Zehnder interferometer.

The following examples pertain to further embodiments.

Example 22 is system comprising: a processor; a memory, coupled to the processor, comprising information for a plurality of patterns; an array of lights, coupled to the processor and memory, to receive the pattern information stored in the memory and emit light having at least one of the patterns of the plurality of patterns; a lens optically coupled to the array of lights to receive the light emitted from the array of lights; a first particle beam source optically coupled to the lens to receive the light transmitted through the lens from the array of lights and to generate a particle beam having the at least one of the patterns; a powder bed, positioned to receive the particle beam, to emit x-rays having a first component that includes information for the at least one pattern; and a detector, positioned to receive the x-rays from the powder bed, to detect the intensity of the x-rays from the powder bed for the at least one pattern in the x-rays.

Example 23 is a system of example 22, wherein the first particle beam source is located at a focal plane of the lenses.

Example 24 is a system of example 22, wherein the powder bed is to hold a printing powder and the x-rays are emitted from interaction of the first particle beam with the printing powder.

Example 25 is a system of example 22, wherein the first particle beam has a power that will not induce melting in the beam region of the powder bed. Example 26 is a system of example 22, wherein the information is the x-ray intensity corresponding to at least one pattern.

Example 27 is a system of example 22, wherein the first particle beam source is a photocathode.

Example 28 is a system of example 27, wherein the photocathode has a planar emitter surface, the at least one pattern transmitted in the light is a two-dimensional pattern, and the photocathode is to emit the particle beam having the two-dimensional pattern from the planar emitter surface.

Example 29 is a system of example 22, wherein the first particle beam source is a two-dimensional photocathode to emit the first particle beam, and the first particle beam is patterned with the at least one pattern transmitted in the light when the light is transmitted from the array of lights.

Example 30 is a system of example 22, wherein the lights are light emitting diodes.

Example 31 is a system of example 22, wherein the lights are laser diodes.

Example 32 is a system of example 22, wherein the patterns are two-dimensional orthogonal basis patterns.

Example 33 is a system of example 32, wherein the patterns are Fourier spatial frequencies patterns.

Example 34 is a system of example 32, wherein the patterns are Hadamard patterns.

Example 35 is a method comprising: patterning a wavefront of a light beam with a two-dimensional pattern; transmitting the light beam to a surface of a photocathode; receiving the light beam at a surface of the photocathode; patterning a first particle beam with the two-dimensional pattern by the photocathode using the light beam, wherein the intensity of the first particle beam is of insufficient power to sinter or melt the printing powder bed; receiving the first particle beam by a powder bed of a three-dimensional printer holding a printing powder; for each of a plurality of different two-dimensional patterns, generating x-rays in a region of illumination by each of the different two-dimensional patterns by the first particle beam being incident on the printing powder; for each of a plurality of different two-dimensional patterns, measuring an x-ray intensity of the x-rays with an x-ray detector to provide a plurality of measured x-ray intensities associated with each one of the plurality of different two-dimensional patterns; and computing a spatial representation of a powder bed electron density based on the plurality of measured x-ray intensities and the plurality of different two-dimensional patterns, wherein the spatial representation provides an ability to distinguish between fused metal and metal powder.

The following examples pertain to further embodiments.

Example 36 is a system comprising: a powder bed to hold a printing powder; a particle beam source, located on a first side of the powder bed, to direct a particle beam toward the printing powder in the printer bed to print a three-dimensional part from the printing powder, wherein when the particle beam source directs the particle beam toward the printing powder, the particle beam traverses a direction at a first angle with respect to a surface of the powder bed; an aperture plate, located on the first side of the powder bed, comprising a first portion comprising a first aperture formed in the aperture plate, wherein the first aperture is located at a second angle with respect to a surface of the powder bed, and the first and second angles are different angles; and an x-ray detector, located on the first side of the powder bed, wherein the aperture of the aperture plate is between the powder bed and the x-ray detector, and the x-ray detector is adapted to detect x-rays generated from the particle beam when the particle beam is incident on the printing powder and the x-rays are transmitted through the aperture.

Example 37 is a system of example 36, wherein a second portion of the aperture plate around the first aperture comprises a material without apertures.

Example 38 is a system of example 36, wherein the aperture plate comprises a second portion, which comprises a second aperture formed in the aperture plate, the second aperture is located at a third angle with respect to a surface of the powder bed, and the first and third angles are different angles.

Example 39 is a system of example 38, wherein the aperture plate comprises a third portion, which comprises a third aperture formed in the aperture plate, the third aperture is located at a fourth angle with respect to a surface of the powder bed, and the first and fourth angles are different angles.

Example 40 is a system of example 36, wherein the detector is adapted to detect x-rays generated in an area of the printing powder where the particle beam is incident on the printing powder, the particle beam has a first distribution component on the printing powder, the x-rays detected by the x-ray detector have a second distribution component on the x-ray detector, and the second distribution component includes distribution information for the first distribution component.

Example 41 is a system of example 40, wherein the first distribution component includes a third distribution component, and the third distribution component includes distribution information for at least a portion of a three-dimensional part in the powder bed.

Example 42 is a system of example 40, wherein the second distribution component includes the distribution information for the third distribution component.

Example 43 is a method of example 36, wherein the particle beam has a power that is less than a sintering power of the printing powder.

Example 44 is a method of example 36, wherein the particle beam has a power that is at or above a sintering power of the printing powder.

Example 45 is a method of example 36, further comprising a second particle beam source to emit a second particle bean onto the powder bed, wherein the second particle beam has a second power that is greater than the first power of the first particle beam.

Example 46 is a method of example 36, wherein the second power is at or above a sintering power of the printing powder in the powder bed.

Example 47 is a method of example 36, further comprising: sintering or melting the printing powder; printing a layer of a three-dimensional part from the printing powder based on the sintering or melting; detecting an increase in the x-ray intensity by the x-ray detector subsequent to the sintering or melting; and detecting the printing of the layer based on the increase in x-ray intensity.

Example 48 is a method of example 38, further comprising: not detecting an increase in the x-ray intensity by the x-ray detector subsequent to the sintering or melting for a portion of the layer; sintering or melting the printing powder at the portion; and printing the portion based on the sintering or melting.

Example 49 is a method comprising: generating a particle beam; directing the particle beam at an area of a printing powder held in printing bed of a three-dimensional printing system, wherein the particle beam is incident on the area of the printing powder and the particle beam has a first distribution component on the printing powder; and detecting x-rays generated from the particle beam when the particle beam is incident on the area of the printing powder and after the x-rays have been transmitted through a first aperture in an aperture plate, wherein the x-rays are detected by the x-ray detector, the x-rays detected by the x-ray detector have a second distribution component on the x-ray detector, and the second distribution component includes distribution information for the first distribution component.

Example 50 is a method of example 49, further comprising blocking x-rays from the x-ray detector by a portion of the aperture plate that does not include the aperture.

Example 51 is a method of example 49, further comprising detecting the x-rays generated from the particle beam when the particle beam is incident on the area of the printing powder and after the x-rays have traversed through a second aperture in an aperture plate, wherein the x-rays are detected by the x-ray detector at a third angle with respect to the printing powder, and the first angle and third angles are different angles, the x-rays detected by the x-ray detector after the x-rays have been transmitted through the second aperture have a third distribution component on the x-ray detector, and the third distribution component includes distribution information for the first distribution component.

Example 52 is a method of example 49, wherein the particle beam is incident on the printing powder on a first side of the printing bed, the aperture plate, and the x-ray detector is located on the first side of the printing bed.

Example 53 is a system comprising: generating a particle beam; directing the particle beam at an area of a printing powder held in printing bed of a three-dimensional printing system, wherein the particle beam is incident on the area of the printing powder and the particle beam has a first distribution component on the printing powder; detecting energy depositions within a first detector corresponding to Compton scattering within the detector; detecting the deposition of the remainder of the scattered x-ray energy in a second detector, wherein the two interaction positions and deposited energies define the surface of a cone of fixed vertex angle along which the x ray must have traveled before interacting with the first detector. Backprojection of the conical surfaces corresponding to each detected pair of interactions to intersect with the surface of the powder bed produces an estimate of the spatial distribution of x ray generation near the surface of the powder bed, which may be interpreted as a map of the particle beam path of the printed layer or the spatial distribution of metal density in the print region, such as an image of the spatial distribution of powder, the printed part, or both.

The following clauses pertain to further embodiments:

Clause 1. A system comprising: an illumination system to project a plurality of fringe patterns on a surface to be tested (SUT), wherein the fringe patterns simultaneously overlap on the SUT; and an imaging system to collect at least one of reflected light and scattered light from the SUT, wherein the fringe patterns simultaneously transmit phase information for phases of fringes of the fringe patterns and the phase information includes topography information of the SUT for a single topography measurement in time.

Clause 2. The system of clause 1, wherein the illumination system comprises: a plurality of light sources to provide a plurality of beams; a custom phase grating to create multiple diffraction orders for each beam; a first lens system to receive the beams from the custom phase grating and to transmit the beams; an illumination pupil grating; a mask positioned between the second lens system and the illumination pupil grating, wherein the mask comprises a first transmission region to transmit a +1 phase order of the multiple diffraction orders to the illumination pupil grating and a second transmission region to transmit a −1 phase order of the multiple diffraction orders to the illumination pupil grating; and a second lens system to expand the beams received from the illumination pupil grating to illuminate the SUT.

Clause 3. The system of clause 2, wherein the imaging system comprises: a second diffraction grating; a third lens system to focus each beam onto the second diffraction grating, wherein the second diffraction grating is to spatially separate the beams; a camera comprising a detector array; and a fourth lens system to focus the beams received from the second diffraction grating onto the detector array, wherein the fringe patterns of the beams are spatially separated on the detector array.

Clause 4. The system of clause 3, wherein the imaging system further comprises an aperture mask, located between the third lens system and the second diffraction grating, comprising an aperture, wherein the aperture is to transmit the beams and block stray light.

Clause 5. The system of clause 3, wherein the fringe patterns of the beams do not overlap on the detector array.

Clause 6. The system of clause 3, wherein the custom phase grating comprises a number of phase regions, the illumination system being configured to transmit the beams to the phase regions, and each of the phase regions is to phase shift one beam received by the phase region so that each beam has two diffraction orders.

Clause 7. The system of clause 3, wherein the first lens system is configured to transmit each of the beams to the illumination pupil grating at different angles, and the illumination pupil grating is to diffract each of the beams toward the second lens system at the same angle.

Clause 8. The system of clause 3, wherein the illumination pupil grating is not perpendicular to a mean optical path of the beams transmitted from the first lens system.

Clause 9. The system of clause 3, wherein the illumination pupil grating is to spatially combine each of the beams into a beam having arc-shaped wavefronts.

Clause 10. The system of clause 9, wherein the second diffraction grating is to shape each arc-shaped wavefront into a rectangular shaped wavefront.

Clause 11. The system of clause 3, wherein each of the different wavelengths is approximately a single wavelength.

Clause 12. The system of clause 3, wherein each beam of the plurality of beams includes a different wavelength of light, and the beams are spatially separated by the light sources.

Clause 13. The system of clause 3, wherein each +1 and −1 phase order for each beam create a fringe pattern on the STU, and each fringe pattern for each beam overlaps on the SUT.

Clause 14. The system of clause 3, wherein the mask comprises a plurality of opaque regions to block diffraction orders of the multiple diffraction orders other than the +1 and −1 diffraction orders, and the illumination pupil grating is to diffract the +1 and −1 diffraction orders for each of the beams to overlap such that the +1 and −1 diffraction orders of each beam interfere.

Clause 15. The system of clause 3, wherein the SUT comprises at least one of a powder bed and a part printed in the powder bed.

Clause 16. A method comprising: generating a plurality of beams of laser light, wherein each beam of the plurality of beams of laser light is a different wavelength and the beams are spatially separated; phase shifting, by a custom phase grating, each of the spatially separated beams so that each beam has two diffraction orders that interfere; transferring the beams onto an illumination pupil grating at different angles such that, at the illumination pupil grating, all of the beams at different wavelengths leave the illumination pupil grating at the same angle; expanding the beams onto a surface under test (SUT), wherein each of the beams creates a fringe pattern on the SUT and the fringe patterns for the beams overlap on the SUT; transmitting reflections of the beams from the SUT onto a second diffraction grating; spatially separating the beams by the second diffraction grating; and transmitting at least one order of the spatially separated beams onto a detector array, wherein the fringe patterns of the spatially separated beams are spatially separated on the detector array.

Clause 17. The method of clause 16, wherein the fringe patterns do not overlap on the detector array.

Clause 18. The method of clause 16, wherein phase shifting each of the spatially separated beams comprises phase shifting the spatially separated beams by respective phase grating patterns of the custom phase grating, wherein the respective phase grating patterns are spatially separated on the custom phase grating.

Clause 19. The method of clause 16, further comprising transmitting the reflections of the beams from the SUT to form an intermediate image of the fringe patterns before focusing the reflections of the beams from the SUT onto the second diffraction grating; and blocking stray light adjacent to the intermediate image from reaching the second diffraction grating.

Clause 20. The method of clause 16, further comprising moving the SUT away from the illumination pupil grating, and based on moving, shifting fringes of the fringe patterns detected by the detector array; and calculating the distance of a shift based on the shifting of the fringes on the detector array.

Clause 21. The method of clause 16, wherein the SUT includes at least one of a powder bed of a three-dimensional printing system and a part printed in the powder bed.

Clause 22. The method of clause 16, further comprising: printing a first layer of a part in the powder bed; printing a second layer of the part in the powder bed, wherein a top the second layer is a distance from a top of the first layer; shifting fringes of each of the fringe patterns on the detector array; and based on the shifting of the fringes on the detector array, calculating a change in a topography of the second layer based on the shifting of the fringes.

Clause 23. A three-dimensional printer comprising: a powder bed configured to hold a printing powder; a particle beam source configured to direct a particle beam at the printer bed to print a three-dimensional part from the printing powder; an illumination system configured to project a plurality of fringe patterns on the printing powder, wherein the fringe patterns simultaneously overlap on the printing powder; and an imaging system configured to collect at least one of reflected light and scattered light from the printing powder, wherein the fringe patterns simultaneously transmit phase information for phases of fringes of the fringe patterns and the phase information includes topography information of the printing powder for a single measurement in time for each of the fringe patterns.

Clause 24. The printer of clause 23, wherein the illumination system comprises: a plurality of light sources to provide a plurality of beams; a custom phase grating to create multiple diffraction orders for each beam; a first lens system to receive the beams from the custom phase grating and to focus the beams; an illumination pupil grating; a mask positioned between the second lens system and the illumination pupil grating, wherein the mask comprises a first transmission region to transmit a +1 phase order of the multiple diffraction orders to the illumination pupil grating and a second transmission region to transmit a −1 phase order of the multiple diffraction orders to the illumination pupil grating; and a second lens system to expand the beams received from the illumination pupil grating to illuminate the printing powder.

Clause 25. The printer of clause 24, wherein the imaging system comprises: a second diffraction grating; a third lens system to focus each beam onto the second diffraction grating, wherein the second diffraction grating is to spatially separate the beams; a camera comprising a detector array; and a fourth lens system to focus the beams received from the second diffraction grating onto the detector array, wherein the fringe patterns of the beams are spatially separated on the detector array.

Clause 26. The printer of clause 25, wherein the imaging system comprises: a fifth lens system, wherein the third lens system is between the fifth lens system and the second diffraction grating, the fifth lens system is to collimate the beams when the beams are between the fifth lens system and the third lens system; and an aperture mask, located between the third and fifth lens systems, comprising an aperture, wherein the aperture is to transmit the collimated beams and block stray light.

Clause 27. The printer of clause 25, wherein the fringe patterns of the beams do not overlap on the detector array.

Clause 28. The printer of clause 25, wherein the custom phase grating comprises a plurality of phase regions, the illumination system is to respectively transmit the beams to the phase regions, and each of the phase regions is to phase shift one beam received by the phase region.

Clause 29. The printer of clause 25, wherein each +1 and −1 phase order for each beam create a fringe pattern on the powder bed, and each fringe pattern for each beam overlaps on the powder bed.

Clause 30. The printer of clause 25, wherein the mask comprises a plurality of opaque regions to block diffraction orders of the multiple diffraction orders other than the +1 and −1 diffraction orders, and the illumination pupil grating is to diffract the +1 and −1 diffraction orders for each of the beams to overlap such that the +1 and −1 diffraction orders of each beam interfere.

Clause 31. A fringe projection metrology system comprising: projection optics which project metrology radiation to an object and which include a projection optical axis; detection optics which receive a radiation from the object and which include a detection optical axis which does not have a relationship of regular reflection to the projection optical axis and a detector; and a circuitry which receives a signal from the detector and which outputs an information regarding a height of the object.

Clause 32. The system of clause 31, wherein the projection optics comprises a custom phase grating which phase shifts the metrology radiation to project a plurality of fringe patterns onto the object.

Clause 33. The system of clause 31, wherein the received radiation comprises fringe patterns reflected from the object.

Clause 34. The system of clause 33, wherein fringes of the fringe patterns reflected from the object include the information for the height of the object.

Clause 35. The system of clause 33, wherein the fringe patterns on the object overlap.

Clause 36. The system of clause 33, wherein fringes of the fringe patterns reflected from the object include the information for the height of the object.

Clause 37. The system of clause 33, wherein the fringe patterns of the received radiation do not overlap.

Clause 38. The system of clause 37, wherein the detection optics comprises a diffraction grating that spatially separates the metrology radiation into component wavelengths, and each fringe pattern of the received radiation is composed of one of the wavelengths.

Clause 39. A fringe projection metrology system comprising: projection optics configured to project a first metrology radiation and a second metrology radiation to an object, wherein a polarization state of the first metrology radiation and a polarization state of the second metrology radiation are different; and detection optics configured to receive a radiation from the object, wherein the detection optics comprise a detector and a polarizer.

Clause 40. The system of 39, wherein a first polarization component of the first metrology radiation and a second polarization component of the second metrology radiation pass through the polarizer, and wherein the first and second polarization components have an equivalent polarization state.

Clause 41. The system of clause 40, wherein the polarizer comprises a polarization axis which is orientated at an angle to an optical axis of the received radiation to convert the polarization state of the first metrology state to the equivalent polarization state and convert the polarization state of the first metrology state to the equivalent polarization state.

Clause 42. The system of clause 41, wherein the polarization state of the first metrology radiation is right circularly polarized and the polarization state of the second metrology radiation is left circularly polarized.

Clause 43. The system of clause 42, wherein the equivalent polarization state includes linear polarization states.

Clause 44. The system of clause 43, wherein the received radiation having the linear polarization states interfere to create a fringe pattern after the received radiation is transmitted through the polarizer and projects onto a detector.

Clause 45. The system of clause 44, wherein the fringe pattern includes height information for a surface that reflects or scatters the first and second metrology radiation.

Clause 46. The system of clause 45, wherein the equivalent polarization state includes linear polarization states.

Clause 47. The system of clause 46, wherein the first and second polarization components include circular polarization components.

This description of the invention has been presented for the purposes of illustration and description. It is not intended to be exhaustive or to limit the invention to the precise form described, and many modifications and variations are possible in light of the teaching above. The implementations were chosen and described in order to best explain the principles of the invention and its practical applications. This description will enable others skilled in the art to best utilize and practice the invention in various implementations and with various modifications as are suited to a particular use. The scope of the invention is defined by the following claims.

What is claimed is:

1. A 3D metrology system for determining a topography of a surface of a powder bed of a powder bed fusion type 3D printer, the system comprising:
    a fringe projection system that projects a set of spatially overlapping fringe patterns on a surface of a powder bed simultaneously, each one of the fringe patterns in the set of spatially overlapping fringe patterns being generated by a different wavelength than each of the other fringe patterns in the set to provide a composite multi-fringe projection projected on the surface;
    an imaging system that collects at least one of reflected and scattered light from the composite multi-fringe projection projected on the surface to provide imaging data; and
    a processing system configured to:
        determine a phase map of the surface from the imaging data; and
        determine a topography of the surface based on the phase map.

2. The 3D metrology system of claim 1, wherein each fringe pattern in the set of spatially overlapping fringe patterns has a different fringe phase, and wherein a known phase difference exists between each of the fringe patterns in the set of spatially overlapping fringe patterns.

3. The 3D metrology system of claim 1, wherein the composite multi-fringe projection is generated by five different wavelengths.

4. The 3D metrology system of claim 1, wherein the topography of the surface changes, and wherein as the topography of the surface changes:
the fringes in the composite multi-fringe projection projected on the changing topography of the surface shift in response to the changing topography of the surface; and
determining the topography of the surface based on the phase map comprises:
determining a phase shift of the fringes at each location on the surface based on observing the at least one of reflected and scattered light in response to the fringes shifting on the changing topography of the surface; and
determining a height of the surface at each location on the surface based on the phase shift of the fringes.

5. The 3D metrology system of claim 4, wherein the topography of the surface at a particular moment of interest is determined from imaging data provided by the imaging system at the particular moment of interest.

6. The 3D metrology system of claim 1, wherein the surface changes topography due to being subjected to a process, and wherein the 3D metrology system is configured to monitor the changing topography of the surface by providing a determination of the topography of the surface at any given moment during the process.

7. The 3D metrology system of claim 6, wherein the process comprises a 3D printing process configured to build a part out of powder, and the 3D metrology system is configured to monitor the changing topography of the part as it is being built during the 3D printing process.

8. The 3D metrology system of claim 1, wherein the fringe projection system comprises:
a plurality of sources configured to provide illumination beams of different wavelengths, each source comprising a discrete wavelength;
a custom phase grating, located in the object plane of the illumination system, which is conjugate to the surface;
an illumination pupil grating; and
fringe projector optics configured to magnify the fringe patterns to cover a desired region on the surface.

9. The 3D metrology system of claim 8, wherein the custom phase grating is configured to provide a spatial separation such that each phase grating pattern in the object plane is for a given discrete wavelength, and such that a phase of each fringe pattern in the set of spatially overlapping fringe patterns is offset from a phase of each of the other fringe patterns in the set of spatially overlapping fringe patterns by a desired amount at the surface.

10. The 3D metrology system of claim 9, wherein:
multiple diffraction orders of each of the discrete wavelengths generated by the custom phase grating are incident on the illumination pupil grating such that the multiple orders are located at different positions along a second axis that is perpendicular to a first axis; and
each set of multiple orders of each of the discrete wavelengths is incident on the illumination pupil grating at a different angle, but all of the wavelengths leave the illumination pupil grating at the same angle relative to the first axis.

11. The 3D metrology system of claim 10, wherein the illumination pupil grating comprises a mask configured to allow only two of the multiple orders per discrete wavelength incident on the illumination pupil grating to diffract towards fringe projector optics and the surface, and wherein the two orders per discrete wavelength generate a fringe pattern associated with the discrete wavelength.

12. The 3D metrology system of claim 11, wherein the mask is configured to allow only the +1 and −1 diffraction orders from the custom phase grating to be directed toward the surface.

13. The 3D metrology system of claim 8, the fringe projector optics being further configured to generate nearly the same angle of incidence for projected light at all locations and all wavelengths on the surface.

14. The 3D metrology system of claim 1, wherein the fringe projection system comprises:
a plurality of sources configured to provide illumination beams of different wavelengths, each source comprising a discrete wavelength;
a plurality of custom phase gratings, located in the object planes of the illumination system, which is conjugate to the surface;
spectral beamsplitters;
a mask configured to allow only two of the multiple orders incident on the mask to reflect or transmit towards fringe projector optics and the surface; and
fringe projector optics configured to magnify the fringe patterns to cover a desired region on the surface.

15. The 3D metrology system of claim 14, wherein each source in the plurality of sources illuminates a corresponding custom phase grating in the plurality of custom phase gratings at one of the discrete wavelengths.

16. The 3D metrology system of claim 15, wherein each corresponding custom phase grating comprises a different phase grating pattern to project multiple orders at spectral beamsplitters for each illumination beam, wherein each order leaves the corresponding custom phase grating at different angles relative to a local first axis, the local first axis being parallel to the direction of the optical axis of the system at the corresponding custom phase grating, such that a phase of each fringe pattern in the set of spatially overlapping fringe patterns is offset from a phase of each of the other fringe patterns in the set of spatially overlapping fringe patterns by a desired amount at the surface.

17. The 3D metrology system of claim 16, wherein each set of multiple orders of each of the discrete wavelengths is incident on the spectral beamsplitters at a different angle approximately aligned with the local first axis, but all of the wavelengths leave the spectral beamsplitters travelling along the common first axis that is directed towards a mask.

18. The 3D metrology system of claim 1, wherein the fringe projection system comprises:
a plurality of sources configured to provide illumination beams of different wavelengths, each source comprising a discrete wavelength;
a custom phase grating, located in the object plane of the illumination system, which is conjugate to the surface;
a prism;
a mask configured to allow only two of the multiple orders incident on the mask to reflect or transmit towards fringe projector optics and the surface, and
fringe projector optics configured to magnify the fringe patterns to cover a desired region on the surface.

19. The 3D metrology system of claim 18, wherein the custom phase grating is configured to provide a spatial separation such that each phase grating pattern in the object plane is for a given discrete wavelength, such that a phase of each fringe pattern in the set of spatially overlapping fringe patterns is offset from a phase of each of the other fringe patterns in the set of spatially overlapping fringe patterns by a desired amount at the surface.

20. The 3D metrology system of claim 1, wherein the imaging system is configured to image at least one of reflected and scattered light from the surface onto a detector.

21. The 3D metrology system of claim 1, wherein the imaging system comprises:
  a first lens, wherein at least one of scattered and reflected light is directed from the surface toward the first lens to create an intermediate image;
  an aperture located at the intermediate image and acting as a field stop to limit the field of view on the surface is disposed after the first lens;
  a second lens that relays the light from the intermediate image to an imaging system diffraction grating in or near the pupil of the imaging system configured to separate the different wavelengths in angle near the pupil of the imaging system so that each wavelength can be measured at the same time; and
  a third lens, configured to receive diffracted light from the imaging system diffraction grating and direct the light on to the detector such that the different wavelengths are spatially separated.

22. The 3D metrology system of claim 21, wherein at least one of the reflected and scattered light from the surface is imaged onto a detector by a receiving side optical system and wherein the imaging system diffraction grating is located at or near the imaging system pupil in order to separate the fringe patterns for each wavelength spatially on the detector.

23. A 3D metrology system for determining a topography of a surface, the system comprising:
  a fringe projection system that projects a set of spatially overlapping fringe patterns on a surface simultaneously, each one of the fringe patterns in the set of spatially overlapping fringe patterns being generated by a different wavelength than each of the other fringe patterns in the set to provide a composite multi-fringe projection projected on the surface, wherein each fringe pattern in the set of spatially overlapping fringe patterns has a different fringe phase;
  an imaging system that collects at least one of reflected and scattered light from the composite multi-fringe projection projected on the surface to provide imaging data; and
  a processing system configured to:
    determine a phase map of the surface from the imaging data; and
    determine the topography of the surface based on the phase map,
  wherein the composite multi-fringe projection is generated by five different wavelengths.

24. A 3D metrology system for determining a topography of a surface, the system comprising:
  a fringe projection system that projects a set of spatially overlapping fringe patterns on a surface simultaneously, each one of the fringe patterns in the set of spatially overlapping fringe patterns being generated by a different wavelength than each of the other fringe patterns in the set to provide a composite multi-fringe projection projected on the surface, wherein each fringe pattern in the set of spatially overlapping fringe patterns has a different fringe phase;
  an imaging system that collects at least one of reflected and scattered light from the composite multi-fringe projection projected on the surface to provide imaging data; and
  a processing system configured to:
    determine a phase map of the surface from the imaging data; and
    determine the topography of the surface based on the phase map,
  wherein the surface changes topography due to being subjected to a process, and wherein the 3D metrology system is configured to monitor the changing topography of the surface by providing a determination of the topography of the surface at any given moment during the process, and
  wherein the surface comprises a powder bed, the process comprises a 3D printing process configured to build a part out of powder, and the 3D metrology system is configured to monitor the changing topography of the part as it is being built during the 3D printing process.

25. A 3D metrology system for determining a topography of a surface, the system comprising:
  a fringe projection system that projects a set of spatially overlapping fringe patterns on a surface simultaneously, each one of the fringe patterns in the set of spatially overlapping fringe patterns being generated by a different wavelength than each of the other fringe patterns in the set to provide a composite multi-fringe projection projected on the surface, wherein each fringe pattern in the set of spatially overlapping fringe patterns has a different fringe phase;
  an imaging system that collects at least one of reflected and scattered light from the composite multi-fringe projection projected on the surface to provide imaging data; and
  a processing system configured to:
    determine a phase map of the surface from the imaging data; and
    determine the topography of the surface based on the phase map,
  wherein the fringe projection system comprises:
    a plurality of sources configured to provide illumination beams of different wavelengths, each source comprising a discrete wavelength;
    a custom phase grating, located in the object plane of the illumination system, which is conjugate to the surface;
    an illumination pupil grating; and
    fringe projector optics configured to magnify the fringe patterns to cover a desired region on the surface.

26. A 3D metrology system for determining a topography of a surface, the system comprising:
  a fringe projection system that projects a set of spatially overlapping fringe patterns on a surface simultaneously, each one of the fringe patterns in the set of spatially overlapping fringe patterns being generated by a different wavelength than each of the other fringe patterns in the set to provide a composite multi-fringe projection projected on the surface, wherein each fringe pattern in the set of spatially overlapping fringe patterns has a different fringe phase;
  an imaging system that collects at least one of reflected and scattered light from the composite multi-fringe projection projected on the surface to provide imaging data; and
  a processing system configured to:
    determine a phase map of the surface from the imaging data; and
    determine the topography of the surface based on the phase map, wherein the fringe projection system comprises:
  a plurality of sources configured to provide illumination beams of different wavelengths, each source comprising a discrete wavelength;
  a plurality of custom phase gratings, located in the object planes of the illumination system, which is conjugate to the surface; spectral beamsplitters beam splitters;
  a mask configured to allow only two of the multiple orders incident on the mask to reflect or transmit towards fringe projector optics and the surface; and
  fringe projector optics configured to magnify the fringe patterns to cover a desired region on the surface.

27. A 3D metrology system for determining a topography of a surface, the system comprising:
  a fringe projection system that projects a set of spatially overlapping fringe patterns on a surface simultaneously, each one of the fringe patterns in the set of spatially overlapping fringe patterns being generated by a different wavelength than each of the other fringe patterns in the set to provide a composite multi-fringe projection projected on the surface, wherein each fringe pattern in the set of spatially overlapping fringe patterns has a different fringe phase;
  an imaging system that collects at least one of reflected and scattered light from the composite multi-fringe projection projected on the surface to provide imaging data; and
  a processing system configured to:
    determine a phase map of the surface from the imaging data; and
    determine the topography of the surface based on the phase map,
  wherein the fringe projection system comprises:
    a plurality of sources configured to provide illumination beams of different wavelengths, each source comprising a discrete wavelength;
    a custom phase grating, located in the object plane of the illumination system, which is conjugate to the surface;
    a prism;
    a mask configured to allow only two of the multiple orders incident on the mask to reflect or transmit towards fringe projector optics and the surface, and
    fringe projector optics configured to magnify the fringe patterns to cover a desired region on the surface.

28. A 3D metrology system for determining a topography of a surface, the system comprising:
  a fringe projection system that projects a set of spatially overlapping fringe patterns on a surface simultaneously, each one of the fringe patterns in the set of spatially overlapping fringe patterns being generated by a different wavelength than each of the other fringe patterns in the set to provide a composite multi-fringe projection projected on the surface, wherein each fringe pattern in the set of spatially overlapping fringe patterns has a different fringe phase;
  an imaging system that collects at least one of reflected and scattered light from the composite multi-fringe projection projected on the surface to provide imaging data; and
  a processing system configured to:
    determine a phase map of the surface from the imaging data; and
    determine the topography of the surface based on the phase map,
  wherein the imaging system comprises:
    a first lens, wherein at least one of scattered and reflected light is directed from the surface toward the first lens to create an intermediate image;
    an aperture located at the intermediate image and acting as a field stop to limit the field of view on the surface is disposed after the first lens;
    a second lens that relays the light from the intermediate image to an imaging system diffraction grating in or near the pupil of the imaging system configured to separate the different wavelengths in angle near the pupil of the imaging system so that each wavelength can be measured at the same time; and
    a third lens, configured to receive diffracted light from the imaging system diffraction grating and direct the light on to the detector such that the different wavelengths are spatially separated.

29. A method of determining a topography of a surface of a powder bed of a powder bed fusion type 3D printer, the method comprising:
  projecting a set of spatially overlapping fringe patterns on a surface of a powder bed simultaneously, each one of the fringe patterns in the set of spatially overlapping fringe patterns being generated by a different wavelength than each of the other fringe patterns in the set to provide a composite multi-fringe projection projected on the surface;
  collecting at least one of reflected and scattered light from the composite multi-fringe projection projected on the surface to provide imaging data;
  determining a phase map of the surface from the imaging data; and
  determining a topography of the surface based on the phase map.

30. The 3D metrology system of claim 24, wherein each fringe pattern in the set of spatially overlapping fringe patterns has a different fringe phase, and wherein a known phase difference exists between each of the fringe patterns in the set of spatially overlapping fringe patterns.

31. The 3D metrology system of claim 24, wherein the topography of the surface changes, and wherein as the topography of the surface changes:
  the fringes in the composite multi-fringe projection projected on the changing topography of the surface shift in response to the changing topography of the surface; and
  determining the topography of the surface based on the phase map comprises:
    determining a phase shift of the fringes at each location on the surface based on observing the at least one of reflected and scattered light in response to the fringes shifting on the changing topography of the surface; and
    determining a height of the surface at each location on the surface based on the phase shift of the fringes.

32. The 3D metrology system of claim 31, wherein the topography of the surface at a particular moment of interest is determined from imaging data provided by the imaging system at the particular moment of interest.

33. The 3D metrology system of claim 24, wherein the surface changes topography due to being subjected to a process, and wherein the 3D metrology system is configured to monitor the changing topography of the surface by providing a determination of the topography of the surface at any given moment during the process.

34. The 3D metrology system of claim 24, wherein the wherein the composite multi-fringe projection is generated by at least five different wavelengths.

35. The 3D metrology system of claim 29, wherein each fringe pattern in the set of spatially overlapping fringe patterns has a different fringe phase, and wherein a known phase difference exists between each of the fringe patterns in the set of spatially overlapping fringe patterns.

36. The 3D metrology system of claim 29, wherein the topography of the surface changes, and wherein as the topography of the surface changes:
the fringes in the composite multi-fringe projection projected on the changing topography of the surface shift in response to the changing topography of the surface; and
determining the topography of the surface based on the phase map comprises:
determining a phase shift of the fringes at each location on the surface based on observing the at least one of reflected and scattered light in response to the fringes shifting on the changing topography of the surface; and
determining a height of the surface at each location on the surface based on the phase shift of the fringes.

37. The 3D metrology system of claim 36, wherein the topography of the surface at a particular moment of interest is determined from imaging data provided by the imaging system at the particular moment of interest.

38. The 3D metrology system of claim 29, wherein the surface changes topography due to being subjected to a process, and wherein the 3D metrology system is configured to monitor the changing topography of the surface by providing a determination of the topography of the surface at any given moment during the process.

39. The 3D metrology system of claim 29, wherein the wherein the composite multi-fringe projection is generated by at least five different wavelengths.

* * * * *